(12) United States Patent
Takayama et al.

(10) Patent No.: US 12,715,534 B2
(45) Date of Patent: Aug. 25, 2026

(54) ELECTRICAL DEVICE AND ROTATIONAL DEVICE OF HUMAN-POWERED VEHICLE

(71) Applicant: SHIMANO INC., Sakai City (JP)

(72) Inventors: Hitoshi Takayama, Sakai City (JP); Yuma Yamamoto, Sakai City (JP); Junya Yamamoto, Sakai City (JP)

(73) Assignee: SHIMANO INC., Sakai (JP)

( * ) Notice: Subject to any disclaimer, the term of this patent is extended or adjusted under 35 U.S.C. 154(b) by 352 days.

(21) Appl. No.: 18/489,828

(22) Filed: Oct. 18, 2023

(65) Prior Publication Data

US 2024/0174314 A1 May 30, 2024

(30) Foreign Application Priority Data

Nov. 30, 2022 (DE) ........................ 102022131716.1
Apr. 26, 2023 (DE) ........................ 102023110753.4

(51) Int. Cl.
*B62J 45/411* (2020.01)
*B62J 45/421* (2020.01)
*B62M 3/16* (2006.01)

(52) U.S. Cl.
CPC ........... *B62J 45/411* (2020.02); *B62J 45/421* (2020.02); *B62M 3/16* (2013.01)

(58) Field of Classification Search
CPC ........ B62J 45/411; B62J 45/41; B62J 45/421; B62J 45/00; H05K 1/18; H05K 1/11; H05K 2201/10037; H05K 2201/10151; B62M 3/08; B62M 3/16; H01R 12/712; H01R 13/00; H01R 13/24; H01R 13/40; H01R 13/6205; H01R 13/631
See application file for complete search history.

(56) References Cited

U.S. PATENT DOCUMENTS

| | | | | |
|---|---|---|---|---|
| 5,027,303 | A * | 6/1991 | Witte | B62J 45/421 482/901 |
| 8,006,574 | B2 | 8/2011 | Meyer | |
| 8,065,926 | B2 | 11/2011 | Meyer | |
| 8,505,393 | B2 | 8/2013 | Meyer | |
| 9,581,508 | B2 * | 2/2017 | Tetsuka | B62J 45/412 |
| 10,000,253 | B1 * | 6/2018 | Tetsuka | B62M 25/08 |
| 10,300,984 | B2 * | 5/2019 | Tetsuka | B62J 50/21 |
| 10,458,788 | B2 | 10/2019 | Fyfe et al. | |
| 11,029,225 | B1 * | 6/2021 | Tachibana | B62J 45/421 |

(Continued)

FOREIGN PATENT DOCUMENTS

| | | |
|---|---|---|
| DE | 7929750 U1 | 3/1980 |
| DE | 10 2017 003 531 | 10/2017 |

(Continued)

*Primary Examiner* — Octavia Hollington
(74) *Attorney, Agent, or Firm* — MORI & WARD, LLP

(57) ABSTRACT

An electrical device of a human-powered vehicle comprises a circuit board and a terminal member. The circuit board includes a first electrically conductive body. The terminal member is configured to be at least partially provided between the circuit board and an additional device in an attachment state where the circuit board is attached to the additional device. The terminal member includes a second electrically conductive body configured to elastically maintain contact between the first electrically conductive body and the second electrically conductive body in the attachment state.

12 Claims, 38 Drawing Sheets

(56) References Cited

U.S. PATENT DOCUMENTS

| | | | | |
|---|---|---|---|---|
| 11,787,494 | B2 * | 10/2023 | Fujimura | B62J 3/10 73/862.627 |
| 12,005,985 | B2 * | 6/2024 | Fujimura | B62J 6/24 |
| 12,403,976 | B2 * | 9/2025 | Takayama | B62M 6/50 |
| 12,441,427 | B2 * | 10/2025 | Takayama | B62M 3/16 |
| 12,491,959 | B2 * | 12/2025 | Takayama | B62J 45/414 |
| 12,503,190 | B2 * | 12/2025 | Takayama | B62J 45/411 |
| 12,515,756 | B2 * | 1/2026 | Takayama | B62J 45/421 |
| 2017/0292881 | A1 | 10/2017 | Jennings et al. | |
| 2024/0174314 | A1 * | 5/2024 | Takayama | B62J 45/41 |

FOREIGN PATENT DOCUMENTS

| | | | | |
|---|---|---|---|---|
| DE | 102019201066 | A1 * | 8/2019 | H05K 1/144 |
| EP | 3566938 | | 11/2019 | |

* cited by examiner 10
18
14
16
12
28
EC1
30D
30C
30P
WC1
30M
38
13
2
70
42A
LE
44
42
36
WD1
7
34
32
45
7A
9
SG
INF1
INF11
INF12
INF2
6
8
EC2
EC3
50D
50C
60D
60C
50P
WC2
60P
WC3
50M
54
60M
64
52
62
46
56
48
58
INF2

12
14
66
28
30C
7D (7D2)
7E (7E2)
7C (7C2)
7C (7C4)
RP
RA
7C (7C3)
7C (7C1)
7E (7E1)
7D (7D1)
7
7B
7A
45
45A (45A2)
45A (45A4)
45A (45A3)
45A (45A1)
45B (45B2)
45B (45B1)
9
EC1
WD1
WD11
WD12
44
44A
+
−
42B
42A
42

12
14
66
28
30C
7D (7D1)
7E (7E1)
7C (7C1)
7C (7C3)
RP
RA
9
7C (7C4)
7C (7C2)
7E (7E2)
7D (7D2)
7
7B
7A
45
42B
42A
42
45B (45B2)
45A (45A2)
45A (45A4)
45A (45A3)
45A (45A1)
45B (45B1)
EC1
WD12
WD11
WD1
44A
44
+
-

10
28
30C
14
78B
78
74
(74A)
78A
78A1
78A2
78A3
78A4
30K
30K1
30K2
30K3
30K4
45
45A
45A1
45A2
45A3
45A4
45P
70
10A
DS1
45C
45C1
45C2
45C3
45C4
66A
66P
66E
45R
12
66
66B
DS2

12
14
66
28
30C
7D (7D2)
7E (7E2)
7C (7C2)
7C (7C4)
RP
RA
9
7C (7C3)
7C (7C1)
7E (7E1)
7D (7D1)
7
7B
7A
45B (45B2)
7P
45A (45A2)
45P
45A (45A4)
45
45A (45A3)
45A (45A1)
45B (45B1)
42B
42A
42
EC1
WD12
WD11
WD1
44A
44

12
14
66
28
30C
7D (7D2)
7E (7E2)
7C (7C2)
7C (7C4)
RP
RA
9
7C (7C3)
7C (7C1)
7E (7E1)
7D (7D1)
7
7B
7A
45P
45Q
45
7P
45B (45B2)
45B (45B1)
45A (45A2)
45A (45A4)
45A (45A3)
45A (45A1)
EC1
WD12
WD11
WD1
44A
44
42B
42A
42

10
2
18
14
12
28
EC1
30D
30C
30P
WC1
30M
38
70
42A
LE
44
36
WD1
34
45
32
42
16
13
SG
INF1
INF11
INF12
INF2
6
8
EC2
EC3
50D
50C
50P
WC2
50M
54
52
46
48
60D
60C
60P
WC3
60M
64
62
56
58

210
18
14
212
28
EC1
30D
30C
16
30P
WD1
30M
44
42A
70
WC1
224
36
38
42
230C
45
13
LE
34
32
2
SG
INF1
INF11
INF12
INF2
6
8
EC2
EC3
50D
50C
60D
60C
50P
WC2
60P
WC3
50M
54
60M
64
52
62
46
56
48
58
INF2

310
18
14
312
28
328
EC1
330C
30D
30C
336
16
30P
334
30M
WC1
42A
224
332
70
38
44
42
230C
45
36
LE
WD1
13
34
32
2
SG
INF1
INF11
INF12
INF2
INF3(INF31)
6
8
EC2
EC3
50D
50C
60D
60C
50P
WC2
60P
WC3
50M
54
60M
64
52
62
46
56
48
58
INF2

ELECTRICAL DEVICE AND ROTATIONAL DEVICE OF HUMAN-POWERED VEHICLE

CROSS-REFERENCE TO RELATED APPLICATIONS

The present application claims priority under 35 U.S.C. § 119 to German Patent Application No. 102022131716.1, filed Nov. 30, 2022 and German Patent Application No. 102023110753.4, filed Apr. 26, 2023. The contents of German Patent Applications No. 102022131716.1 and No. 102023110753.4 are incorporated herein by reference in their entirety.

TECHNICAL FIELD

The present invention relates to an electrical device and a rotational device of a human-powered vehicle.

BACKGROUND INFORMATION

A human-powered vehicle includes a device including an electric part. It is preferable to save a manufacturing cost of the device and/or to improve usability of the device.

SUMMARY

In accordance with a first aspect of the present invention, an electrical device of a human-powered vehicle comprises a circuit board and a terminal member. The circuit board includes a first electrically conductive body. The terminal member is configured to be at least partially provided between the circuit board and an additional device in an attachment state where the circuit board is attached to the additional device. The terminal member includes a second electrically conductive body configured to elastically maintain contact between the first electrically conductive body and the second electrically conductive body in the attachment state.

With the electrical device according to the first aspect, it is possible to elastically maintain contact between the first electrically conductive body and the second electrically conductive body in the attachment state by arranging the terminal member between the circuit board and the additional device. Thus, the terminal member simplifies an assembly process of the electrical device, saving a manufacturing cost of the electrical device.

In accordance with a second aspect of the present invention, the electrical device according to the first aspect is configured so that the terminal member is deformable to elastically maintain contact between the first electrically conductive body and the second electrically conductive body in the attachment state.

With the electrical device according to the second aspect, it is possible to elastically maintain contact between the first electrically conductive body and the second electrically conductive body in the attachment state with a comparatively simple structure. Thus, it is possible to reliably save the manufacturing cost of the electrical device.

In accordance with a third aspect of the present invention, the electrical device according to the first or second aspect further comprises a force sensor configured to measure a force applied to the additional device in the attachment state.

With the electrical device according to the third aspect, it is possible to save the manufacturing cost of the electrical device while utilizing the force measured by the force sensor.

In accordance with a fourth aspect of the present invention, the electrical device according to the third aspect is configured so that the force sensor is configured to be at least partially attached to the additional device in the attachment state. The terminal member is configured to be at least partially provided between the circuit board and the force sensor in the attachment state.

With the electrical device according to the fourth aspect, it is possible to utilize a space between the circuit board and the force sensor as a space for the terminal member. Thus, it is possible to save the manufacturing cost of the electrical device while avoiding increasing in size of the electrical device.

In accordance with a fifth aspect of the present invention, the electrical device according to the fourth aspect is configured so that the force sensor includes a third electrically conductive body. The terminal member is configured to elastically maintain contact between the second electrically conductive body and the third electrically conductive body in the attachment state.

With the electrical device according to the fifth aspect, the terminal member electrically connects the circuit board and the force sensor via the first electrically conductive body, the second electrically conductive body, and the third electrically conductive body. Thus, it is possible to omit a member such as a flexible printed circuit connecting the force sensor and the circuit board. Accordingly, it is possible to reliably save the manufacturing cost of the electrical device.

In accordance with a sixth aspect of the present invention, the electrical device according to the fifth aspect is configured so that the terminal member is deformable to elastically maintain contact between the second electrically conductive body and the third electrically conductive body in the attachment state.

With the electrical device according to the sixth aspect, it is possible to elastically maintain contact between the second electrically conductive body and the third electrically conductive body in the attachment state with a comparatively simple structure. Thus, it is possible to reliably save the manufacturing cost of the electrical device.

In accordance with a seventh aspect of the present invention, the electrical device according to any one of the first to sixth aspects is configured so that the terminal member includes a base body made of a non-metallic material. The second electrically conductive body is coupled to the base body.

With the electrical device according to the seventh aspect, the base body makes the second electrically conductive body stable in the attachment state.

In accordance with an eighth aspect of the present invention, an electrical device of a human-powered vehicle comprises a circuit board and a rechargeable battery. The circuit board includes a first electrically conductive body. The rechargeable battery is directly connected to the first electrically conductive body of the circuit board via solder.

With the electrical device according to the eighth aspect, it is possible to simplify a structure connecting the circuit board and the rechargeable battery. Thus, it is possible to save a manufacturing cost of the electrical device.

In accordance with a ninth aspect of the present invention, the electrical device according to the eighth aspect is configured so that the rechargeable battery is directly connected to the first electrically conductive body via solder without a battery holder.

With the electrical device according to the ninth aspect, it is possible to omit the battery holder from the electrical device. Thus, it is possible to save a manufacturing cost of the electrical device.

In accordance with a tenth aspect of the present invention, the electrical device according to the eighth or ninth aspect is configured so that the rechargeable battery includes a battery body and a battery terminal protruding from the battery body. The battery terminal is directly connected to the first electrically conductive body via solder.

With the electrical device according to the tenth aspect, it is possible to easily directly connect the battery terminal to the first electrically conductive body via solder since the battery terminal protrudes from the battery body. Thus, it is possible to reliably save the manufacturing cost of the electrical device.

In accordance with an eleventh aspect of the present invention, the electrical device according to the tenth aspect is configured so that the circuit board includes a first surface and a second surface provided on a reverse side of the first surface. The battery body is provided on the first surface.

With the electrical device according to the eleventh aspect, it is possible to utilize the first surface as a place where the battery body is provided. Thus, it is possible to reduce a size of the electrical device.

In accordance with a twelfth aspect of the present invention, the electrical device according to the eleventh aspect is configured so that the battery body has a circular outline when viewed in a perpendicular direction perpendicular to the first surface.

With the electrical device according to the twelfth aspect, it is possible to efficiently utilize a space provided around the battery body.

In accordance with a thirteenth aspect of the present invention, the electrical device according to the twelfth aspect is configured so that the battery terminal protrudes from the battery body beyond the circular outline when viewed in the perpendicular direction.

With the electrical device according to the thirteenth aspect, it is possible to efficiently utilize a space provided around the battery body as a place where the battery terminal is provided.

In accordance with a fourteenth aspect of the present invention, the electrical device according to any one of the tenth to thirteenth aspects is configured so that the battery terminal includes a first terminal part and a second terminal part spaced apart from the first terminal part. The first terminal part is directly connected to the first electrically conductive body via first solder. The second terminal part is directly connected to the first electrically conductive body via second solder.

With the electrical device according to the fourteenth aspect, it is possible to utilize the first terminal part and the second terminal part as plus and minus terminals.

In accordance with a fifteenth aspect of the present invention, an electrical device of a human-powered vehicle comprises an electronic controller and a reset circuit. The reset circuit is electrically connected to the electronic controller to reset the electronic controller based on one of start and completion of charging a rechargeable battery configured to supply electricity to the electronic controller.

With the electrical device according to the fifteenth aspect, it is possible to automatically reset the electronic controller using the one of start and completion of charging the rechargeable battery. Thus, it is possible to omit a user operation indicating the reset of the electronic controller, improving usability of the electronic controller.

In accordance with a sixteenth aspect of the present invention, the electrical device according to the fifteenth aspect further comprises the rechargeable battery electrically connected to the electronic controller to supply electricity to the electronic controller.

With the electrical device according to the sixteenth aspect, it is possible to omit replacement of a battery. Thus, it is possible to reliably improve usability of the electronic controller.

In accordance with a seventeenth aspect of the present invention, the electrical device according to the fifteenth or sixteenth aspect is configured so that the reset circuit is configured to generate a reset signal based on the one of start and completion of charging the rechargeable battery.

With the electrical device according to the seventeenth aspect, it is possible to automatically reset the electronic controller using the reset signal. Thus, it is possible to reliably improve usability of the electronic controller.

In accordance with an eighteenth aspect of the present invention, the electrical device according to the seventeenth aspect is configured so that the electronic controller is configured to be reset in response to the reset signal.

With the electrical device according to the eighteenth aspect, it is possible to automatically reset the electronic controller using the reset signal. Thus, it is possible to reliably improve usability of the electronic controller.

In accordance with a nineteenth aspect of the present invention, the electrical device according to any one of the fifteenth to eighteenth aspects is configured so that the reset circuit is configured to detect the one of start and completion of charging the rechargeable battery.

With the electrical device according to the nineteenth aspect, it is possible to improve a processing speed of the electrical device when resetting the electronic controller.

In accordance with a twentieth aspect of the present invention, an electrical device of a rotational device for a human-powered vehicle comprises a housing, an electric connector port to which a cable connector of an electric cable is detachably connectable, and a port cover attachable to the housing to cover the electric connector port at least partially. The port cover includes an electrical conductor.

With the electrical device according to the twentieth aspect, the electrical conductor can conduct static electricity from the housing to a member other than the electric connector port, protecting the electric connector port or other electric components from static electricity.

In accordance with a twenty-first aspect of the present invention, the electrical device according to the twentieth aspect is configured so that the port cover is configured to be attached to the housing to cover at least partially the electric connector port.

With the electrical device according to the twenty-first aspect, it is possible to protect the electric connector port or other electric components from static electricity while protecting the electric connector port from foreign materials.

In accordance with a twenty-second aspect of the present invention, the electrical device according to the twentieth or twenty-first aspect is configured so that the port cover includes an inner surface configured to face toward the electric connector port in a cover state where the port cover at least partially covers the electric connector port. The electrical conductor is at least partially provided in the inner surface.

With the electrical device according to the twenty-second aspect, the electrical conductor can conduct static electricity from the housing to a member other than the electric connector port before static electricity flows into the electric connector port. Thus, it is possible to protect the electric connector port or other electric components from static electricity.

In accordance with a twenty-third aspect of the present invention, the electrical device according to the twenty-second aspect is configured so that the electric connector port includes a port terminal made of an electrical conducting material. The inner surface is configured to face toward the port terminal in the cover state.

With the electrical device according to the twenty-third aspect, the electrical conductor can conduct static electricity from the housing to a member other than the electric connector port before static electricity flows into the port terminal. Thus, it is possible to reliably protect the electric connector port or other electric components from static electricity.

In accordance with a twenty-fourth aspect of the present invention, the electrical device according to the twenty-second or twenty-third aspect is configured so that the electric connector port includes a recess in which a cable connector of an electric cable is at least partially provided. The inner surface is configured to face toward the recess in the cover state.

With the electrical device according to the twenty-fourth aspect, it is possible to protect the electric connector port or other electric components from static electricity while restricting foreign materials from entering the recess.

In accordance with a twenty-fifth aspect of the present invention, the electrical device according to any one of the twentieth to twenty-fourth aspects is configured so that the port cover includes a cover body made of a non-metallic material.

With the electrical device according to the twenty-fifth aspect, it is possible to save weight of the port cover.

In accordance with a twenty-sixth aspect of the present invention, the electrical device according to the twenty-fifth aspect is configured so that the electrical conductor is at least partially provided integrally with the cover body as a one-piece unitary member.

With the electrical device according to the twenty-sixth aspect, it is possible to protect the electric connector port or other electric components from static electricity while reducing the number of parts of the electrical device.

In accordance with a twenty-seventh aspect of the present invention, the electrical device according to the twenty-fifth or twenty-sixth aspect is configured so that the electrical conductor is formed integrally with the cover body by two-color molding.

With the electrical device according to the twenty-seventh aspect, it is possible to integrally form the cover body and the electrical conductor with a comparatively simple method.

In accordance with a twenty-eighth aspect of the present invention, the electrical device according to any one of the twentieth to twenty-seventh aspects is configured so that the housing is configured to be mounted to a mounting surface of the rotational device. A first distance is defined between the electrical conductor and a port terminal of the electric connector port in a mounting state where the housing is mounted to the rotational device and where the port cover at least partially covers the electric connector port. A second distance is defined between the electrical conductor and the mounting surface in the mounding state. The second distance is shorter than the first distance.

With the electrical device according to the twenty-eighth aspect, since the second distance is shorter than the first distance, the electrical conductor can reliably conduct static electricity from the housing to the mounting surface. Thus, it is possible to reliably protect the electric connector port or other electric components from static electricity.

In accordance with a twenty-ninth aspect of the present invention, the electrical device according to any one of the twentieth to twenty-seventh aspects further comprises a metallic member provided to the housing. A first distance is defined between the electrical conductor and a port terminal of the electric connector port in a cover state where the port cover at least partially covers the electric connector port. A third distance is defined between the electrical conductor and the metallic member in the cover state. The third distance is shorter than the first distance.

With the electrical device according to the twenty-ninth aspect, since the third distance is shorter than the first distance, the electrical conductor can reliably conduct static electricity from the housing to the metallic member. Thus, it is possible to reliably protect the electric connector port or other electric components from static electricity.

In accordance with a thirtieth aspect of the present invention, the electrical device according to the twenty-ninth aspect further comprises an electrically conductive member configured to be in contact with the metallic member. The housing is configured to be mounted to a mounting surface of the rotational device. A fourth distance is defined between the electrically conductive member and the mounting surface in a mounting state where the housing is mounted to the rotational device and where the port cover at least partially covers the electric connector port. The fourth distance is shorter than the first distance.

With the electrical device according to the thirtieth aspect, since the fourth distance is shorter than the first distance, the electrical conductor can reliably conduct static electricity from the housing to the mounting surface via the metallic member and the electrically conductive member. Thus, it is possible to reliably protect the electric connector port or other electric components from static electricity.

In accordance with a thirty-first aspect of the present invention, an electrical device of a rotational device for a human-powered vehicle comprises a housing, an electric connector port to which a cable connector of an electric cable is detachably connectable, a metallic member, and an electrically conductive member. The housing is configured to be mounted to a mounting surface of the rotational device. The metallic member is provided to the housing. The electrically conductive member is configured to be in contact with the metallic member.

With the electrical device according to the thirty-first aspect, the electrically conductive member can conduct static electricity from the housing to a member other than the electric connector port via the metallic member and the electrically conductive member. Thus, it is possible to reliably protect the electric connector port or other electric components from static electricity.

In accordance with a thirty-second aspect of the present invention, an electrical device of a rotational device for a human-powered vehicle comprises a housing and an embedded part. The housing is configured to be mounted to the rotational device. The housing is made of a non-metallic material. The embedded part is partially embedded in the housing. The embedded part is made of a material different from the non-metallic material.

With the electrical device according to the thirty-second aspect, it is possible to treat the housing and the embedded part as a unitary member, enabling the electrical device to be easily assembled.

In accordance with a thirty-third aspect of the present invention, the electrical device according to the thirty-second aspect is configured so that the embedded part is contactable with a cable connector of an electric cable.

With the electrical device according to the thirty-third aspect, it is possible to utilize the embedded part to mechanically or electrically connect the cable connector and the housing.

In accordance with a thirty-fourth aspect of the present invention, the electrical device according to the thirty-second or thirty-third aspect is configured so that the housing includes a housing outer surface. The embedded part is partially exposed from the housing outer surface.

With the electrical device according to the thirty-fourth aspect, it is possible to utilize the embedded part to mechanically or electrically connect the housing and another member or to conduct electricity or light to the outside of the housing.

In accordance with a thirty-fifth aspect of the present invention, the electrical device according to any one of the thirty-second to thirty-fourth aspects is configured so that the embedded part includes a port terminal contactable with a terminal of the cable connector. The port terminal is partially embedded in the housing.

With the electrical device according to the thirty-fifth aspect, it is possible to treat the housing and the port terminal as a unitary member, enabling the electrical device to be easily assembled.

In accordance with a thirty-sixth aspect of the present invention, the electrical device according to any one of the thirty-second to thirty-fifth aspects is configured so that the embedded part includes a metallic member contactable with a magnet of the cable connector. The metallic member is partially embedded in the housing.

With the electrical device according to the thirty-sixth aspect, the metallic member enables the cable connector to be coupled to the housing.

In accordance with a thirty-seventh aspect of the present invention, the electrical device according to any one of the thirty-second to thirty-sixth aspects is configured so that the embedded part includes a magnet contactable with a metallic member of the cable connector. The magnet is partially embedded in the housing.

With the electrical device according to the thirty-seventh aspect, the magnet enables the cable connector to be coupled to the housing.

In accordance with a thirty-eighth aspect of the present invention, the electrical device according to any one of the thirty-second to thirty-seventh aspects is configured so that the embedded part includes a light transmission portion having light transparency. The light transmission portion is partially embedded in the housing.

With the electrical device according to the thirty-eighth aspect, the light transmission portion can transmit light to the outside of the housing. Thus, for example, it is possible to notify a state of the electrical device using light.

In accordance with a thirty-ninth aspect of the present invention, the electrical device according to any one of the thirty-second to thirty-eighth aspects is configured so that the housing is made of a resin material.

With the electrical device according to the thirty-ninth aspect, it is possible to save weight of the housing or improve productivity of the housing.

In accordance with a fortieth aspect of the present invention, the electrical device according to any one of the thirty-second to thirty-ninth aspects is configured so that the embedded part is partially embedded in the housing with insert molding.

With the electrical device according to the fortieth aspect, it is possible to embed the embedded part in the housing with a comparatively simple method.

In accordance with a forty-first aspect of the present invention, the electrical device according to any one of the thirty-second to fortieth aspects is configured so that the embedded part is partially embedded in the housing with two-color molding.

With the electrical device according to the forty-first aspect, it is possible to embed the embedded part in the housing with a comparatively simple method.

In accordance with a forty-second aspect of the present invention, an electrical device of a rotational device for a human-powered vehicle comprises a circuit board and a double-sided tape configured to attach the circuit board to the rotational device.

With the electrical device according to the forty-second aspect, it is possible to easily control a region of the double-sided tape compared to an adhesive agent since the adhesive agent changes its area when the circuit board is attached to the rotational device. Thus, the double-sided tape enables the electrical device to be easily assembled.

In accordance with a forty-third aspect of the present invention, the electrical device according to the forty-second aspect is configured so that the double-sided tape is configured to attach the circuit board to a mounting surface of the rotational device.

With the electrical device according to the forty-third aspect, the double-sided tape enables the circuit board to be easily attached to the mounting surface.

In accordance with a forty-fourth aspect of the present invention, the electrical device according to the forty-third aspect is configured so that the circuit board includes a first surface and a second surface provided on a reverse side of the first surface. The double-sided tape is configured to attach the second surface to the mounting surface of the rotational device.

With the electrical device according to the forty-fourth aspect, the double-sided tape enables the second surface of the circuit board to be easily attached to the mounting surface.

In accordance with a forty-fifth aspect of the present invention, the electrical device according to the forty-fourth aspect is configured so that the circuit board at least partially overlaps the double-sided tape as viewed in a perpendicular direction perpendicular to the first surface.

With the electrical device according to the forty-fifth aspect, it is possible to utilize the region of the circuit board for a region of the double-sided tape.

In accordance with a forty-sixth aspect of the present invention, the electrical device according to the forty-fourth or forty-fifth aspect is configured so that the circuit board has a first thickness defined between the first surface and the second surface in a perpendicular direction perpendicular to the first surface. The double-sided tape has a second thickness defined in the perpendicular direction. The second thickness is less than the first thickness.

With the electrical device according to the forty-sixth aspect, it is possible to shorten the total thickness of the circuit board and the double-sided tape, enabling the electrical device to be smaller or to avoid being larger.

In accordance with a forty-seventh aspect of the present invention, the electrical device according to any one of the forty-fourth to forty-sixth aspects further comprises a strain gauge electrically connected to the circuit board. The double-sided tape is arranged to avoid overlapping the strain gauge as viewed in a perpendicular direction perpendicular to the first surface.

With the electrical device according to the forty-seventh aspect, it is possible to avoid interference between the double-sided tape and the strain gauge while the circuit board is attached to the rotational device with a comparatively simple structure.

In accordance with a forty-eighth aspect of the present invention, the electrical device according to any one of the forty-fourth to forty-seventh aspects further comprises a flexible printed circuit electrically connected to the circuit board. The double-sided tape is arranged to avoid overlapping the flexible printed circuit as viewed in a perpendicular direction perpendicular to the first surface.

With the electrical device according to the forty-eighth aspect, avoid interference between the double-sided tape and the flexible printed circuit while the circuit board is attached to the rotational device with a comparatively simple structure.

In accordance with a forty-ninth aspect of the present invention, the electrical device according to any one of the forty-third to forty-eighth aspects is configured so that the double-sided tape is at least partially provided between the circuit board and the mounting surface.

With the electrical device according to the forty-ninth aspect, it is possible to reliably attach the circuit board to the mounting surface using the double-sided tape.

In accordance with a fiftieth aspect of the present invention, a rotational device of a human-powered vehicle comprises a crank arm and the electrical device according to any one of the first to forty-ninth aspects.

With the rotational device according to the fiftieth aspect, it is possible to apply the electrical device to the crank arm.

In accordance with a fifty-first aspect of the present invention, the rotational device according to the fiftieth aspect is configured so that the electrical device is at least partially provided to the crank arm.

With the rotational device according to the fifty-first aspect, it is possible to reliably apply the electrical device to the crank arm.

In accordance with a fifty-second aspect of the present invention, the rotational device according to the fiftieth or fifty-first aspect further comprises a crank axle and a sprocket. The crank arm is secured to the crank axle.

With the rotational device according to the fifty-second aspect, it is possible to apply the electrical device to a crank assembly.

In accordance with a fifty-third aspect of the present invention, the rotational device according to the fifty-second aspect is configured so that the electrical device is at least partially provided to at least one of the crank axle, the crank arm, and the sprocket.

With the rotational device according to the fifty-third aspect, it is possible to reliably apply the electrical device to the crank assembly.

In accordance with a fifty-fourth aspect of the present invention, a rotational device of a human-powered vehicle comprises a pedal axle, a pedal body rotatably coupled to the pedal axle, and the electrical device according to any one of the first to forty-ninth aspects.

With the rotational device according to the fifty-fourth aspect, it is possible to apply the electrical device to a pedal assembly.

In accordance with a fifty-fifth aspect of the present invention, the rotational device according to the fifty-fourth aspect is configured so that the electrical device is at least partially provided to at least one of the pedal axle and the pedal body.

With the rotational device according to the fifty-fifth aspect, it is possible to reliably apply the electrical device to the pedal assembly.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
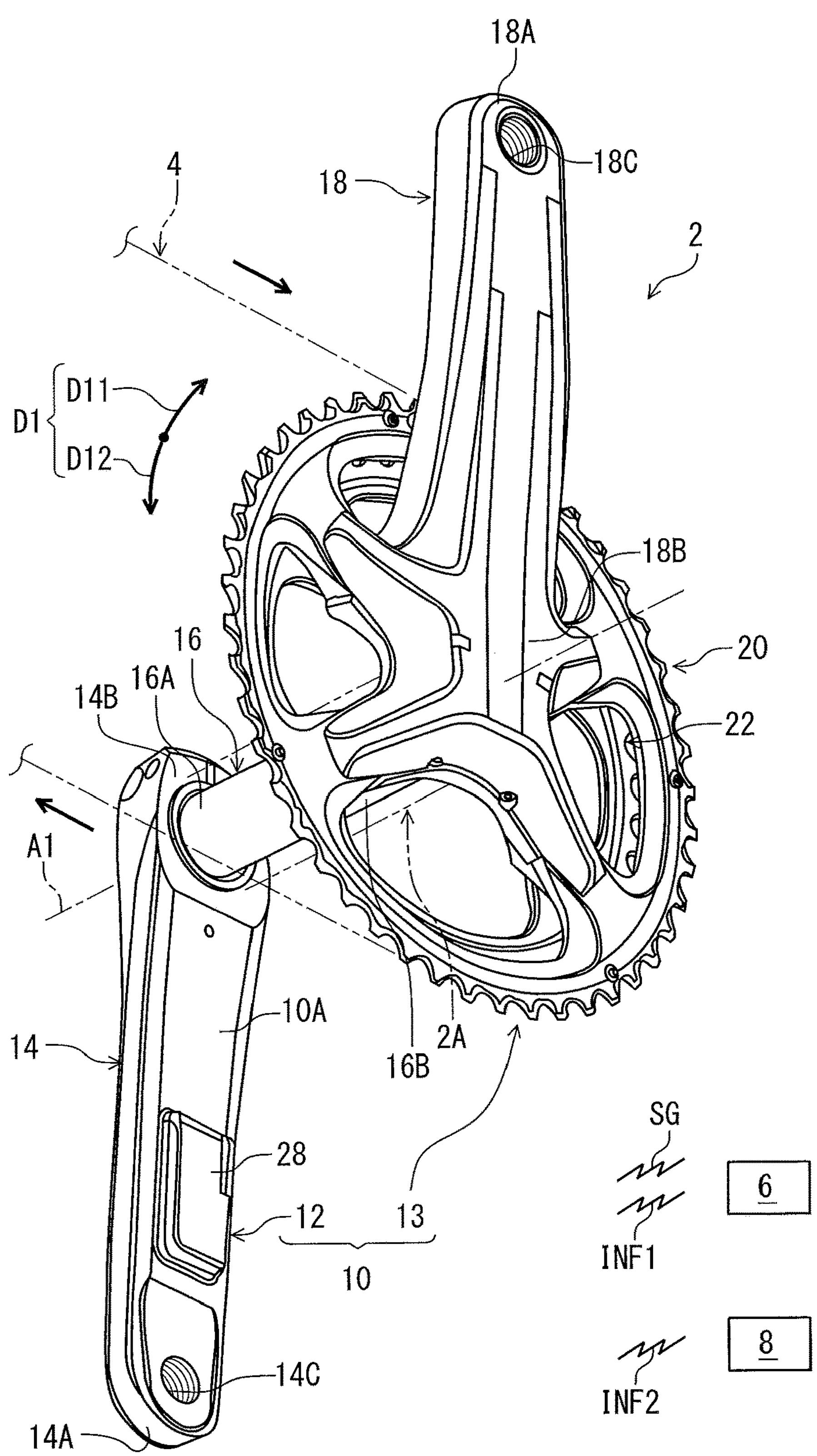
FIG. 1 is a perspective view of a rotational device of a human-powered vehicle in accordance with a first embodiment.

The embodiments will now be described with reference to the accompanying drawings, wherein like reference numerals designate corresponding or identical elements throughout the various drawings.

First Embodiment

As seen in FIG. 1, a human-powered vehicle 2 includes a rotational device 10 in accordance with one of embodiments. The rotational device 10 of the human-powered vehicle 2 comprises an electrical device 12. The rotational device 10 includes an additional device 13. Examples of the additional device 13 include a crank assembly, a pedal, and a combination thereof. Examples of the electrical device 12 include a crank power meter and a pedal power meter. In the present embodiment, the additional device 13 includes a crank assembly. The electrical device 12 includes a crank power meter. The additional device 13 can also be referred to as the crank assembly 13. However, the rotational device 10 can include other devices such as a pedal if needed and/or desired. The electrical device 12 can include other devices such as a pedal power meter if needed and/or desired.

In the present application, the term "human-powered vehicle" includes a vehicle to travel with a motive power including at least a human power of a user who rides the human-powered vehicle (i.e., rider). The human-powered vehicle includes a various kind of bicycles such as a mountain bike, a road bike, a city bike, a cargo bike, a hand bike, and a recumbent bike. Furthermore, the human-powered vehicle includes an electric bike (E-bike). The electric bike includes an electrically assisted bicycle configured to assist propulsion of a vehicle with an electric motor. However, a total number of wheels of the human-powered vehicle is not limited to two. For example, the human-powered vehicle includes a vehicle having one wheel or three or more wheels. Especially, the human-powered vehicle does not include a vehicle that uses only an internal-combustion engine as motive power. Generally, a light road vehicle, which includes a vehicle that does not require a driver's license for a public road, is assumed as the human-powered vehicle.

As seen in FIG. 1, the rotational device 10 is rotatable relative to a vehicle body 2A of the human-powered vehicle 2 about a rotational axis A1. The rotational device 10 is rotatable relative to the vehicle body 2A of the human-powered vehicle 2 about the rotational axis A1 in a rotational direction D1. The rotational device 10 is rotatable relative to the vehicle body 2A of the human-powered vehicle 2 about the rotational axis A1 in a driving rotational direction D11 during pedaling. The rotational direction D1 includes the driving rotational direction D11 and a reverse rotational direction D12. The reverse rotational direction D12 is an opposite direction of the driving rotational direction D11.

The rotational device 10 of the human-powered vehicle 2 comprises a crank arm 14. The rotational device 10 further comprises a crank axle 16. The rotational device 10 further comprises a crank arm 18. The crank assembly 13 includes the crank arm 14, the crank axle 16, and the crank arm 18. The crank arm 14 is secured to the crank axle 16. The crank arm 18 is secured to the crank axle 16. The crank arm 14, the crank axle 16, and the crank arm 18 are rotatable relative to the vehicle body 2A of the human-powered vehicle 2 in the driving rotational direction D11.

The rotational device 10 further comprises a sprocket 20. The rotational device 10 further comprises a sprocket 22. The sprocket 20 is configured to engage with a chain 4. The sprocket 22 is configured to engage with the chain 4. The sprocket 20 or 22 is configured to transmit a driving force to another sprocket such as a rear sprocket via the chain 4. The sprocket 20 is secured to at least one of the crank axle 16 and the crank arm 18. The sprocket 22 is secured to at least one of the crank axle 16, the crank arm 18, and the sprocket 20. The sprocket 22 can be omitted from the rotational device 10 if needed and/or desired.

The crank axle 16 includes a first axle end 16A and a second axle end 16B. The crank axle 16 extends between the first axle end 16A and the second axle end 16B along the rotational axis A1. The crank arm 14 is secured to the first axle end 16A. The crank arm 18 is secured to the second axle end 16B.

The crank arm 14 includes a first end 14A and a second end 14B. The crank arm 14 extends between the first end 14A and the second end 14B. The first end 14A includes a pedal securing hole 14C to which a pedal is attachable. The second end 14B is secured to the first axle end 16A of the crank axle 16.

The crank arm 18 includes a first end 18A and a second end 18B. The crank arm 18 extends between the first end 18A and the second end 18B. The first end 18A includes a pedal securing hole 18C to which a pedal is attachable. The second end 18B is secured to the second axle end 16B of the crank axle 16.

In the present embodiment, the crank arm 14 is a left crank arm while the crank arm 18 is a right crank arm. However, the crank arm 14 can be a right crank arm if needed and/or desired. The crank arm 18 can be a left crank arm if needed and/or desired.

In the present application, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on a saddle or a seat) in the human-powered vehicle 2 with facing a handlebar or a steering. Accordingly, these terms, as utilized to describe the rotational device 10, the electrical device 12, or other components, should be interpreted relative to the human-powered vehicle 2 equipped with the rotational device 10, the electrical device 12, or other components as used in an upright riding position on a horizontal surface.

Figure 2:
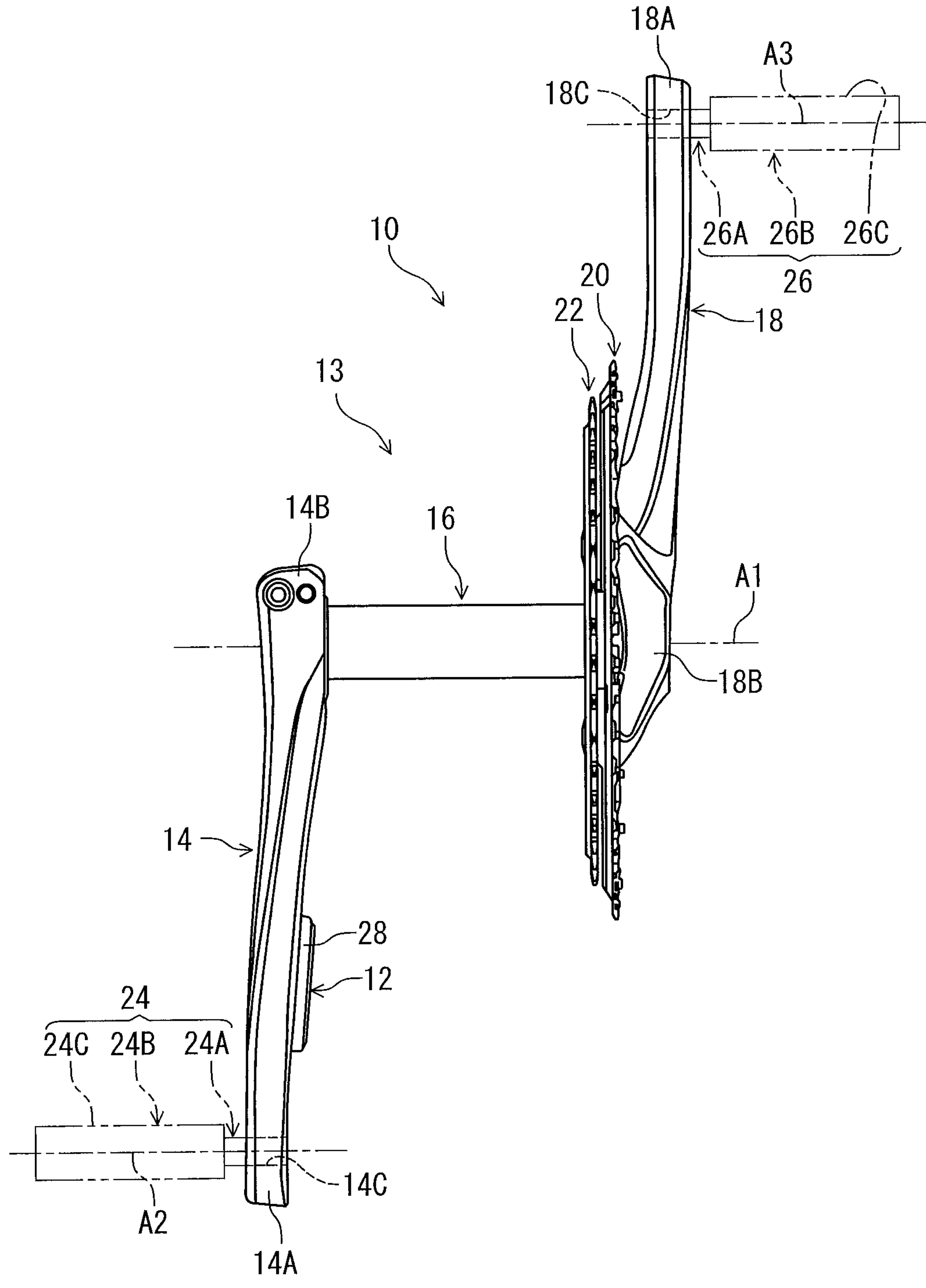
FIG. 2 is a side-elevational view of the rotational device illustrated in FIG. 1.

As seen in FIG. 2, the rotational device 10 of the human-powered vehicle 2 comprises a pedal 24. The pedal 24 includes a pedal axle 24A and a pedal body 24B. Namely, the rotational device 10 of the human-powered vehicle 2 comprises the pedal axle 24A and the pedal body 24B. The pedal body 24B is rotatably coupled to the pedal axle 24A. The pedal axle 24A is configured to be secured to the crank arm 14 of the rotational device 10. The pedal axle 24A is threadedly engaged with the pedal securing hole 14C of the crank arm 14.

The pedal body 24B is rotatably coupled to the pedal axle 24A about a rotational axis A2. The pedal axle 24A extends along the rotational axis A2. The pedal body 24B includes a tread surface 24C on which a shoe of the user is to be put. The pedal body 24B can include a binding structure to which a cleat of the shoe is to be fixedly coupled.

The rotational device 10 of the human-powered vehicle comprises a pedal 26. The pedal 26 includes a pedal axle 26A and a pedal body 26B. Namely, the rotational device 10 of the human-powered vehicle 2 comprises the pedal axle 26A and the pedal body 26B. The pedal body 26B is rotatably coupled to the pedal axle 26A. The pedal axle 26A is configured to be secured to the crank arm 18 of the rotational device 10. The pedal axle 26A is threadedly engaged with the pedal securing hole 18C of the crank arm 18.

The pedal body 26B is rotatably coupled to the pedal axle 26A about a rotational axis A3. The pedal axle 26A extends along the rotational axis A3. The pedal body 26B includes a tread surface 26C on which a shoe of the user is to be put. The pedal body 26B can include a binding structure to which a cleat of the shoe is to be fixedly coupled.

The electrical device 12 is at least partially provided to at least one of the crank axle 16, the crank arm 14, and the sprocket 20 and/or 22. The electrical device 12 is at least partially provided to the crank arm 14. In the present embodiment, the electrical device 12 is entirely provided to the crank arm 14. The electrical device 12 is provided between the first end 14A and the second end 14B. The electrical device 12 is attached to an outer surface of the crank arm 14. However, the electrical device 12 can be at least partially provided inside the crank arm 14 if needed and/or desired. The electrical device 12 can be at least partially provided to at least one of the crank axle 16, the crank arm 18, and the sprocket 20 and/or 22 if needed and/or desired.

Figure 3:
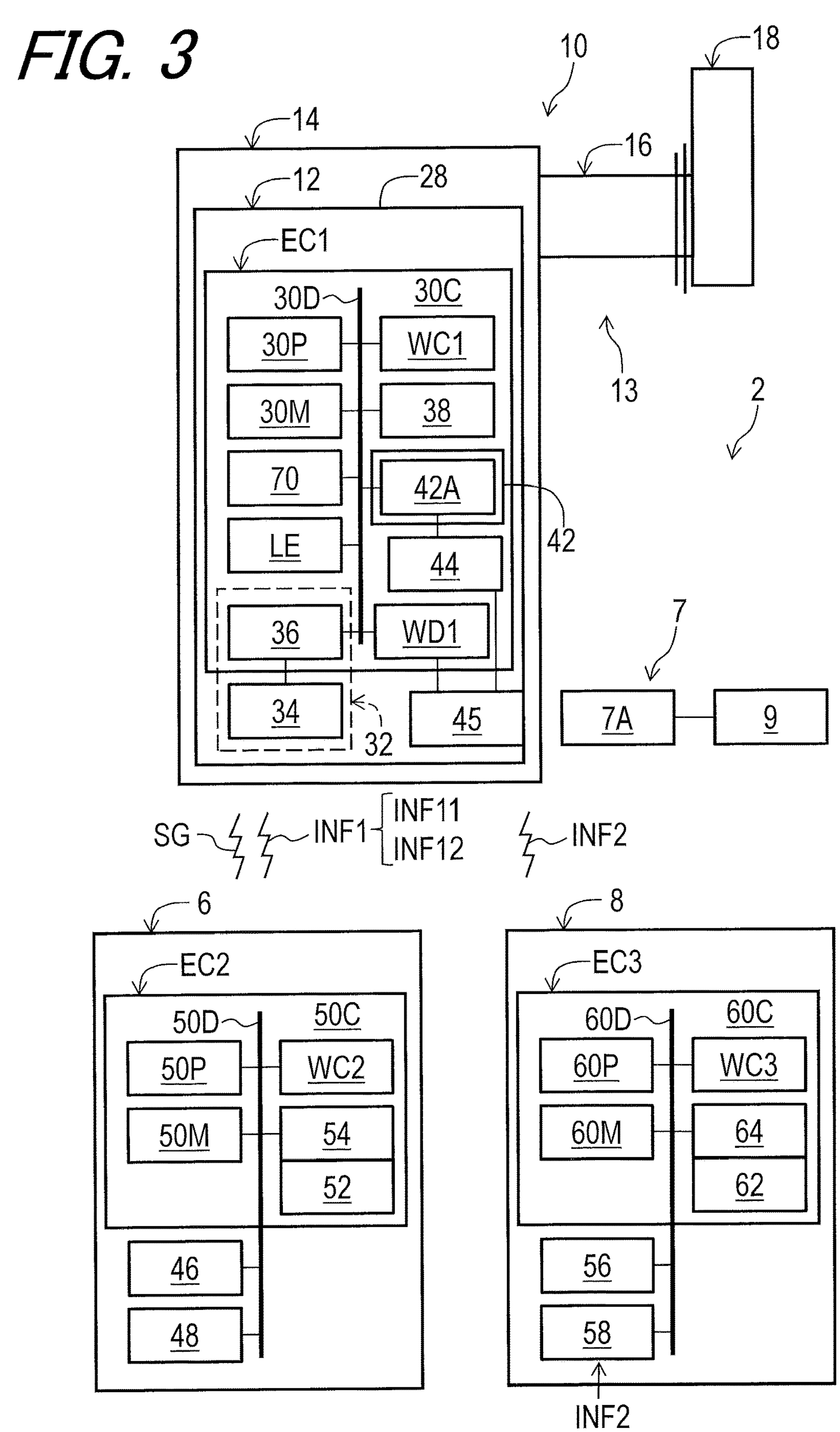
FIG. 3 is a schematic block diagram of the rotational device illustrated in FIG. 1.

As seen in FIG. 3, the electrical device 12 of the human-powered vehicle 2 comprises an electronic controller EC1. The electrical device 12 further comprises a wireless communicator WC1. The wireless communicator WC1 is configured to wirelessly communicate with an additional wireless communicator WC2 of an additional electrical device 6. The wireless communicator WC1 is configured to wirelessly transmit force relating to the rotational device 10. The electronic controller EC1 is electrically connected to the wireless communicator WC1. The electrical device 12 of the rotational device 10 for the human-powered vehicle 2 comprises a housing 28. The wireless communicator WC1 and the electronic controller EC1 are provided in the housing 28. As seen in FIG. 1, the housing 28 is configured to be mounted to the rotational device 10. The housing 28 is configured to be mounted to a mounting surface 10A of the rotational device 10. The housing 28 is attached to the crank assembly 13. The housing 28 is attached to the crank arm 14. The crank arm 14 includes the mounting surface 10A. The housing 28 is attached to the mounting surface 10A of the crank arm 14. In the present embodiment, the mounting surface 10A includes an outer surface of the rotational device 10. The mounting surface 10A includes an outer surface of the crank arm 14. However, the mounting surface 10A can include an inner surface of the rotational device 10 if needed and/or desired. The mounting surface 10A can include an inner surface of the crank arm 14 if needed and/or desired.

As seen in FIG. 3, the electronic controller EC1 includes a processor 30P, a memory 30M, a circuit board 30C, and a bus 30D. Namely, the electrical device 12 of the human-powered vehicle 2 comprises the circuit board 30C. The processor 30P is coupled to the memory 30M. The memory 30M is coupled to the processor 30P. The processor 30P and the memory 30M are electrically mounted on the circuit board 30C. The processor 30P is electrically connected to the memory 30M via the circuit board 30C and the bus 30D. The memory 30M is electrically connected to the processor 30P via the circuit board 30C and the bus 30D. The bus 30D is provided on the circuit board 30C. The electronic controller EC1 includes a semiconductor.

For example, the processor 30P includes at least one of a central processing unit (CPU), a micro processing unit (MPU), and a memory controller. The memory 30M is electrically connected to the processor 30P. For example, the memory 30M includes at least one of a volatile memory and a non-volatile memory. Examples of the volatile memory include a random-access memory (RAM) and a dynamic random-access memory (DRAM). Examples of the non-volatile memory include a read only memory (ROM), an electrically erasable programmable ROM (EEPROM), and a hard disc drive (HDD). The memory 30M includes storage areas each having an address. The processor 30P is configured to control the memory 30M to store data in the storage areas of the memory 30M and reads data from the storage areas of the memory 30M. The processor 30P can also be referred to as a hardware processor 30P. The memory 30M can also be referred to as a hardware memory 30M. The memory 30M can also be referred to as a computer-readable storage medium 30M.

The electronic controller EC1 is programed to execute at least one control algorithm of the electrical device 12. The memory 30M (e.g., the ROM) stores at least one program including at least one program instruction. The at least one program is read into the processor 30P, and thereby the at least one control algorithm of the electrical device 12 is executed based on the at least one program. The electronic controller EC1 can also be referred to as an electronic controller circuit or circuitry EC1. The electronic controller EC1 can also be referred to as a hardware electronic controller EC1.

The structure of the electronic controller EC1 is not limited to the above structure. The structure of the electronic controller EC1 is not limited to the processor 30P, the memory 30M, and the bus 30D. The electronic controller EC1 can be realized by hardware alone or a combination of hardware and software. The processor 30P and the memory 30M can be integrated as a one chip such as an application specific integrated circuit (ASIC) or a field programmable gate array (FPGA).

As seen in FIG. 3, the wireless communicator WC1 is electrically connected to the processor 30P and the memory 30M with the circuit board 30C and the bus 30D. The wireless communicator WC1 is electrically mounted on the circuit board 30C. The wireless communicator WC1 includes a signal transmitting circuit or circuitry, a signal receiving circuit or circuitry, and an antenna. Thus, the wireless communicator WC1 can also be referred to as a wireless communicator circuit or circuitry WC1.

The wireless communicator WC1 is configured to superimpose digital signals on carrier wave using a predetermined wireless communication protocol to wirelessly transmit signals. Examples of the predetermined wireless communication protocol include Wi-Fi (registered trademark), Zigbee (registered trademark), Bluetooth (registered trademark), ANT (registered trademark), and other wireless communication protocols. In the present embodiment, the wireless communicator WC1 is configured to encrypt signals using a cryptographic key to generate encrypted wireless signals. The wireless communicator WC1 is configured to transmit wireless signals via the antenna. The wireless communicator WC1 can be a one-way wireless communication device such as a receiver, or a two-way wireless communication device such as a transceiver.

The wireless communicator WC1 is configured to receive wireless signals via the antenna. In the present embodiment, the wireless communicator WC1 is configured to decode the wireless signals to recognize signals transmitted from other wireless communicators. The wireless communicator WC1 is configured to decrypt the wireless signals using the cryptographic key.

As seen in FIG. 3, the electrical device 12 further comprises a force sensor 32. The force sensor 32 is configured to obtain rotational information INF1. The rotational information INF1 includes a force applied to the rotational device 10 in the rotational direction D1 (see e.g., FIG. 1). Thus, the force sensor 32 is configured to measure the force applied to the rotational device 10. The force sensor 32 is configured to output a measurement value indicating the force applied to the rotational device 10 in the rotational direction D1. In the present embodiment, the force sensor 32 is configured to measure the force applied to the crank assembly 13. The force sensor 32 is configured to measure the force applied to the crank arm 14. However, the force sensor 32 can be configured to measure the force applied to another part of the rotational device 10 if needed and/or desired. The force sensor 32 can be configured to measure the force applied to another part (e.g., the crank axle 16, the crank arm 18) of the crank assembly 13 if needed and/or desired.

The electronic controller EC1 is configured to receive the rotational information INF1 obtained by the force sensor 32. The electronic controller EC1 is electrically connected to the force sensor 32. The electronic controller EC1 is electrically connected to the force sensor 32 to receive the rotational information INF1 obtained by the force sensor 32. The electronic controller EC1 is configured to receive the force measured by the force sensor 32. The electronic controller EC1 is electrically connected to the force sensor 32 to receive the force measured by the force sensor 32.

For example, the force sensor 32 includes a strain gauge 34 and a measurement circuit 36. The strain gauge 34 is attached to the crank assembly 13. The strain gauge 34 is attached to the crank arm 14. The strain gauge 34 is configured to output a change in electrical resistance depending on the deformation amount of the rotational device 10. The strain gauge 34 is configured to output the change in the electrical resistance depending on the deformation amount of the crank arm 14. The measurement circuit 36 is electrically connected to the strain gauge 34 to convert the output of the strain gauge 34 to a voltage indicating the deformation amount of the rotational device 10 (e.g., the crank arm 14). For example, the measurement circuit 36 constitutes a bridge circuit with the strain gauge 34.

As seen in FIG. 3, the measurement circuit 36 is electrically connected to the electronic controller EC1. The measurement circuit 36 is electrically mounted on the circuit board 30C of the electronic controller EC1. For example, the measurement circuit 36 is electrically connected to the strain gauge 34 via the circuit board 30C and an additional circuit board such as a flexible printed circuit. The electronic controller EC1 is electrically connected to the measurement circuit 36 to receive the rotational information INF1. The electronic controller EC1 is electrically connected to the measurement circuit 36 to receive the deformation amount of the rotational device 10 (e.g., the crank arm 14).

As seen in FIG. 3, the electrical device 12 further comprises a position detector 38. The position detector 38 is configured to obtain the rotational information INF1. The rotational information INF1 includes a rotational position of the rotational device 10. Thus, the position detector 38 is configured to detect the rotational position of the rotational device 10.

The electronic controller EC1 is configured to receive the rotational information INF1 obtained by the position detector 38. The electronic controller EC1 is electrically connected to the position detector 38 to receive the rotational information INF1 obtained by the position detector 38. The electronic controller EC1 is configured to receive the rotational position detected by the position detector 38. The electronic controller EC1 is electrically connected to the position detector 38 to receive the rotational position detected by the position detector 38.

In the present embodiment, the position detector 38 includes an acceleration sensor. The acceleration sensor is configured to detect an inclination angle of the crank arm 14 about the rotational axis A1 as the rotational position of the rotational device 10. The inclination angle of the crank arm 14 indicates the rotational position of the rotational device 10. Examples of the acceleration sensor include a dual-axis acceleration sensor.

The electronic controller EC1 is electrically connected to the acceleration sensor to receive the inclination angle detected by the acceleration sensor of the position detector 38. The electronic controller EC1 is configured to calculate the rotational position of the rotational device 10 based on the inclination angle detected by the acceleration sensor of the position detector 38. The position detector 38 can include other sensors such as a gyro meter or a magnetic sensor (e.g., a magnetic body and a hall sensor) instead of or in addition to the acceleration sensor if needed and/or desired.

The electronic controller EC1 is configured to count the number of revolutions of the rotational device 10 per unit time based on the rotational position detected by the position detector 38. Namely, the electronic controller EC1 is configured to obtain a rotational speed (e.g., a cadence) of the rotational device 10 based on the rotational position detected by the position detector 38. However, the electrical device 12 can include a cadence sensor which is a separate sensor from the position detector 38 if needed and/or desired. In such embodiments, the cadence sensor includes a detection object and a detector. The detection object is provided to one of the vehicle body 2A (see e.g., FIG. 1) and the rotational device 10. The detector is provided to the other of the vehicle body 2A and the rotational device 10. The detector is configured to detect the detection object.

As seen in FIG. 3, the electrical device 12 includes an electric power source 42. The electric power source 42 is electrically connected to the wireless communicator WC1, the electronic controller EC1, the force sensor 32, and the position detector 38 to supply electricity to the wireless communicator WC1, the electronic controller EC1, the force sensor 32, and the position detector 38. The electrical device 12 includes a voltage controller configured to control electricity supplied from the electric power source 42. Examples of the electric power source 42 include a battery (e.g., a primary battery, a secondary battery). In the present embodiment, the electric power source 42 includes a rechargeable battery 42A. Namely, the electrical device 12 of the human-powered vehicle 2 comprises the rechargeable battery 42A. The rechargeable battery 42A is electrically connected to the electronic controller EC1 to supply electricity to the electronic controller EC1. However, the electric power source 42 can include structures other than the rechargeable battery 42A if needed and/or desired.

The electrical device 12 includes a charging circuit 44. The charging circuit 44 is electrically connected to the rechargeable battery 42A to control charging of the rechargeable battery 42A. The charging circuit 44 is electrically mounted on the circuit board 30C of the electronic controller EC1. The charging circuit 44 is configured to start to charge the rechargeable battery 42A in a case where electricity is supplied from an external power supply to the charging circuit 44 and where the remaining level (e.g., a state of charge (SOC)) of the rechargeable battery 42A is lower than a predetermined level. The charging circuit 44 is configured to stop charging the rechargeable battery 42A in a case where the remaining level of the rechargeable battery 42A reaches the predetermined level.

The electrical device 12 of the rotational device 10 for the human-powered vehicle 2 comprises an electric connector port 45 to which the cable connector 7A of the electric cable 7 (see e.g., FIG. 8) is detachably connectable. The electric connector port 45 is electrically connected to the charging circuit 44 via the circuit board 30C of the electronic controller EC1. The rechargeable battery 42A is configured to be charged via the electric connector port 45 and the charging circuit 44. The electronic controller EC1 can be configured to communicate with another electrical device 12 via the electric connector port 45 and an electric cable for maintenance such as updating software if needed and/or desired.

The electrical device 12 includes a light emitter LE. The light emitter LE is electrically mounted on the circuit board 30C. The light emitter LE is configured to emit light. The light emitter LE includes a light emitting diode (LED). The electronic controller EC1 is electrically connected to the light emitter LE to control the light emitter LE based on a state of the rotational device 10. The light emitter LE is configured to indicate the state of the rotational device 10. For example, the light emitter LE is configured to indicate at least one of a communication status of the wireless communicator WC1, a pairing state of the wireless communicator WC1, a communication status of the wired communicator WD1, and a level of charge of the electric power source 42.

The electronic controller EC1 is configured to calculate the force based on the deformation amount of the rotational device 10 (e.g., the crank arm 14) obtained by the force sensor 32. The electronic controller EC1 is configured to calculate the force (e.g., torque) applied to the rotational device 10 based on the deformation amount of the rotational device 10 (e.g., the crank arm 14) obtained by the force sensor 32. The rotational information INF1 includes power INF11 applied to the rotational device 10 and a rotational speed INF12 of the rotational device 10. For example, the electronic controller EC1 is configured to calculate the power INF11 applied to the rotational device 10 based on the torque applied to the rotational device 10 (e.g., the crank arm 14) and the rotational speed INF12 of the rotational device 10. However, the electronic controller EC1 can be configured to calculate the power INF11 applied to the rotational device 10 based on other data if needed and/or desired. For example, the electronic controller EC1 can be configured to calculate an average of the power INF11 during one revolution of the crank arm 14. For example, the electronic controller EC1 can be configured to calculate total power during one revolution of the crank assembly 13 by doubling the power INF11 on the only one crank arm.

The electronic controller EC1 is configured to control the wireless communicator WC1 to wirelessly transmit the rotational information INF1. The electronic controller EC1 is configured to control the wireless communicator WC1 to wirelessly transmit the power INF11 calculated by the electronic controller EC1 based on the force detected by the force sensor 32. The electronic controller EC1 is configured to control the wireless communicator WC1 to wirelessly transmit the rotational speed INF12 calculated by the electronic controller EC1.

The electrical device 12 is configured to communicate with the additional electrical device 6. The additional electrical device 6 is configured to wirelessly receive the rotational information INF1 (e.g., the power INF11, the rotational speed INF12) from the electrical device 12. The additional electrical device 6 is configured to wirelessly transmit a signal SG to the electrical device 12 at predetermined intervals. The electrical device 12 is configured to recognize that the wireless communication is normal between the electrical device 12 and the additional electrical device 6 based on the signal SG. Examples of the additional electrical device 6 include a cyclocomputer, a smartphone, and a tablet computer.

The additional electrical device 6 includes the additional wireless communicator WC2, an additional electronic controller EC2, a display 46, and a user interface 48. The additional electronic controller EC2 is electrically connected to the additional wireless communicator WC2, the display 46, and the user interface 48 to control the additional wireless communicator WC2, the display 46, and the user interface 48.

The additional wireless communicator WC2 is configured to wirelessly receive the rotational information INF1 from the wireless communicator WC1. The additional electronic controller EC2 is electrically connected to the additional wireless communicator WC2 to receive the rotational information INF1 (e.g., the power INF11, the rotational speed INF12) wirelessly received by the additional wireless communicator WC2.

As seen in FIG. 3, the additional electronic controller EC2 includes a processor 50P, a memory 50M, a circuit board 50C, and a bus 50D. The processor 50P is coupled to the memory 50M. The memory 50M is coupled to the processor 50P. The processor 50P and the memory 50M are electrically mounted on the circuit board 50C. The processor 50P is electrically connected to the memory 50M via the circuit board 50C and the bus 50D. The memory 50M is electrically connected to the processor 50P via the circuit board 50C and the bus 50D. The bus 50D is provided on the circuit board 50C. The additional electronic controller EC2 includes a semiconductor.

For example, the processor 50P includes at least one of a CPU, a MPU, and a memory controller. The memory 50M is electrically connected to the processor 50P. For example, the memory 50M includes at least one of a volatile memory and a non-volatile memory. Examples of the volatile memory include a RAM and a DRAM. Examples of the non-volatile memory include a ROM, an EEPROM, and an HDD. The memory 50M includes storage areas each having an address. The processor 50P is configured to control the memory 50M to store data in the storage areas of the memory 50M and reads data from the storage areas of the memory 50M. The processor 50P can also be referred to as a hardware processor 50P. The memory 50M can also be referred to as a hardware memory 50M. The memory 50M can also be referred to as a computer-readable storage medium 50M.

The additional electronic controller EC2 is programed to execute at least one control algorithm of the additional electrical device 6. The memory 50M (e.g., the ROM) stores at least one program including at least one program instruction. The at least one program is read into the processor 50P, and thereby the at least one control algorithm of the additional electrical device 6 is executed based on the at least one program. The additional electronic controller EC2 can also be referred to as an electronic controller circuit or circuitry EC2. The additional electronic controller EC2 can also be referred to as an additional hardware electronic controller EC2.

The structure of the additional electronic controller EC2 is not limited to the above structure. The structure of the additional electronic controller EC2 is not limited to the processor 50P, the memory 50M, and the bus 50D. The additional electronic controller EC2 can be realized by hardware alone or a combination of hardware and software. The processor 50P and the memory 50M can be integrated as a one chip such as an ASIC or a FPGA.

As seen in FIG. 3, the additional wireless communicator WC2 is electrically connected to the processor 50P and the memory 50M with the circuit board 50C and the bus 50D. The additional wireless communicator WC2 is electrically mounted on the circuit board 50C. The additional wireless communicator WC2 includes a signal transmitting circuit or circuitry, a signal receiving circuit or circuitry, and an antenna. Thus, the additional wireless communicator WC2 can also be referred to as an additional wireless communicator circuit or circuitry WC2.

The additional wireless communicator WC2 is configured to superimpose digital signals on carrier wave using a predetermined wireless communication protocol to wirelessly transmit signals. Examples of the predetermined wireless communication protocol include Wi-Fi (registered trademark), Zigbee (registered trademark), Bluetooth (registered trademark), ANT (registered trademark), and other wireless communication protocols. In the present embodiment, the additional wireless communicator WC2 is configured to encrypt signals using a cryptographic key to generate encrypted wireless signals. The additional wireless communicator WC2 is configured to transmit wireless signals via the antenna. The additional wireless communicator WC2 can be a one-way wireless communication device such as a receiver, or a two-way wireless communication device such as a transceiver.

The additional wireless communicator WC2 is configured to receive wireless signals via the antenna. In the present embodiment, the additional wireless communicator WC2 is configured to decode the wireless signals to recognize signals transmitted from other additional wireless communicators. The additional wireless communicator WC2 is configured to decrypt the wireless signals using the cryptographic key.

The display 46 is configured to display the rotational information INF1 (e.g., the power INF11, the rotational speed INF12) wirelessly transmitted from the wireless communicator WC1 of the electrical device 12. The additional electronic controller EC2 is configured to control the display 46 to display the rotational information INF1 (e.g., the power INF11, the rotational speed INF12).

The user interface 48 is configured to receive a user input. Examples of the user interface 48 include a mouse, a keyboard, and a touch panel. The additional electronic controller EC2 is configured to receive the user input via the user interface 48.

The additional electrical device 6 includes an electric power source 52 and a power-source holder 54. The electric power source 52 is electrically connected to the additional wireless communicator WC2, the additional electronic controller EC2, the display 46, and the user interface 48 to supply electricity to the additional wireless communicator WC2, the additional electronic controller EC2, the display 46, and the user interface 48. The power-source holder 54 is electrically connected to the additional wireless communicator WC2, the additional electronic controller EC2, the display 46, and the user interface 48 to supply electricity from the electric power source 52 to the additional wireless communicator WC2, the additional electronic controller EC2, the display 46, and the user interface 48. The power-source holder 54 is configured to detachably hold the electric power source 52. Examples of the electric power source 52 include a battery (e.g., a primary battery, a secondary battery).

As seen in FIG. 3, the electrical device 12 is configured to communicate with an external electrical device 8. The external electrical device 8 is configured to receive a user input INF2 from the user. The external electrical device 8 is configured transmit the user input INF2 to the electrical device 12. The electronic controller EC1 is configured to receive the user input INF2 from the external electrical device 8. Examples of the external electrical device 8 include a cyclocomputer, a smartphone, a tablet computer, and a personal computer.

The external electrical device 8 includes an external wireless communicator WC3, an external electronic controller EC3, a display 56, and a user interface 58. The external electronic controller EC3 is electrically connected to the external wireless communicator WC3, the display 56, and the user interface 58 to control the external wireless communicator WC3, the display 56, and the user interface 58.

As seen in FIG. 3, the external electronic controller EC3 includes a processor 60P, a memory 60M, a circuit board 60C, and a bus 60D. The processor 60P is coupled to the memory 60M. The memory 60M is coupled to the processor 60P. The processor 60P and the memory 60M are electrically mounted on the circuit board 60C. The processor 60P is electrically connected to the memory 60M via the circuit board 60C and the bus 60D. The memory 60M is electrically connected to the processor 60P via the circuit board 60C and the bus 60D. The bus 60D is provided on the circuit board 60C. The external electronic controller EC3 includes a semiconductor.

For example, the processor 60P includes at least one of a CPU, a MPU, and a memory controller. The memory 60M is electrically connected to the processor 60P. For example, the memory 60M includes at least one of a volatile memory and a non-volatile memory. Examples of the volatile memory include a RAM and a DRAM. Examples of the non-volatile memory include a ROM, an EEPROM, and an HDD. The memory 60M includes storage areas each having an address. The processor 60P is configured to control the memory 60M to store data in the storage areas of the memory 60M and reads data from the storage areas of the memory 60M. The processor 60P can also be referred to as a hardware processor 60P. The memory 60M can also be referred to as a hardware memory 60M. The memory 60M can also be referred to as a computer-readable storage medium 60M.

The external electronic controller EC3 is programed to execute at least one control algorithm of the external electrical device 8. The memory 60M (e.g., the ROM) stores at least one program including at least one program instruction. The at least one program is read into the processor 60P, and thereby the at least one control algorithm of the external electrical device 8 is executed based on the at least one program. The external electronic controller EC3 can also be referred to as an electronic controller circuit or circuitry EC3. The external electronic controller EC3 can also be referred to as a hardware external electronic controller EC3.

The structure of the external electronic controller EC3 is not limited to the above structure. The structure of the external electronic controller EC3 is not limited to the processor 60P, the memory 60M, and the bus 60D. The external electronic controller EC3 can be realized by hardware alone or a combination of hardware and software. The processor 60P and the memory 60M can be integrated as a one chip such as an ASIC or a FPGA.

The external wireless communicator WC3 is configured to wirelessly communicate with another wireless communicator such as the wireless communicator WC1 and the additional wireless communicator WC2. However, the external electrical device 8 can include an external wired communicator if needed and/or desired. The external wired communicator is configured to communicate with the electrical device 12 via an electric cable using power line communication (PLC) technology.

As seen in FIG. 3, the external wireless communicator WC3 is electrically connected to the processor 60P and the memory 60M with the circuit board 60C and the bus 60D. The external wireless communicator WC3 is electrically mounted on the circuit board 60C. The external wireless communicator WC3 includes a signal transmitting circuit or circuitry, a signal receiving circuit or circuitry, and an antenna. Thus, the external wireless communicator WC3 can also be referred to as an external wireless communicator circuit or circuitry WC3.

The external wireless communicator WC3 is configured to superimpose digital signals on carrier wave using a predetermined wireless communication protocol to wirelessly transmit signals. Examples of the predetermined wireless communication protocol include Wi-Fi (registered trademark), Zigbee (registered trademark), Bluetooth (registered trademark), ANT (registered trademark), and other wireless communication protocols. In the present embodiment, the external wireless communicator WC3 is configured to encrypt signals using a cryptographic key to generate encrypted wireless signals. The external wireless communicator WC3 is configured to transmit wireless signals via the antenna. The external wireless communicator WC3 can be a one-way wireless communication device such as a receiver, or a two-way wireless communication device such as a transceiver.

The external wireless communicator WC3 is configured to receive wireless signals via the antenna. In the present embodiment, the external wireless communicator WC3 is configured to decode the wireless signals to recognize signals transmitted from other external wireless communicators. The external wireless communicator WC3 is configured to decrypt the wireless signals using the cryptographic key.

The display 56 is configured to display information relating to the human-powered vehicle 2. The external electronic controller EC3 is configured to control the display 56 to display the information relating to the human-powered vehicle 2. For example, the information relating to the human-powered vehicle 2 includes the rotational information INF1 and the settings of the rotational device 10.

The user interface 58 is configured to receive the user input INF2. Examples of the user interface 58 include a mouse, a keyboard, and a touch panel. The external electronic controller EC3 is configured to receive the user input via the user interface 58. The external electronic controller EC3 is configured to receive the user input INF2 via the user interface 58.

The electronic controller EC1 is configured to receive the user input INF2 from the external electrical device 8. The electronic controller EC1 is configured to receive the user input INF2 via the wireless communicator WC1 and the external wireless communicator WC3. For example, the electronic controller EC1 is configured to change settings based on the user input INF2.

The external electrical device 8 includes an electric power source 62 and a power-source holder 64. The electric power source 62 is electrically connected to the external wireless communicator WC3, the external electronic controller EC3, the display 56, and the user interface 58 to supply electricity to the external wireless communicator WC3, the external electronic controller EC3, the display 56, and the user interface 58. The power-source holder 64 is electrically connected to the external wireless communicator WC3, the external electronic controller EC3, the display 56, and the user interface 58 to supply electricity from the electric power source 62 to the external wireless communicator WC3, the external electronic controller EC3, the display 56, and the user interface 58. The power-source holder 64 is configured to detachably hold the electric power source 62. Examples of the electric power source 62 include a battery (e.g., a primary battery, a secondary battery).

As seen in FIG. 3, the electronic controller EC1 is configured to control the wireless communicator WC1 to wirelessly transmit the rotational information INF1 at predetermined intervals. The electronic controller EC1 is configured to control the wireless communicator WC1 to wirelessly transmit the rotational information INF1 using wireless signals at the predetermined intervals. The electronic controller EC1 is configured to control the wireless communicator WC1 to wirelessly transmit the power INF11 and the rotational speed INF12 using the wireless signals at the predetermined intervals.

The additional wireless communicator WC2 of the additional electrical device 6 is configured to wirelessly receive the rotational information INF1 transmitted from the wireless communicator WC1 of the electrical device 12 at the predetermined intervals. The additional wireless communicator WC2 of the additional electrical device 6 is configured to wirelessly receive the power INF11 and the rotational speed INF12 transmitted from the wireless communicator WC1 of the electrical device 12 at the predetermined intervals.

The additional electronic controller EC2 of the additional electrical device 6 is configured to control the display 46 to display the rotational information INF1 wirelessly received by the additional wireless communicator WC2 at the predetermined intervals. The additional electronic controller EC2 is configured to control the display 46 to display the power INF11 and the rotational speed INF12 wirelessly received by the additional wireless communicator WC2 at the predetermined intervals. The additional electronic controller EC2 is configured to control the display 46 to display the latest values of the power INF11 and the rotational speed INF12. Thus, the user can recognize the power INF11 and the rotational speed INF12 of the rotational device 10 via the display 46 of the additional electrical device 6 during pedaling.

Figure 4:
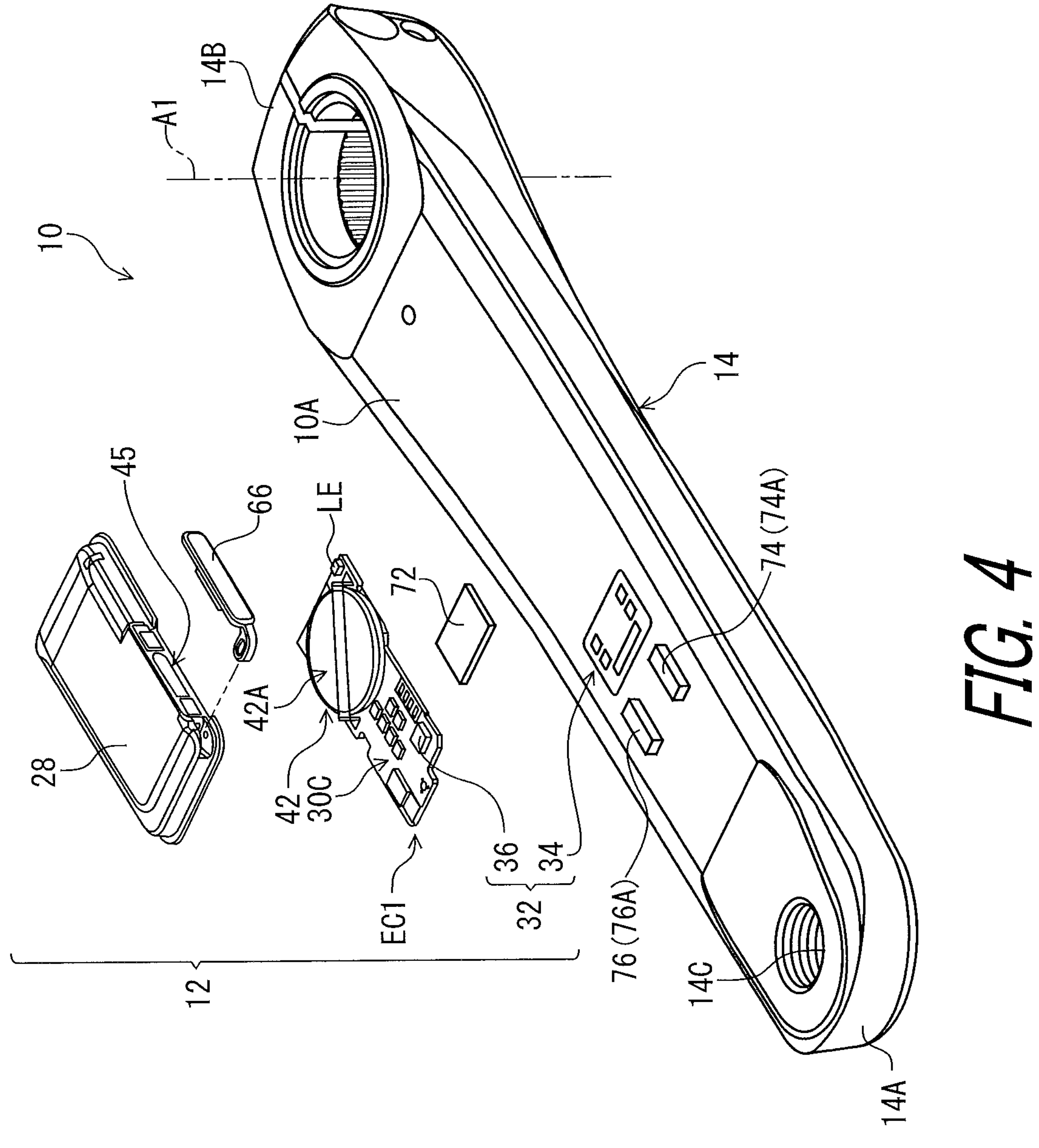
FIG. 4 is an exploded perspective view of an electrical device of the rotational device illustrated in FIG. 1.

As seen in FIG. 4, for example, the strain gauge 34 is coupled to the crank arm 14. The circuit board 30C is coupled to the crank arm 14. The housing 28 is coupled to the crank arm 14.

The electrical device 12 of the rotational device 10 for the human-powered vehicle 2 comprises a port cover 66. The port cover 66 is attachable to the housing 28 to cover the electric connector port 45 at least partially. The port cover 66 is configured to be attached to the housing 28 to cover at least partially the electric connector port 45. The port cover 66 is movably coupled to the housing 28. The port cover 66 is pivotally coupled to the housing 28. The port cover 66 at least partially covers the electric connector port 45 in a cover state. The port cover 66 allows the user to access the electric connector port 45 in an open state.

Figure 5:
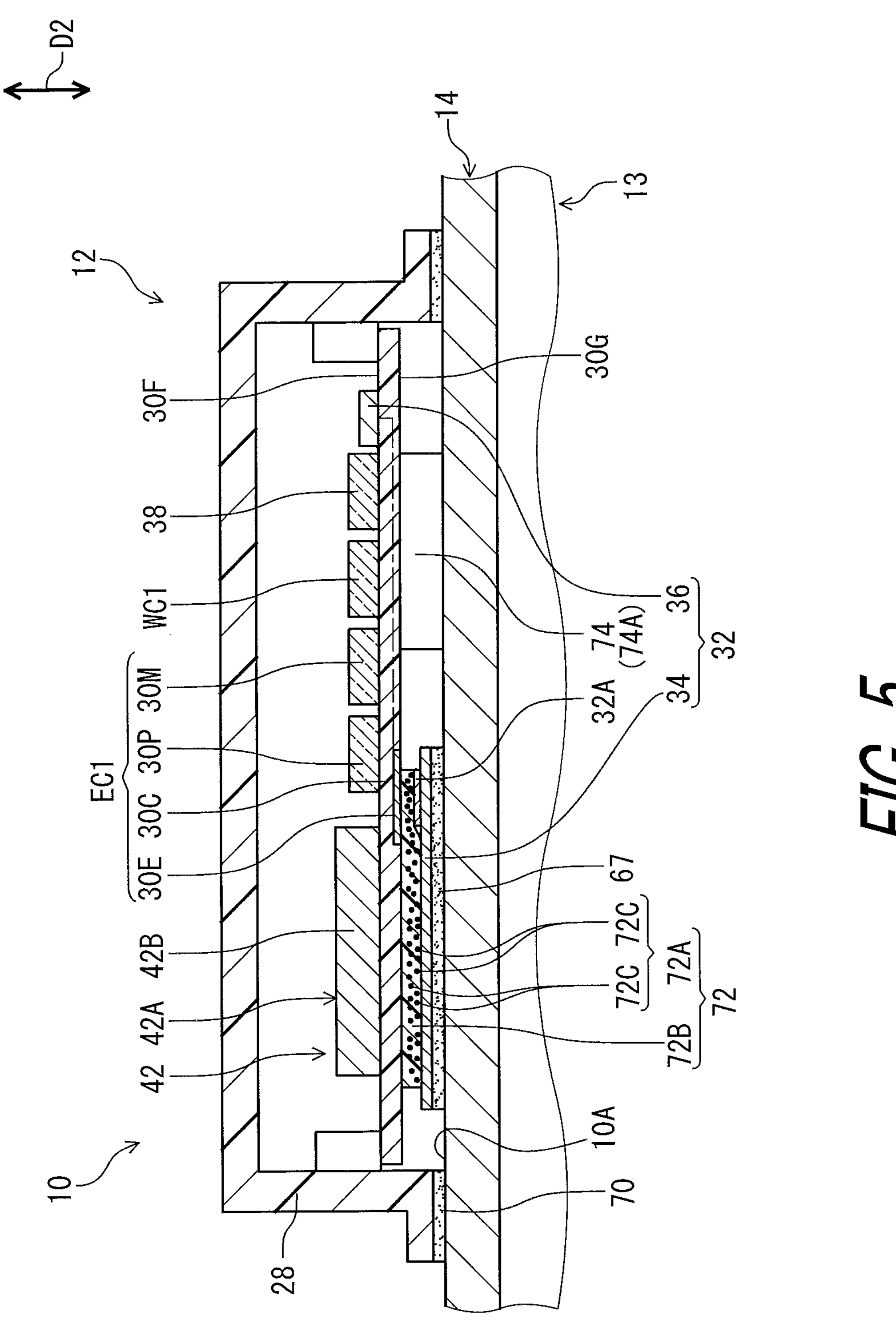
FIG. 5 is a schematic cross-sectional view of the rotational device illustrated in FIG. 1.

As seen in FIG. 5, the strain gauge 34 is attached to the crank arm 14 with an adhesive agent 67. The circuit board 30C is coupled to the crank arm 14. The housing 28 is attached to the crank arm 14 with an adhesive agent 70.

The electrical device 12 of the human-powered vehicle 2 comprises a terminal member 72. The terminal member 72 is configured to be at least partially provided between the circuit board 30C and the additional device 13 in an attachment state where the circuit board 30C is attached to the additional device 13. In the present embodiment, the terminal member 72 is configured to entirely provided between the circuit board 30C and the additional device 13 in the attachment state where the circuit board 30C is attached to the additional device 13. The terminal member 72 is configured to entirely provided between the circuit board 30C and the additional device 13 in the attachment state where the circuit board 30C is attached to the crank arm 14 of the additional device 13. However, the terminal member 72 can be configured to partially provided between the circuit board 30C and the additional device 13 in the attachment state if needed and/or desired.

The terminal member 72 is configured to be at least partially provided between the circuit board 30C and the force sensor 32 in the attachment state. The terminal member 72 is configured to be at least partially provided between the circuit board 30C and the strain gauge 34 in the attachment state. In the present embodiment, the terminal member 72 is configured to be partially provided between the circuit board 30C and the force sensor 32 in the attachment state. The terminal member 72 is configured to be entirely provided between the circuit board 30C and the strain gauge 34 in the attachment state. However, the terminal member 72 can be configured to be entirely provided between the circuit board 30C and the force sensor 32 in the attachment state if needed and/or desired. The terminal member 72 can be configured to be partially provided between the circuit board 30C and the strain gauge 34 in the attachment state if needed and/or desired.

The force sensor 32 is configured to measure the force applied to the additional device 13 in the attachment state. The force sensor 32 is configured to measure the force applied to the crank arm 14 in the attachment state. The force sensor 32 is configured to be at least partially attached to the additional device 13 in the attachment state. In the present embodiment, the force sensor 32 is configured to be partially attached to the additional device 13 in the attachment state. The strain gauge 34 is configured to be entirely attached to the crank arm 14 in the attachment state. However, the force sensor 32 can be configured to be entirely attached to the additional device 13 in the attachment state if needed and/or desired. The strain gauge 34 can be configured to be partially attached to the crank arm 14 in the attachment state.

The circuit board 30C includes a first electrically conductive body 30E. The terminal member 72 includes a second electrically conductive body 72A. The terminal member 72 is configured to elastically maintain contact between the first electrically conductive body 30E and the second electrically conductive body 72A in the attachment state. The terminal member 72 is deformable to elastically maintain contact between the first electrically conductive body 30E and the second electrically conductive body 72A in the attachment state. The second electrically conductive body 72A is in contact with the first electrically conductive body 30E in the attachment state.

The force sensor 32 includes a third electrically conductive body 32A. The strain gauge 34 includes the third electrically conductive body 32A. The terminal member 72 is configured to elastically maintain contact between the second electrically conductive body 72A and the third electrically conductive body 32A in the attachment state. The terminal member 72 is deformable to elastically maintain contact between the second electrically conductive body 72A and the third electrically conductive body 32A in the attachment state. The second electrically conductive body 72A is configured to electrically connect the first electrically conductive body 30E and the third electrically conductive body 32A in a deformed state where the terminal member 72 is elastically deformed between the first electrically conductive body 30E and the third electrically conductive body 32A. The second electrically conductive body 72A is in contact with the third electrically conductive body 32A in the attachment state.

The terminal member 72 includes a base body 72B made of a non-metallic material. The base body 72B is elastically deformable. For example, the base body 72B is made of a resin material. The second electrically conductive body 72A is coupled to the base body 72B. The second electrically conductive body 72A is provided in the base body 72B. Examples of the terminal member 72 include at least one of an anisotropic conductive film, an elastic member with conductive particles, a telescopic contact, and a spring contact. In the present embodiment, the terminal member 72 includes an anisotropic conductive film. The second electrically conductive body 72A includes at least two conductive particles 72C provided in the base body 72B. However, the terminal member 72 can include structures other than the anisotropic conductive film if needed and/or desired.

The circuit board 30C includes a first surface 30F and a second surface 30G provided on a reverse side of the first surface 30F. The rechargeable battery 42A is provided on the first surface 30F. The terminal member 72 is provided between the second surface 30G and the crank arm 14. The strain gauge 34 is provided between the second surface 30G and the crank arm 14.

The first electrically conductive body 30E is at least partially provided on each of the first surface 30F and the second surface 30G. The first electrically conductive body 30E is at least partially provided in the circuit board 30C. A part of the first electrically conductive body 30E provided on the first surface 30F is electrically connected to a part of the first electrically conductive body 30E provided on the second surface 30G. The first electrically conductive body 30E includes pads, lands, through-holes, and vias. The first electrically conductive body 30E is made of an electrical conducting material such as copper.

As seen in FIG. 4, the electrical device 12 includes spacers 74 and 76. The spacers 74 and 76 are provided between the crank arm 14 and the circuit board 30C. For example, each of the spacers 74 and 76 is made of a material having electric insulation. Each of the spacers 74 and 76 is elastically deformable. Each of the spacers 74 and 76 is made of an elastic material having electric insulation. Each of the spacers 74 and 76 can be attached to the crank arm 14 with an adhesive agent. Each of the spacers 74 and 76 can be attached to the circuit board 30C with an adhesive agent. In the present embodiment, the spacer 74 is a separate member from the spacer 76 and is spaced apart from the spacer 76. However, the spacer 74 can be integrally provided with the spacer 76 as a one-piece unitary member if needed and/or desired.

Figure 6:
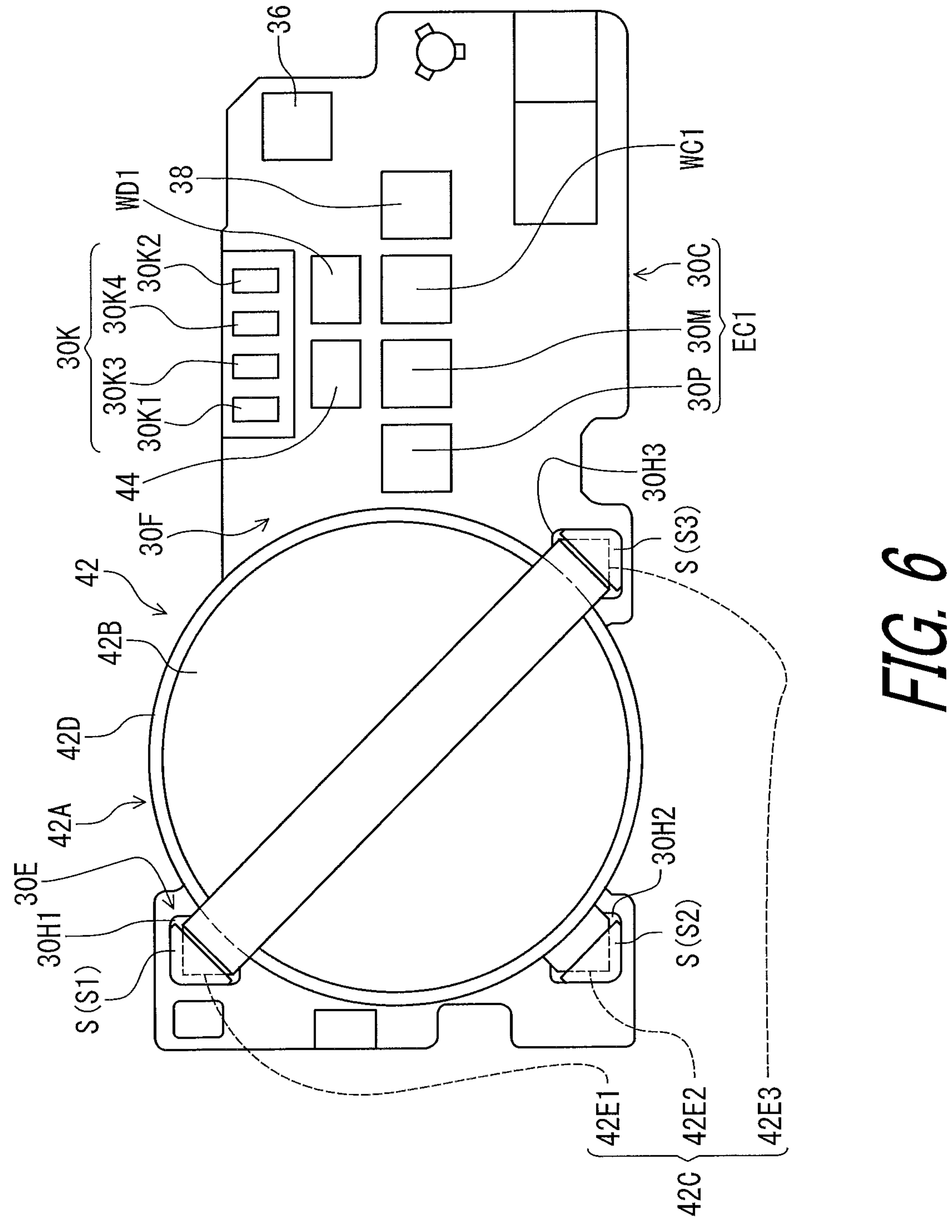
FIG. 6 is a plan view of a part of the electrical device illustrated in in FIG. 1.

As seen in FIG. 6, the rechargeable battery 42A is directly connected to the first electrically conductive body 30E of the circuit board 30C via solder S. The rechargeable battery 42A is directly connected to the first electrically conductive body 30E via solder S without a battery holder. However, the electrical device 12 can include a battery holder configured to detachably hold the rechargeable battery 42A if needed and/or desired.

The rechargeable battery 42A includes a battery body 42B and a battery terminal 42C protruding from the battery body 42B. The battery terminal 42C is directly connected to the first electrically conductive body 30E via solder.

As seen in FIG. 6, the battery body 42B has a circular outline 42D when viewed in a perpendicular direction D2 (see e.g., FIG. 5) perpendicular to the first surface 30F. The battery terminal 42C protrudes from the battery body 42B beyond the circular outline 42D when viewed in the perpendicular direction D2.

The battery terminal 42C includes a first terminal part 42E1 and a second terminal part 42E2 spaced apart from the first terminal part 42E1. The first terminal part 42E1 protrudes radially outwardly from the battery body 42B. The second terminal part 42E2 protrudes radially outwardly from the battery body 42B. The first terminal part 42E1 is directly connected to the first electrically conductive body 30E via first solder S1. The second terminal part 42E2 is directly connected to the first electrically conductive body 30E via second solder S2.

The battery terminal 42C includes a third terminal part 42E3. The third terminal part 42E3 is spaced apart from the first terminal part 42E1 and the second terminal part 42E2. The third terminal part 42E3 protrudes radially outwardly from the battery body 42B. The third terminal part 42E3 is directly connected to the first electrically conductive body 30E via third solder S3.

The first electrically conductive body 30E includes a first electrically conductive part 30H1, a second electrically conductive part 30H2, and a third electrically conductive part 30H3. The first terminal part 42E1 is electrically connected to the first electrically conductive part 30H1 via the first solder S1. The second terminal part 42E2 is electrically connected to the second electrically conductive part 30H2 via the second solder S2. The third terminal part 42E3 is electrically connected to the third electrically conductive part 30H3 via the third solder S3.

In the present embodiment, the first terminal part 42E1 is a plus terminal. The second terminal part 42E2 is a minus terminal. The third terminal part 42E3 is a plus terminal. However, the first terminal part 42E1 can be a minus terminal if needed and/or desired. The second terminal part 42E2 can be a plus terminal if needed and/or desired. The third terminal part 42E3 can be a minus terminal if needed and/or desired. The third terminal part 42E3 can be omitted from the battery terminal 42C if needed and/or desired. The arrangement of the first terminal part 42E1, the second terminal part 42E2, and the third terminal part 42E3 is not limited to the illustrated arrangement.

As seen in FIG. 5, the battery body 42B is provided on the first surface 30F. The circuit board 30C is provided between the rechargeable battery 42A and the terminal member 72. The circuit board 30C is provided between the rechargeable battery 42A and the strain gauge 34. However, the rechargeable battery 42A can be provided on the second surface 30G if needed and/or desired. The structure of the electric power source 42 is not limited to the illustrated embodiment.

Figure 7:
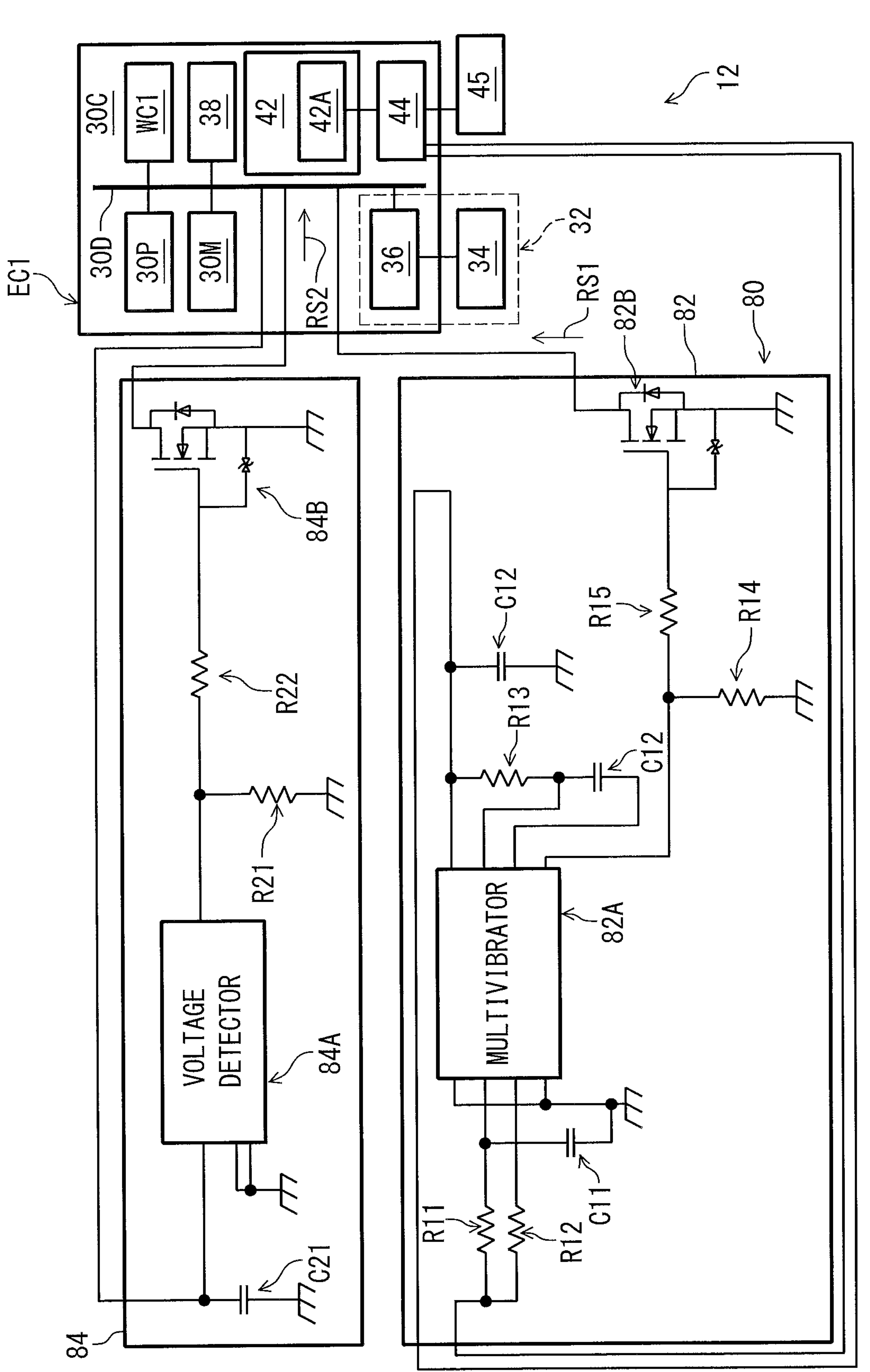
FIG. 7 is a schematic block diagram of the rotational device illustrated in FIG. 1.

As seen in FIG. 7, the electrical device 12 of the human-powered vehicle 2 comprises a reset circuit 80. The reset circuit 80 is electrically connected to the electronic controller EC1 to reset the electronic controller EC1 based on one of start and completion of charging the rechargeable battery 42A configured to supply electricity to the electronic controller EC1. The reset circuit 80 is configured to detect the one of start and completion of charging the rechargeable battery 42A. The reset circuit 80 is configured to generate a reset signal RS1 based on the one of start and completion of charging the rechargeable battery 42A. The electronic controller EC1 is configured to be reset in response to the reset signal RS1. For example, the electronic controller EC1 is configured to set a program counter to zero, to restore states of electric components of the electronic controller EC1 to default states, to restore at least one of a timer, an input port, and an output port to default states, and/or to restore all interrupts to prohibited states.

In the present embodiment, the reset circuit 80 is configured to reset the electronic controller EC1 based on the start of charging the rechargeable battery 42A. However, the reset circuit 80 can be configured to reset the electronic controller EC1 based on the completion of charging the rechargeable battery 42A if needed and/or desired.

The reset circuit 80 includes a first reset circuit 82 and a second reset circuit 84. The first reset circuit 82 is configured to detect the one of start and completion of charging the rechargeable battery 42A. The first reset circuit 82 is configured to generate the reset signal RS1 based on the one of start and completion of charging the rechargeable battery 42A. For example, the first reset circuit 82 includes resistors R11 to R15, capacitors C11 to C13, a multivibrator 82A (e.g., a monostable multivibrator), and a signal generation circuit 82B (e.g., a metal-oxide-semiconductor field-effect transistor (MOSFET)). However, the structure of the first reset circuit 82 is not limited to the illustrated structure.

The second reset circuit 84 is configured to detect the remaining level of the rechargeable battery 42A. The second reset circuit 84 is configured to generate an additional reset signal RS2 if the remaining level of the rechargeable battery 42A is lower than a reset level threshold. For example, the second reset circuit 84 includes resistors R21 and R22, a capacitor C21, a voltage detector 84A, and a signal generation circuit 84B (e.g., a MOSFET). However, the structure of the second reset circuit 84 is not limited to the illustrated structure.

The electronic controller EC1 is configured to be reset in response to one of the reset signal RS1 and the additional reset signal RS2. However, at least one of the first reset circuit 82 and the second reset circuit 84 can be omitted from the electrical device 12 if needed and/or desired. The reset circuit 80 can be omitted from the electrical device 12 if needed and/or desired.

Figure 8:
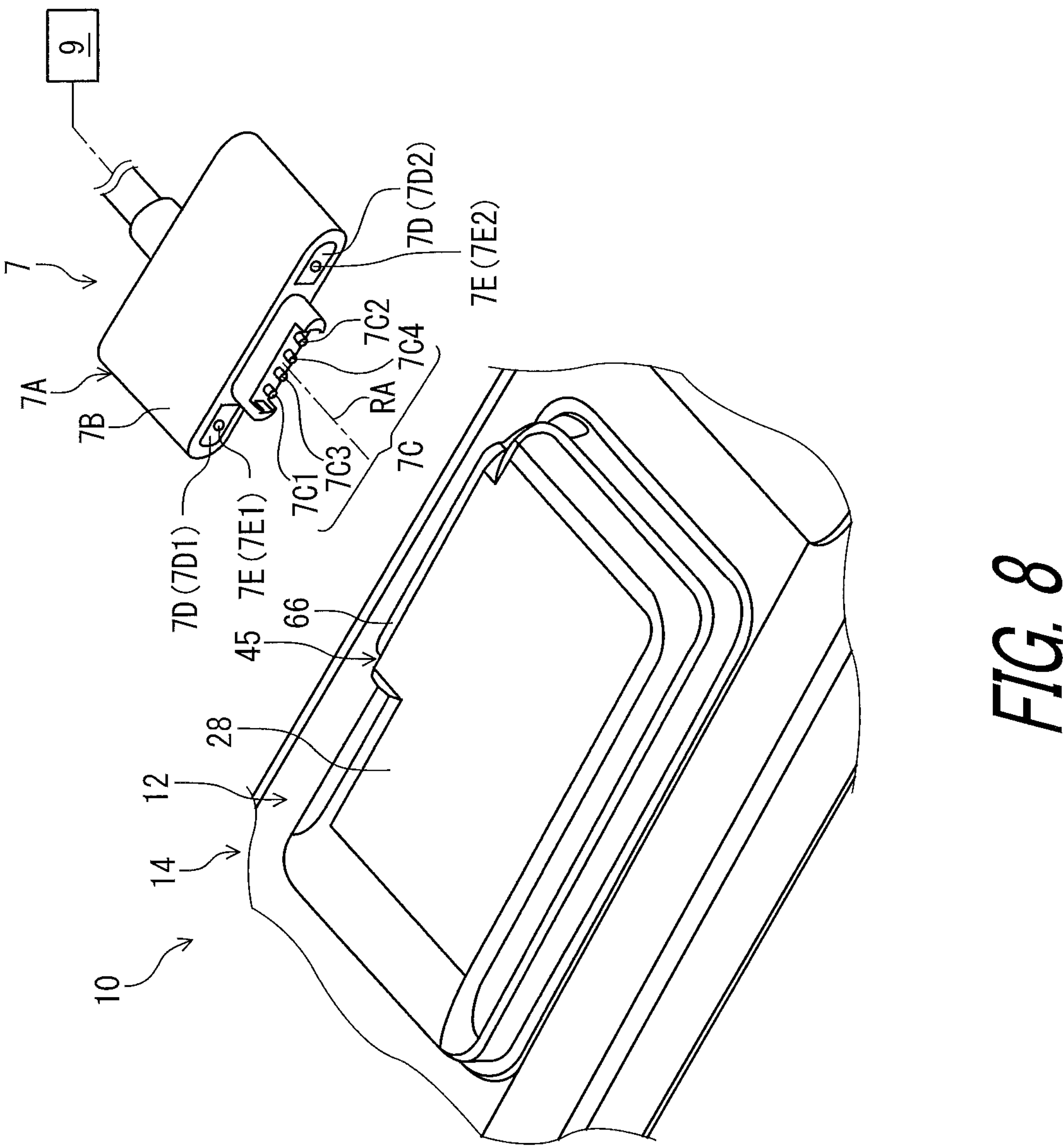
FIG. 8 is a perspective view of the electrical device illustrated in FIG. 1, with an electric cable.

As seen in FIG. 8, the electric cable 7 is connected to the electric connector port 45 when the rechargeable battery 42A of the electric power source 42 is charged via the electric cable 7. The electric cable 7 includes the cable connector 7A. The cable connector 7A includes a connector body 7B, at least one terminal 7C, and at least one magnet 7D. The at least one terminals 7C and the at least one magnet 7D are provided to the connector body 7B. The at least one terminal 7C is at least partially provided in the cable connector 7A. The at least one magnet 7D is at least partially provided in the cable connector 7A.

In the present embodiment, the at least one terminal 7C includes a first terminal 7C1, a second terminal 7C2, a third terminal 7C3, and a fourth terminal 7C4. The at least one magnet 7D includes a first magnet 7D1 and a second magnet 7D2. Each of the first terminal 7C1, the second terminal 7C2, the third terminal 7C3, and the fourth terminal 7C4 is partially provided in the connector body 7B. Each of the first terminal 7C1, the second terminal 7C2, the third terminal 7C3, and the fourth terminal 7C4 protrudes from the connector body 7B. Each of the first magnet 7D1 and the second magnet 7D2 is partially provided in the connector body 7B. Each of the first magnet 7D1 and the second magnet 7D2 is exposed from the connector body 7B.

However, at least one of the first terminal 7C1, the second terminal 7C2, the third terminal 7C3, and the fourth terminal 7C4 can be entirely provided in the connector body 7B if needed and/or desired. At least one of the first magnet 7D1 and the second magnet 7D2 can be entirely provided in the connector body 7B if needed and/or desired. The total number of the at least one terminal 7C is not limited to the illustrated embodiment. The total number of the at least one magnet 7D is not limited to the illustrated embodiment. The first terminal 7C1 can also be referred to as a terminal 7C or 7C1. The second terminal 7C2 can also be referred to as a terminal 7C or 7C2. The third terminal 7C3 can also be referred to as a terminal 7C or 7C3. The fourth terminal 7C4 can also be referred to as a terminal 7C or 7C4. The first magnet 7D1 can also be referred to as a magnet 7D or 7D1. The second magnet 7D2 can also be referred to as a magnet 7D or 7D2. The third magnet 7D3 can also be referred to as a magnet 7D or 7D3. The fourth magnet 7D4 can also be referred to as a magnet 7D or 7D4.

The cable connector 7A includes at least one additional terminal 7E. The at least one additional terminal 7E is provided to the connector body 7B. The additional terminal 7E is at least partially provided in the cable connector 7A. In the present embodiment, the at least one additional terminal 7E includes a first additional terminal 7E1 and a second additional terminal 7E2. Each of the first additional terminal 7E1 and the second additional terminal 7E2 is partially provided in the connector body 7B. Each of the first additional terminal 7E1 and the second additional terminal 7E2 is exposed from the connector body 7B. However, at least one of the first additional terminal 7E1 and the second additional terminal 7E2 can be entirely provided in the connector body 7B if needed and/or desired. The total number of the at least one additional terminal 7E is not limited to the illustrated embodiment.

The first additional terminal 7E1 is at least partially provided in the first magnet 7D1. The second additional terminal 7E2 is at least partially provided in the second magnet 7D2. In the present embodiment, the first additional terminal 7E1 is partially provided in the first magnet 7D1. The second additional terminal 7E2 is partially provided in the second magnet 7D2. The first additional terminal 7E1 is exposed from the first magnet 7D1. The second additional terminal 7E2 is exposed from the second magnet 7D2. However, the first additional terminal 7E1 can be entirely provided in the first magnet 7D1 if needed and/or desired. The second additional terminal 7E2 can be entirely provided in the second magnet 7D2 if needed and/or desired.

The cable connector 7A has a structure which is symmetrical with respect to a reference center axis RA defined on the cable connector 7A. The first terminal 7C1 is provided symmetrically with the second terminal 7C2 with respect to the reference center axis RA. The third terminal 7C3 is provided symmetrically with the fourth terminal 7C4 with respect to the reference center axis RA. The first magnet 7D1 is provided symmetrically with the second magnet 7D2 with respect to the reference center axis RA. The first additional terminal 7E1 is provided symmetrically with the second additional terminal 7E2 with respect to the reference center axis RA.

Figure 9:
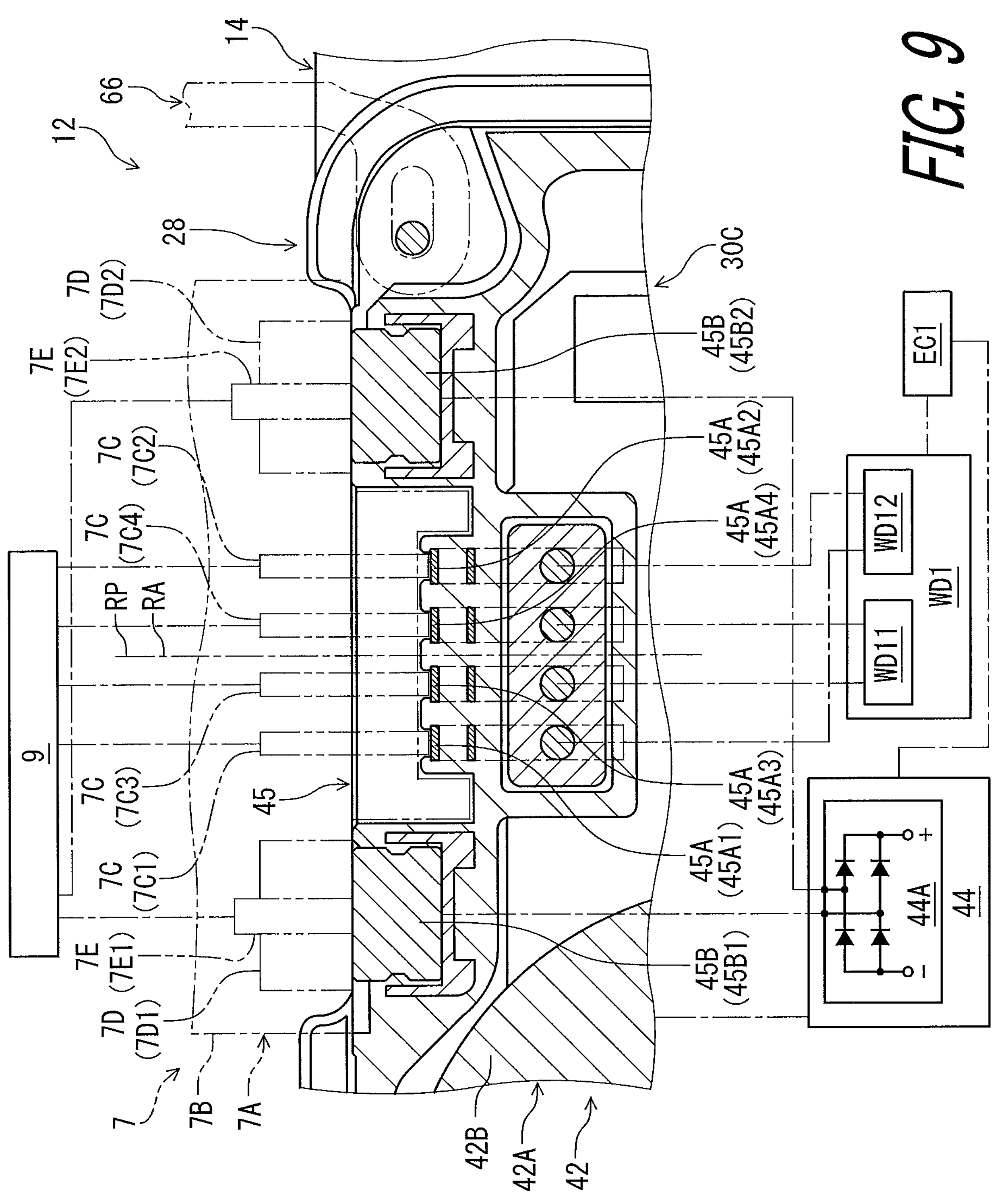
FIG. 9 is a cross-sectional view of the electrical device illustrated in FIG. 1, with the electric cable (first connection state).

As seen in FIG. 9, the cable connector 7A has a structure which is symmetrical with respect to a reference center plane RP defined on the cable connector 7A. The first terminal 7C1 is provided symmetrically with the second terminal 7C2 with respect to the reference center plane RP. The third terminal 7C3 is provided symmetrically with the fourth terminal 7C4 with respect to the reference center plane RP. The first magnet 7D1 is provided symmetrically with the second magnet 7D2 with respect to the reference center plane RP. The first additional terminal 7E1 is provided symmetrically with the second additional terminal 7E2 with respect to the reference center plane RP.

Figure 10:
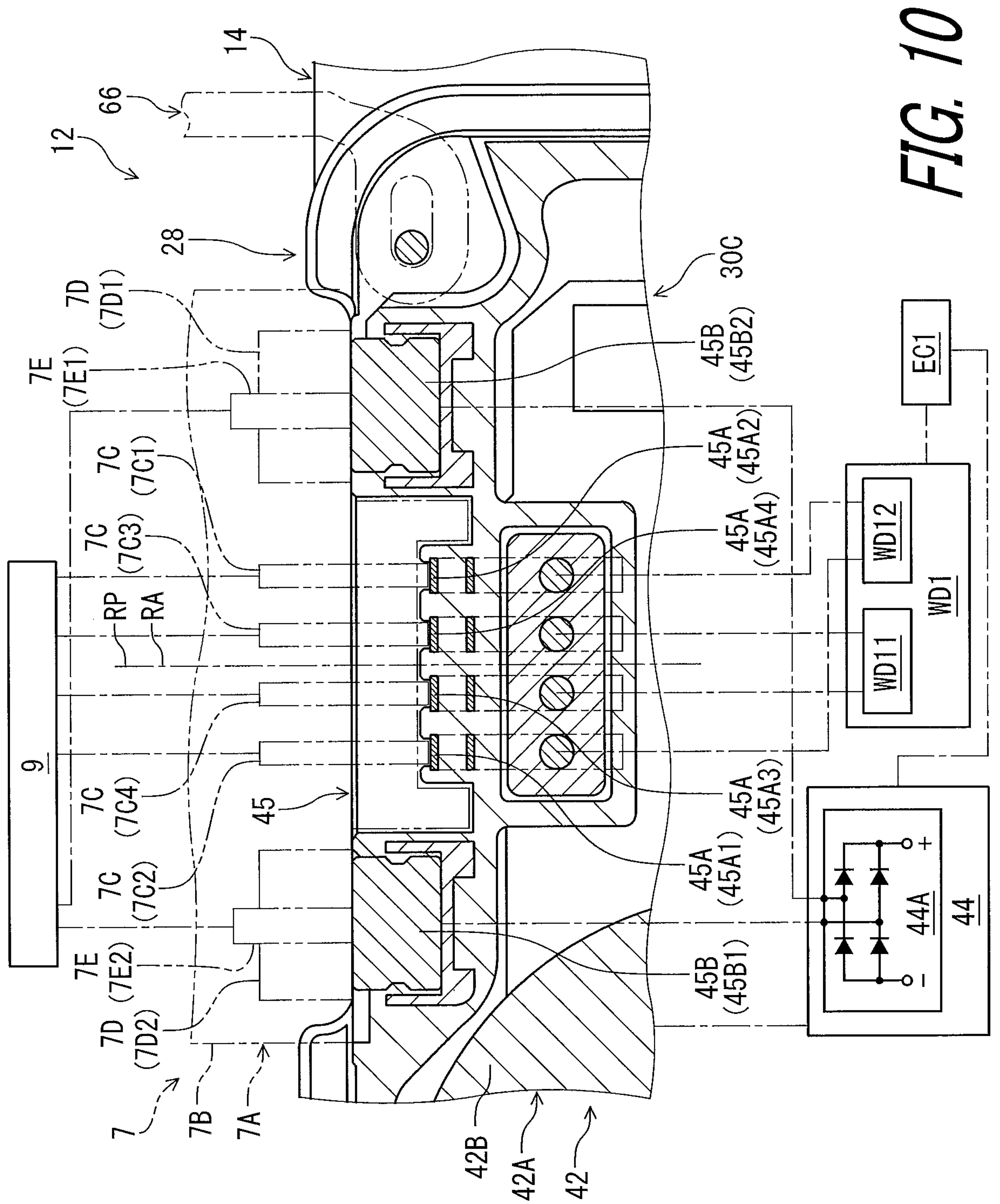
FIG. 10 is a cross-sectional view of the electrical device illustrated in FIG. 1, with the electric cable (second connection state).

As seen in FIGS. 9 and 10, the cable connector 7A is electrically connectable with the electric connector port 45 in each of a first orientation (FIG. 9) and a second orientation (FIG. 10). The cable connector 7A is electrically connectable with the electric connector port 45 to execute charging of the electric power source 42 and/or signal transmission in each of the first orientation (FIG. 9) and the second orientation (FIG. 10).

Figure 11:
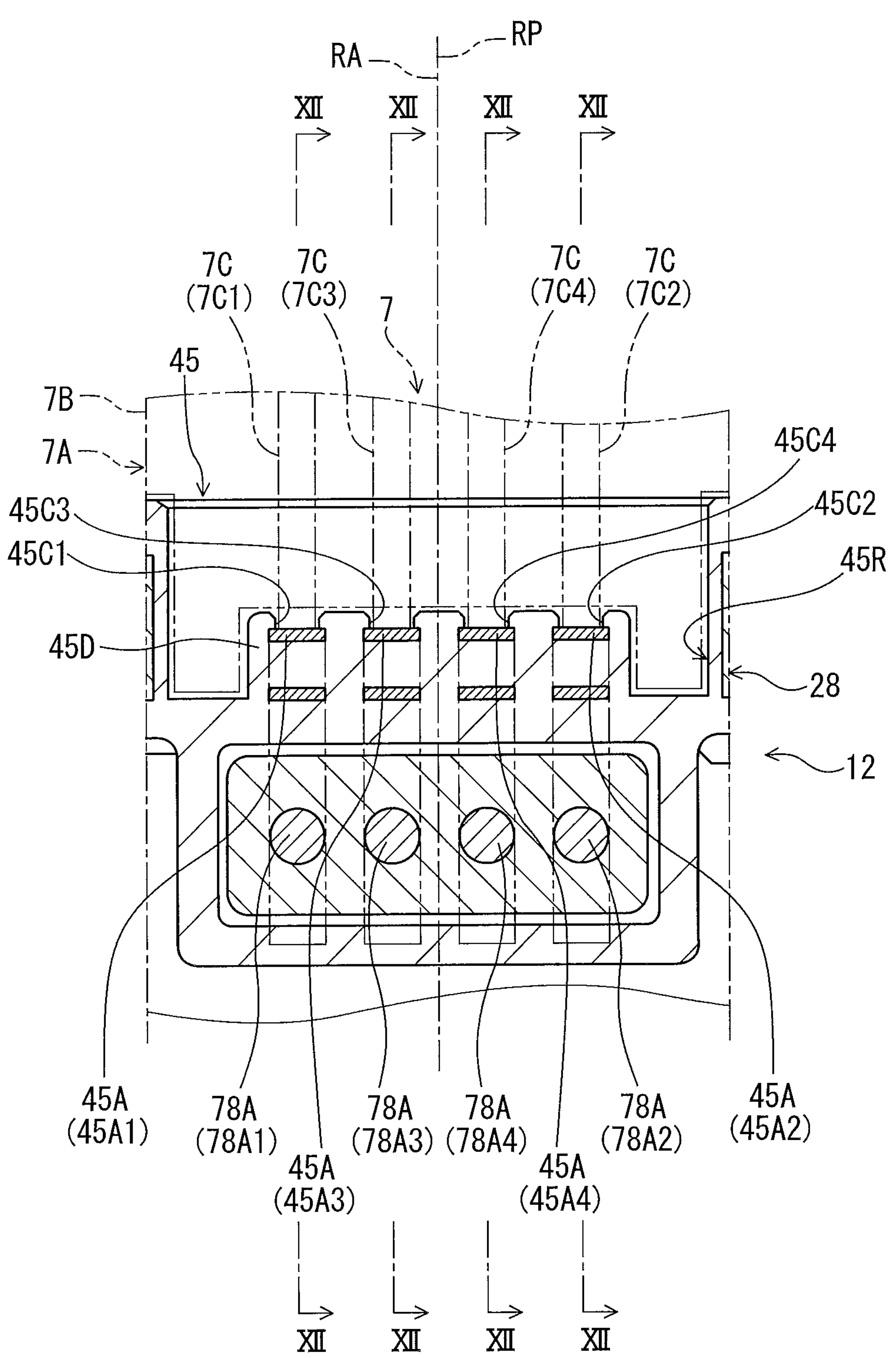
FIG. 11 is an enlarged cross-sectional view of the electrical device illustrated in FIG. 9, with the electric cable (first connection state).

As seen in FIG. 9, the electric connector port 45 includes at least one port terminal 45A and at least one magnetic body 45B. The electric connector port 45 is integrally provided with the housing 28. The electric connector port 45 has a recess 45R. The recess 45R is arranged between the magnetic bodies 45B. The at least one port terminal 45A is arranged in the recess 45R. The cable connector 7A is at least partially provided in the recess 45R of the electric connector port 45 in a state where the electric cable 7 is connected to the electric connector port 45. As seen in FIG. 11, a protrusion 45D is arranged on the bottom of the recess 45R. The at least one port terminal 45A is arranged on the protrusion 45D. Namely, the at least one port terminal 45A is provided to the housing 28. The at least one magnetic body 45B is provided to the housing 28. The at least one magnetic body 45B is at least partially provided in the housing 28.

In the present embodiment, as seen in FIG. 9, the at least one port terminal 45A includes a first port terminal 45A1, a second port terminal 45A2, a third port terminal 45A3, and a fourth port terminal 45A4. The at least one magnetic body 45B includes a first magnetic body 45B1 and a second magnetic body 45B2. Each of the first port terminal 45A1, the second port terminal 45A2, the third port terminal 45A3, and the fourth port terminal 45A4 is partially provided in the housing 28.

As seen in FIG. 11, the first port terminal 45A1 is exposed from the housing 28 through a first opening 45C1. The second port terminal 45A2 is exposed from the housing 28 through a second opening 45C2. The third port terminal 45A3 is exposed from the housing 28 through a third opening 45C3. The fourth port terminal 45A4 is exposed from the housing 28 through a fourth opening 45C4. Each of the first magnetic body 45B1 and the second magnetic body 45B2 is partially provided in the housing 28. Each of the first magnetic body 45B1 and the second magnetic body 45B2 is exposed from the housing 28. The first port terminal 45A1 is electrically connected to the second port terminal 45A2. The third port terminal 45A3 is electrically connected to the fourth port terminal 45A4.

However, at least one of the first port terminal 45A1, the second port terminal 45A2, the third port terminal 45A3, and the fourth port terminal 45A4 can be entirely provided in the housing 28 if needed and/or desired. At least one of the first magnetic body 45B1 and the second magnetic body 45B2 can be entirely provided in the housing 28 if needed and/or desired. The total number of the at least one port terminal 45A is not limited to the illustrated embodiment. The total number of the at least one magnetic body 45B is not limited to the illustrated embodiment.

As seen in FIG. 9, the first magnet 7D1 is magnetically attached to the first magnetic body 45B1 in a state where the electric cable 7 is electrically connected to the electric connector port 45. The second magnet 7D2 is magnetically attached to the second magnetic body 45B2 in the state where the electric cable 7 is electrically connected to the electric connector port 45.

The first terminal 7C1 is in contact with the first port terminal 45A1 in a first connection state where the first magnet 7D1 is magnetically attached to the first magnetic body 45B1 and the second magnet 7D2 is magnetically attached to the second magnetic body 45B2. The second terminal 7C2 is in contact with the second port terminal 45A2 in the first connection state. The third terminal 7C3 is in contact with the third port terminal 45A3 in the first connection state. The fourth terminal 7C4 is in contact with the fourth port terminal 45A4 in the first connection state. The first connection state corresponds to the first orientation of the cable connector 7A.

Figure 12:
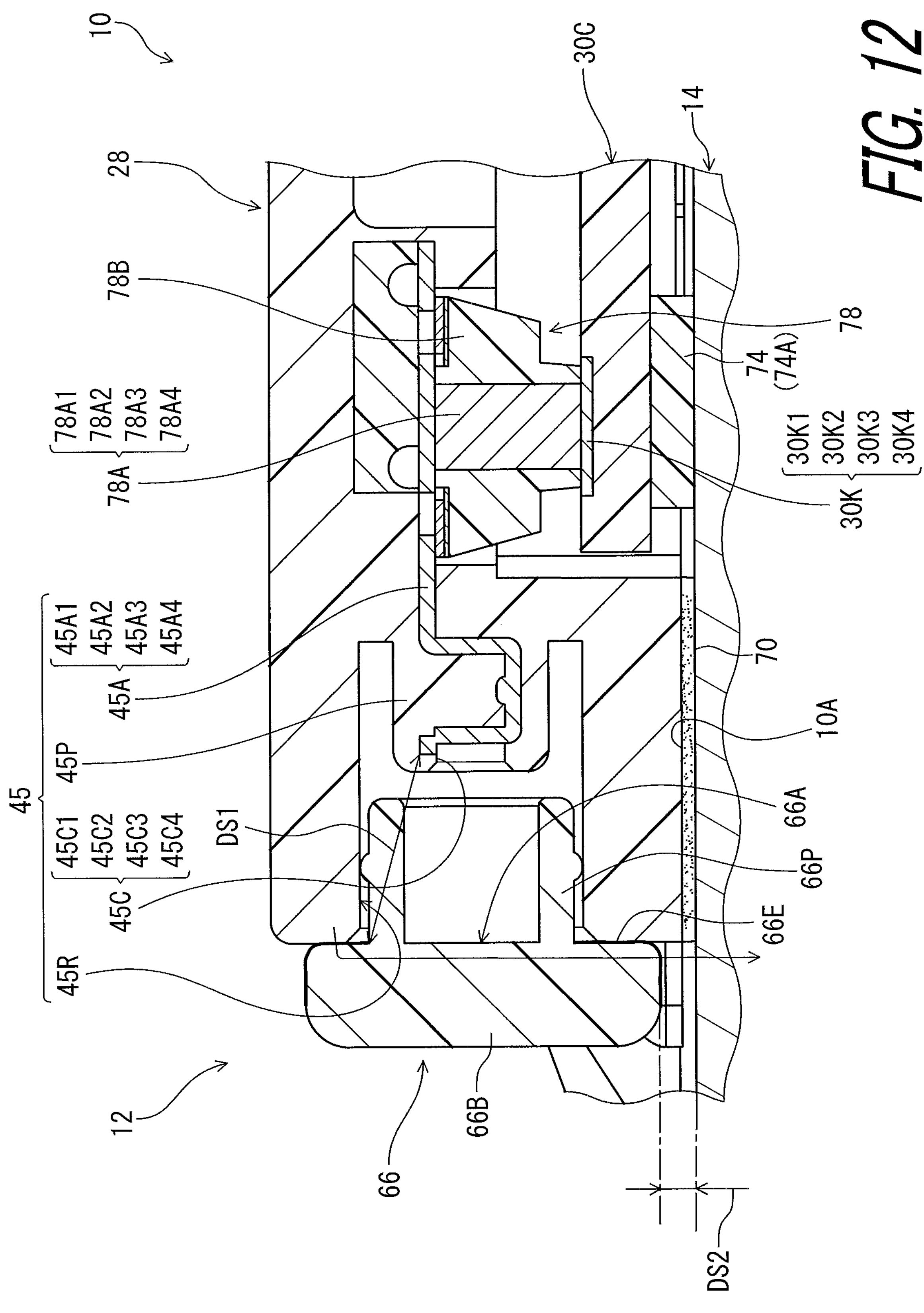
FIG. 12 is a cross-sectional view of the electrical device taken along line XII-XII of FIG. 11.

As seen in FIG. 12, the electrical device 12 includes a connecting member 78. The connecting member 78 is provided between the electric connector port 45 and the circuit board 30C to electrically connect the electric connector port 45 and the circuit board 30C. The at least one port terminal 45A is at least partially provided in the housing 28 and extends from the recess 45R to the connecting member 78.

As seen in FIG. 9, the first port terminal 45A1 extends from the recess 45R to the connecting member 78. The second port terminal 45A2 extends from the recess 45R to the connecting member 78. The third port terminal 45A3 extends from the recess 45R to the connecting member 78. The fourth port terminal 45A4 extends from the recess 45R to the connecting member 78.

The connecting member 78 includes at least one connecting part 78A and a base body 78B. The at least one connecting part 78A is at least partially provided in the base body 78B. The at least one connecting part 78A is made of a metallic material. The base body 78B is made of a non-metallic material such as a resin material having electric insulation. The at least one connecting part 78A is in contact with the at least one port terminal 45A. The at least one connecting part 78A is in contact with the circuit board 30C. In the present embodiment, the at least one connecting part 78A includes a first connecting part 78A1, a second connecting part 78A2, a third connecting part 78A3, and a fourth connecting part 78A4.

As seen in FIG. 12, the first connecting part 78A1 is in contact with the first port terminal 45A1. The second connecting part 78A2 is in contact with the second port terminal 45A2. The third connecting part 78A3 is in contact with the third port terminal 45A3. The fourth connecting part 78A4 is in contact with the fourth port terminal 45A4.

The first connecting part 78A1 extends from the first port terminal 45A1 to the circuit board 30C. The second connecting part 78A2 extends from the second port terminal 45A2 to the circuit board 30C. The third connecting part 78A3 extends from the third port terminal 45A3 to the circuit board 30C. The fourth connecting part 78A4 extends from the fourth port terminal 45A4 to the circuit board 30C.

As seen in FIG. 6, the circuit board 30C includes at least one electrically conductive portion 30K. The at least one electrically conductive portion 30K includes a first electrically conductive portion 30K1, a second electrically conductive portion 30K2, a third electrically conductive portion 30K3, and a fourth electrically conductive portion 30K4.

As seen in FIG. 12, the first connecting part 78A1 is in contact with the first electrically conductive portion 30K1. The second connecting part 78A2 is in contact with the second electrically conductive portion 30K2. The third connecting part 78A3 is in contact with the third electrically conductive portion 30K3. The fourth connecting part 78A4 is in contact with the fourth electrically conductive portion 30K4. The connecting member 78 is held between the at least one port terminal 45A and the circuit board 30C because of the elastic deformation of the spacer 74.

As seen in FIG. 9, the first port terminal 45A1, the second port terminal 45A2, the third port terminal 45A3, and the fourth port terminal 45A4 are electrically connected to the electronic controller EC1. The first terminal 7C1, the second terminal 7C2, the third terminal 7C3, and the fourth terminal 7C4 are electrically connected to a device 9 via the electric cable 7. Thus, the electronic controller EC1 is electrically connected to the device 9 via the electric cable 7 in the first connection state. The electronic controller EC1 is configured to communicate with the device 9 via the electric cable 7 in the first connection state. Examples of the device 9 include the external electrical device 8 and a power source (e.g., an electric outlet). The device 9 is configured to communicate with the electrical device 12 and/or supply electricity (e.g., alternate current or direct current) to the electrical device 12.

For example, the first terminal 7C1 is configured to transmit data to an electrical device such as the electrical device 12. The second terminal 7C2 is configured to transmit data to the electrical device such as the electrical device 12. The third terminal 7C3 is configured to receive data from the electrical device such as the electrical device 12. The fourth terminal 7C4 is configured to receive data from the electrical device such as the electrical device 12. Each of the first terminal 7C1 and the second terminal 7C2 constitutes a serial port configured to transmit data. Each of the third terminal 7C3 and the fourth terminal 7C4 constitutes a serial port configured to receive data. The first terminal 7C1 is electrically connected to the second terminal 7C2. The third terminal 7C3 is electrically connected to the fourth terminal 7C4.

The first port terminal 45A1 is configured to receive data from the device 9 via the electric cable 7. The second port terminal 45A2 is configured to receive data from the device 9 via the electric cable 7. The third port terminal 45A3 is configured to transmit data to the device 9 via the electric cable 7. The fourth port terminal 45A4 is configured to transmit data to the device 9 via the electric cable 7. Each of the first port terminal 45A1 and the second port terminal 45A2 constitutes a serial port configured to receive data. Each of the third port terminal 45A3 and the fourth port terminal 45A4 constitutes a serial port configured to transmit data.

The electronic controller EC1 is configured to transmit data to the device 9 via the third terminal 7C3, the fourth terminal 7C4, the third port terminal 45A3, and the fourth port terminal 45A4 in the first connection state. The electronic controller EC1 is configured to receive data from the device 9 via the first terminal 7C1, the second terminal 7C2, the first port terminal 45A1, and the second port terminal 45A2 in the first connection state.

The electrical device 12 includes a wired communicator WD1. The wired communicator WD1 is configured to communicate with another wired communicator via the electric connector port 45 and the electric cable 7. The wired communicator WD1 is configured to communicate with another wired communicator using serial communications. For example, the wired communicator WD1 is configured to communicate with the external electrical device 8 via an electric cable using USB (Universal Serial Bus) or UART (Universal Asynchronous Receiver/Transmitter) technology. The wired communicator WD1 is electrically connected to the processor 30P and the memory 30M with the circuit board 30C and the bus 30D. The wired communicator WD1 is electrically mounted on the circuit board 30C. The wired communicator WD1 includes a signal transmitting circuit or circuitry and a signal receiving circuit or circuitry. Thus, the wired communicator WD1 can also be referred to as a wired communicator circuit or circuitry WD1. However, the wired communicator WD1 can be omitted from the electrical device 12 if needed and/or desired.

The wired communicator WD1 includes a receiving terminal WD11 and a transmitting terminal WD12. For example, the wired communicator WD1 is configured to execute serial communications via the receiving terminal WD11 and the transmitting terminal WD12. The receiving terminal WD12 is electrically connected to the first port terminal 45A1 and the second port terminal 45A2 to receive data from the first port terminal 45A1 and the second port terminal 45A2. The transmitting terminal WD11 is electrically connected to the third port terminal 45A3 and the fourth port terminal 45A4 to transmit data from the third port terminal 45A3 and the fourth port terminal 45A4.

As seen in FIG. 9, the first additional terminal 7E1 in contact with the first magnetic body 45B1 in the first connection state. The second additional terminal 7E2 is in contact with the second magnetic body 45B2 in the first connection state.

The first magnetic body 45B1 and the second magnetic body 45B2 are electrically connected to the charging circuit 44. The first additional terminal 7E1 and the second additional terminal 7E2 are electrically connected to the device 9 via the electric cable 7. The first additional terminal 7E1 and the second additional terminal 7E2 are electrically connected to the device 9 via the electric cable 7 in a state where the device 9 includes or is connected to a power source. The charging circuit 44 includes a bridge diode circuit 44A configured to covert input electric power (e.g., an alternate current) into a direct current. Thus, the electronic controller EC1 is configured to receive electricity from the device 9 via the first additional terminal 7E1, the second additional terminal 7E2, the first magnetic body 45B1, and the second magnetic body 45B2 in the first connection state. The bridge diode circuit 44A converts input electric power supplied via the first additional terminal 7E1, the second additional terminal 7E2, the first magnetic body 45B1, and the second magnetic body 45B2 into a direct current in the first connection state.

As seen in FIG. 10, the first magnet 7D1 is magnetically attached to the second magnetic body 45B2 in a state where the electric cable 7 is electrically connected to the electric connector port 45. The second magnet 7D2 is magnetically attached to the first magnetic body 45B1 in the state where the electric cable 7 is electrically connected to the electric connector port 45.

The first terminal 7C1 is in contact with the second port terminal 45A2 in a second connection state where the first magnet 7D1 is magnetically attached to the second magnetic body 45B2 and the second magnet 7D2 is magnetically attached to the first magnetic body 45B1. The second terminal 7C2 is in contact with the first port terminal 45A1 in the second connection state. The third terminal 7C3 is in contact with the fourth port terminal 45A4 in the second connection state. The fourth terminal 7C4 is in contact with the third port terminal 45A3 in the second connection state. The second connection state corresponds to the second orientation of the cable connector 7A. The first port terminal 45A1 can also be referred to as a port terminal 45A or 45A1. The second port terminal 45A2 can also be referred to as a port terminal 45A or 45A2. The third port terminal 45A3 can also be referred to as a port terminal 45A or 45A3. The fourth port terminal 45A4 can also be referred to as a port terminal 45A or 45A4.

The electronic controller EC1 is configured to transmit data to the device 9 via the third terminal 7C3, the fourth terminal 7C4, the third port terminal 45A3, and the fourth port terminal 45A4 in the second connection state. The electronic controller EC1 is configured to receive data from the device 9 via the first terminal 7C1, the second terminal 7C2, the first port terminal 45A1, and the second port terminal 45A2 in the second connection state.

The first additional terminal 7E1 is in contact with the second magnetic body 45B2 in the second connection state. The second additional terminal 7E2 is in contact with the first magnetic body 45B1 in the second connection state. The electronic controller EC1 is configured to receive electricity from the device 9 via the first additional terminal 7E1, the second additional terminal 7E2, the first magnetic body 45B1, and the second magnetic body 45B2 in the second connection state. The bridge diode circuit 44A converts input electric power supplied via the first additional terminal 7E1, the second additional terminal 7E2, the first magnetic body 45B1, and the second magnetic body 45B2 into a direct current in the second connection state. The first magnetic body 45B1 can also be referred to as a magnetic body 45B or 45B1. The second magnetic body 45B2 can also be referred to as a magnetic body 45B or 45B2. In a case where the first magnetic body 45B1 includes a metallic material, the first magnetic body 45B1 can also be referred to as a metallic member 45B or 45B1. In a case where the second magnetic body 45B2 includes a metallic material, the second magnetic body 45B2 can also be referred to as a metallic member 45B or 45B2.

As seen in FIGS. 9 and 10, the electric connector port 45 is configured to be in each of the first connection state and the second connection state. Thus, it is possible to improve usability of the electrical device 12. However, the electric connector port 45 can be configured to be in only one of the first connection state and the second connection state if needed and/or desired.

Figure 13:
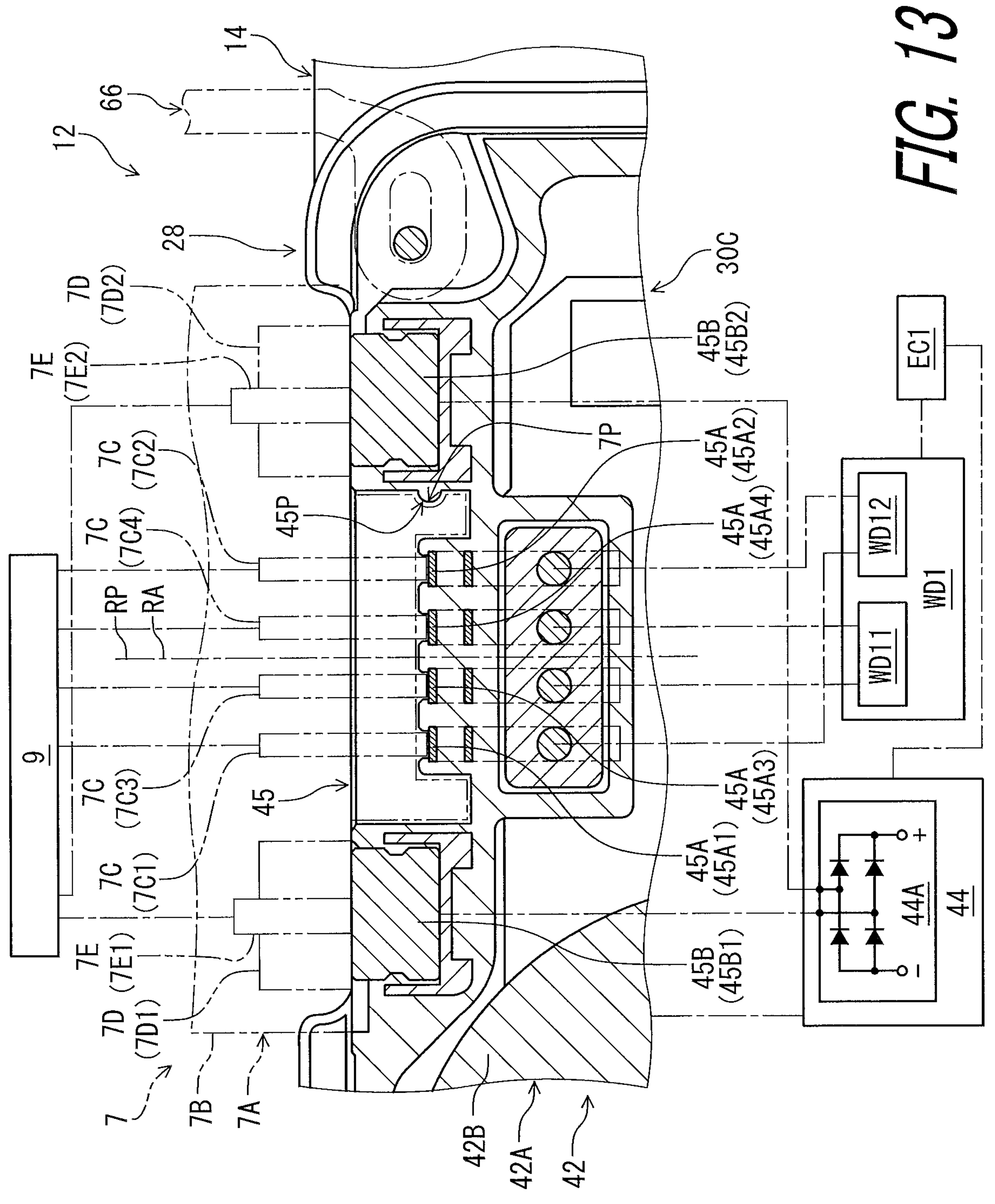
FIG. 13 is a cross-sectional view of an electrical device in accordance with a modification, with the electric cable.
Figure 14:
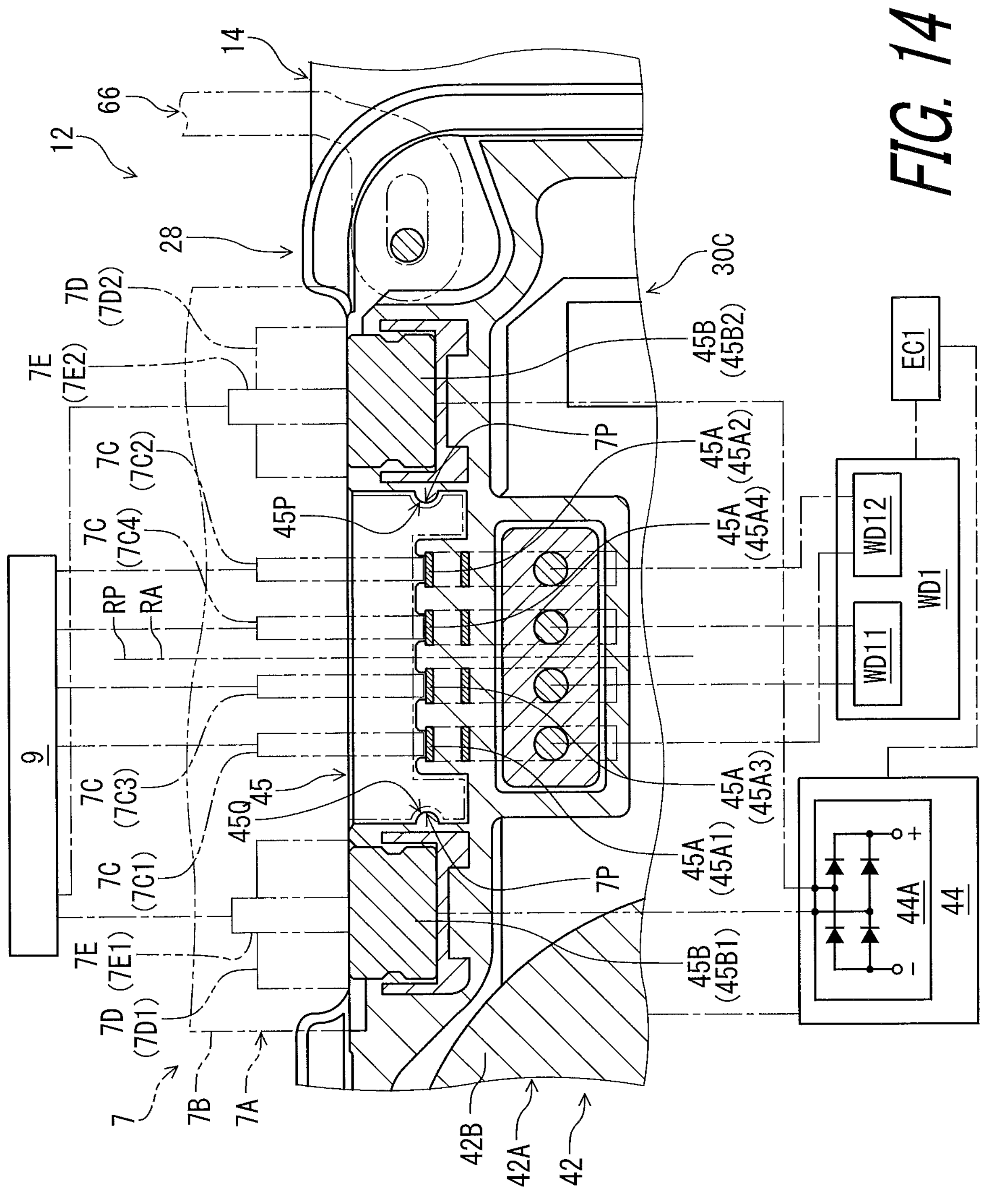
FIG. 14 is a cross-sectional view of an electrical device in accordance with a modification, with the electric cable.

In such embodiments, as seen in FIG. 13, the electric connector port 45 includes a first positioning portion 45P. The first positioning portion 45P includes one of a positioning recess and a positioning protrusion provided in the positioning recess. The electric cable 7 includes a second positioning portion 7P. The second positioning portion 7P includes the other of the positioning recess and the positioning protrusion provided in the positioning recess. The first positioning portion 45P allows the electric cable 7 to be connected in only the first connection state where the first magnet 7D1 is magnetically attached to the first magnetic body 45B1 and the second magnet 7D2 is magnetically attached to the second magnetic body 45B2. The first positioning portion 45P restricts the electric cable 7 from being connected in the second connection state where the first magnet 7D1 is magnetically attached to the second magnetic body 45B2 and the second magnet 7D2 is magnetically attached to the first magnetic body 45B1. The first positioning portion 45P also makes the cable connector 7A of the electric cable 7 stable relative to the electric connector port 45. To stabilize reliably the cable connector 7A of the electric cable 7 relative to the electric connector port 45, as seen in FIG. 14, the electric connector port 45 can include a first additional positioning portion 45Q in addition to the first positioning portion 45P if needed and/or desired.

As seen in FIG. 12, the housing 28 is made of a non-metallic material. The housing 28 is made of a resin material. The electric connector port 45 includes the port terminal 45A made of an electrical conducting material.

The port cover 66 includes an inner surface 66A. The inner surface 66A is configured to face toward the electric connector port 45 in a cover state where the port cover 66 at least partially covers the electric connector port 45. The inner surface 66A is configured to face toward the port terminal 45A in the cover state. The electric connector port 45 includes the recess 45R in which the cable connector 7A of the electric cable 7 is at least partially provided. The inner surface 66A is configured to face toward the recess 45R in the cover state.

Figure 32:
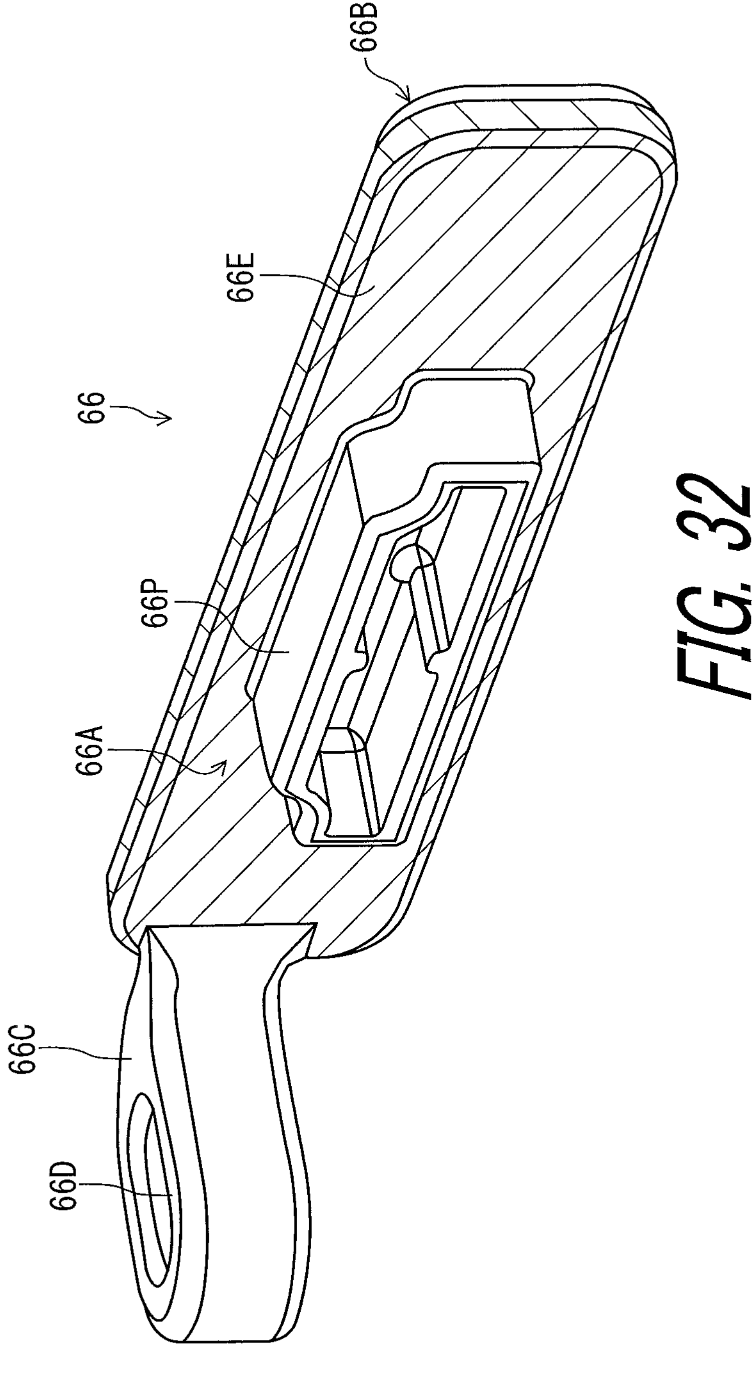
FIG. 32 is a perspective view of a port cover of the electrical device of the rotational device illustrated in FIG. 1.

As seen in FIG. 32, the port cover 66 includes a cover body 66B. The cover body 66B is made of a non-metallic material. The port cover 66 includes a coupling portion 66C. The coupling portion 66C protrudes from the cover body 66B and includes a coupling hole 66D through which a pivot pin 66F (see e.g., FIG. 35) extends. The port cover 66 includes a protruding portion 66P. The protruding portion 66P protrudes from the cover body 66B. The protruding portion 66P protrudes from the inner surface 66A. As seen in FIG. 12, the protruding portion 66P is at least partially provided in the recess 45R of the electric connector port 45.

As seen in FIG. 32, the port cover 66 includes an electrical conductor 66E. The electrical conductor 66E is made of an electrical conducting material. In the present embodiment, the electrical conductor 66E is at least partially provided in the inner surface 66A. The electrical conductor 66E is partially provided in the inner surface 66A. The electrical conductor 66E is partially provided outside the inner surface 66A. The electrical conductor 66E is provided in a region indicated with a hatching in FIG. 32. The electrical conductor 66E is provided outside the protruding portion 66P. The electrical conductor 66E is not provided in the protruding portion 66P. However, the electrical conductor 66E can be entirely provided in the inner surface 66A if needed and/or desired. The electrical conductor 66E can be provided to other parts of the port cover 66 if needed and/or desired.

In the present embodiment, the electrical conductor 66E is at least partially provided integrally with the cover body 66B as a one-piece unitary member. The electrical conductor 66E can be formed integrally with the cover body 66B by two-color molding. The electrical conductor 66E is entirely provided integrally with the cover body 66B as a one-piece unitary member. However, the electrical conductor 66E can be partially provided integrally with the cover body 66B as a one-piece unitary member if needed and/or desired. The electrical conductor 66E can at least partially be a separate member from the cover body 66B if needed and/or desired. The electrical conductor 66E can be formed integrally with the cover body 66B by a method other than the two-color molding if needed and/or desired.

As seen in FIG. 12, a first distance DS1 is defined between the electrical conductor 66E and the port terminal 45A of the electric connector port 45 in a mounting state where the housing 28 is mounted to the rotational device 10 and where the port cover 66 at least partially covers the electric connector port 45. The first distance DS1 is defined between the electrical conductor 66E and the port terminal 45A of the electric connector port 45 in a cover state where the port cover 66 at least partially covers the electric connector port 45.

A second distance DS2 is defined between the electrical conductor 66E and the mounting surface 10A in the mounding state. In the present embodiment, the second distance DS2 is shorter than the first distance DS1. However, the second distance DS2 can be longer than or equal to the first distance DS1 if needed and/or desired.

Figure 33:
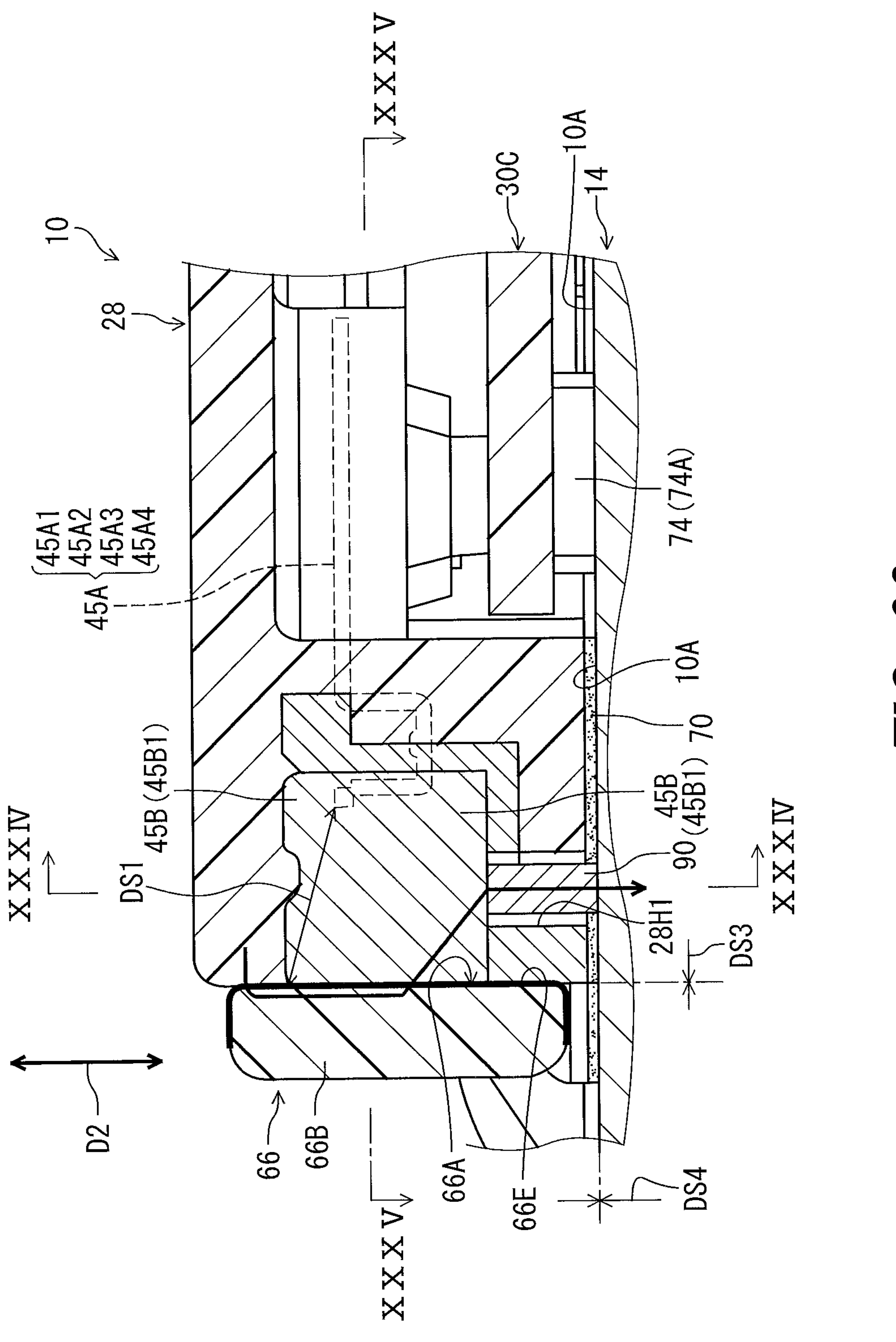
FIG. 33 is a cross-sectional view of the electrical device taken along line XXXIII-XXXIII of FIG. 34.

As seen in FIG. 33, the electrical device 12 of the rotational device 10 for the human-powered vehicle 2 comprises the metallic member 45B provided to the housing 28. A third distance DS3 is defined between the electrical conductor 66E and the metallic member 45B in the cover state. In the present embodiment, the third distance DS3 is shorter than the first distance DS1. However, the third distance DS3 can be longer than or equal to the first distance DS1 if needed and/or desired.

Figure 34:
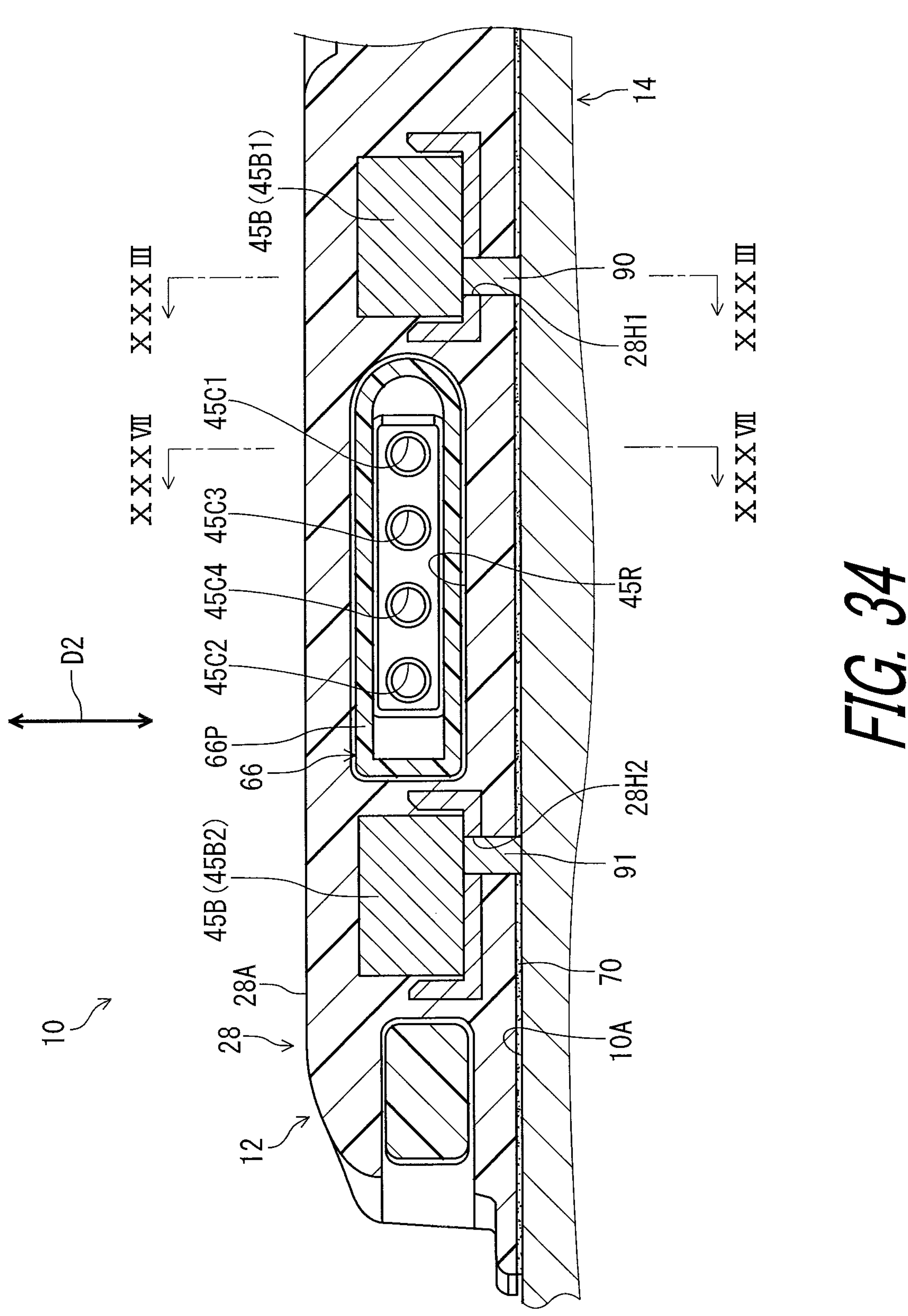
FIG. 34 is a cross-sectional view of the electrical device taken along line XXXIV-XXXIV of FIG. 33.

As seen in FIG. 34, the electrical device 12 of the rotational device 10 for the human-powered vehicle 2 comprises an electrically conductive member 90. The electrically conductive member 90 is configured to be in contact with the metallic member 45B1. The electrically conductive member 90 is provided between the metallic member 45B1 and the mounting surface 10A. The electrically conductive member 90 is configured to be in contact with the mounting surface 10A of the rotational device 10. The metallic member 45B1 is connected to the mounting surface 10A via the electrically conductive member 90.

The housing 28 includes a hole 28H1. The electrically conductive member 90 is at least partially provided in the hole 28H1. The electrically conductive member 90 is elastically deformable. For example, the electrically conductive member 90 includes an electrically conductive rubber. The electrically conductive member 90 is compressed between the metallic member 45B1 and the mounting surface 10A. Thus, elastic deformation of the electrically conductive member 90 maintains contact between the electrically conductive member 90 and the metallic member 45B1 and contact between the electrically conductive member 90 and the mounting surface 10A.

The electrical device 12 of the rotational device 10 for the human-powered vehicle 2 comprises an electrically conductive member 91. The electrically conductive member 91 is configured to be in contact with the metallic member 45B2. The electrically conductive member 91 is provided between the metallic member 45B2 and the mounting surface 10A. The electrically conductive member 91 is configured to be in contact with the mounting surface 10A of the rotational device 10. The metallic member 45B2 is connected to the mounting surface 10A via the electrically conductive member 91.

The housing 28 includes a hole 28H2. The electrically conductive member 91 is at least partially provided in the hole 28H2. The electrically conductive member 91 is elastically deformable. For example, the electrically conductive member 91 includes an electrically conductive rubber. The electrically conductive member 91 is compressed between the metallic member 45B2 and the mounting surface 10A. Thus, elastic deformation of the electrically conductive member 91 maintains contact between the electrically conductive member 91 and the metallic member 45B2 and contact between the electrically conductive member 91 and the mounting surface 10A.

As seen in FIG. 33, a fourth distance DS4 is defined between the electrically conductive member 90 and the mounting surface 10A in a mounting state where the housing 28 is mounted to the rotational device 10 and where the port cover 66 at least partially covers the electric connector port 45. In the present embodiment, the fourth distance DS4 is shorter than the first distance DS1. However, the fourth distance DS4 can be longer than or equal to the first distance DS1 if needed and/or desired.

Figure 35:
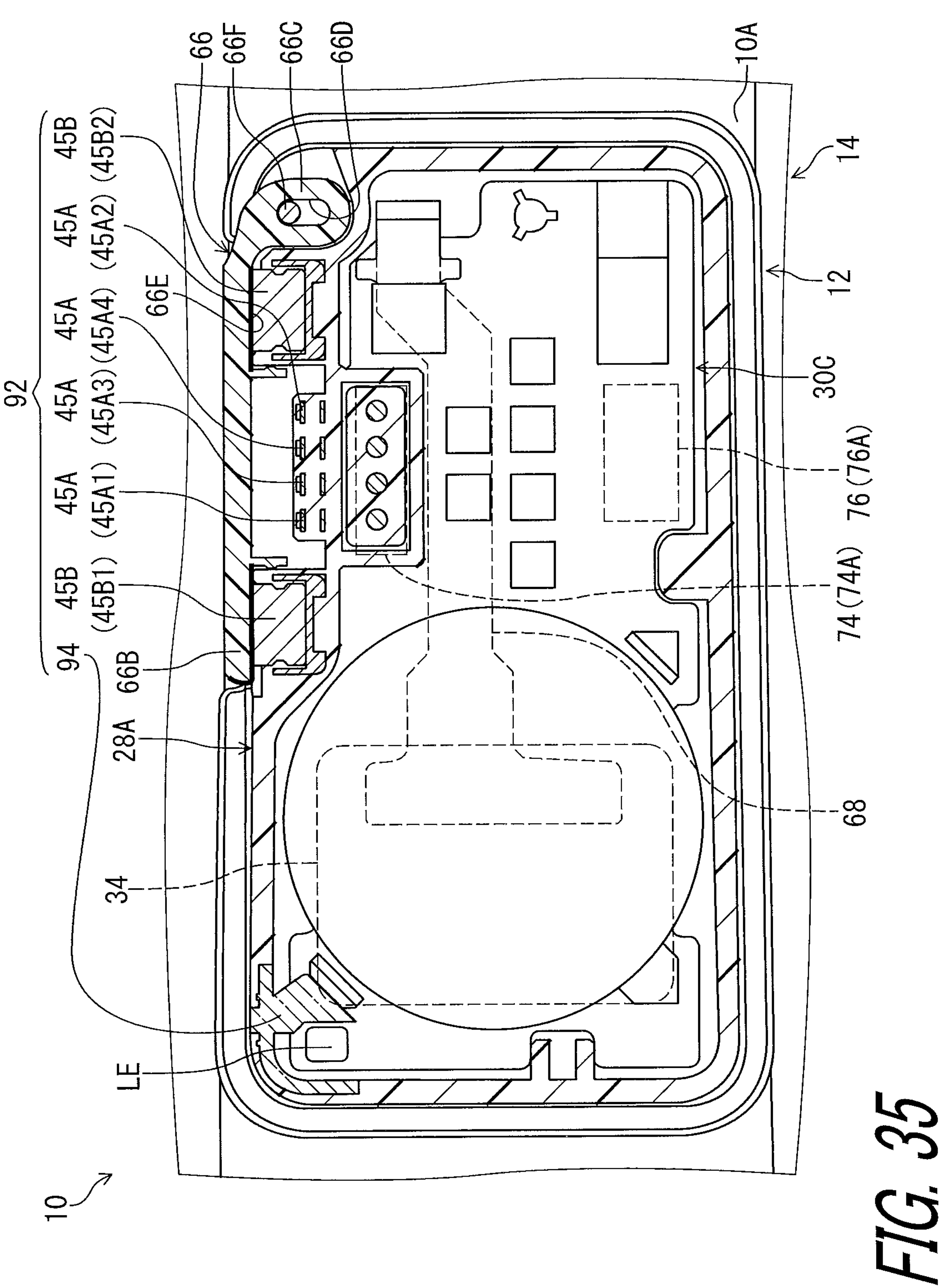
FIG. 35 is a cross-sectional view of the electrical device taken along line XXXV-XXXV of FIG. 33.

As seen in FIG. 35, the electrical device 12 of the rotational device 10 for the human-powered vehicle 2 comprises an embedded part 92. The embedded part 92 is partially embedded in the housing 28. The embedded part 92 is made of a material different from the non-metallic material of the housing 28.

The embedded part 92 includes the port terminal 45A. The embedded part 92 is contactable with the cable connector 7A of the electric cable 7 (see e.g., FIG. 9). The port terminal 45A is contactable with the terminal 7C of the cable connector 7A (see e.g., FIG. 9). The port terminal 45A is partially embedded in the housing 28. The embedded part 92 is partially embedded in the housing 28 with insert molding. The port terminal 45A is partially embedded in the housing 28 with insert molding. However, the port terminal 45A can be partially embedded in the housing 28 with another method other than insert molding if needed and/or desired.

The embedded part 92 includes the metallic member 45B. The embedded part 92 is contactable with the cable connector 7A of the electric cable 7 (see e.g., FIG. 9). The metallic member 45B is contactable with the magnet 7D of the cable connector 7A (see e.g., FIG. 9). The metallic member 45B is partially embedded in the housing 28. The embedded part 92 is partially embedded in the housing 28 with insert molding. The metallic member 45B is partially embedded in the housing 28 with insert molding. However, the metallic member 45B can be partially embedded in the housing 28 with another method other than insert molding if needed and/or desired.

The embedded part 92 includes a light transmission portion 94 having light transparency. The light transmission portion 94 is partially embedded in the housing 28. The embedded part 92 is partially embedded in the housing 28 with two-color molding. The light transmission portion 94 has a color different from a color of the housing 28. The light transmission portion 94 has light transparency higher than light transparency of the housing 28. The light transparency of the housing 28 is almost zero. However, the embedded part 92 can be partially embedded in the housing 28 with methods other than two-color molding if needed and/or desired. The light transmission portion 94 transmits light emitted from the light emitter LE to an exterior space of the rotational device 10.

Figure 36:
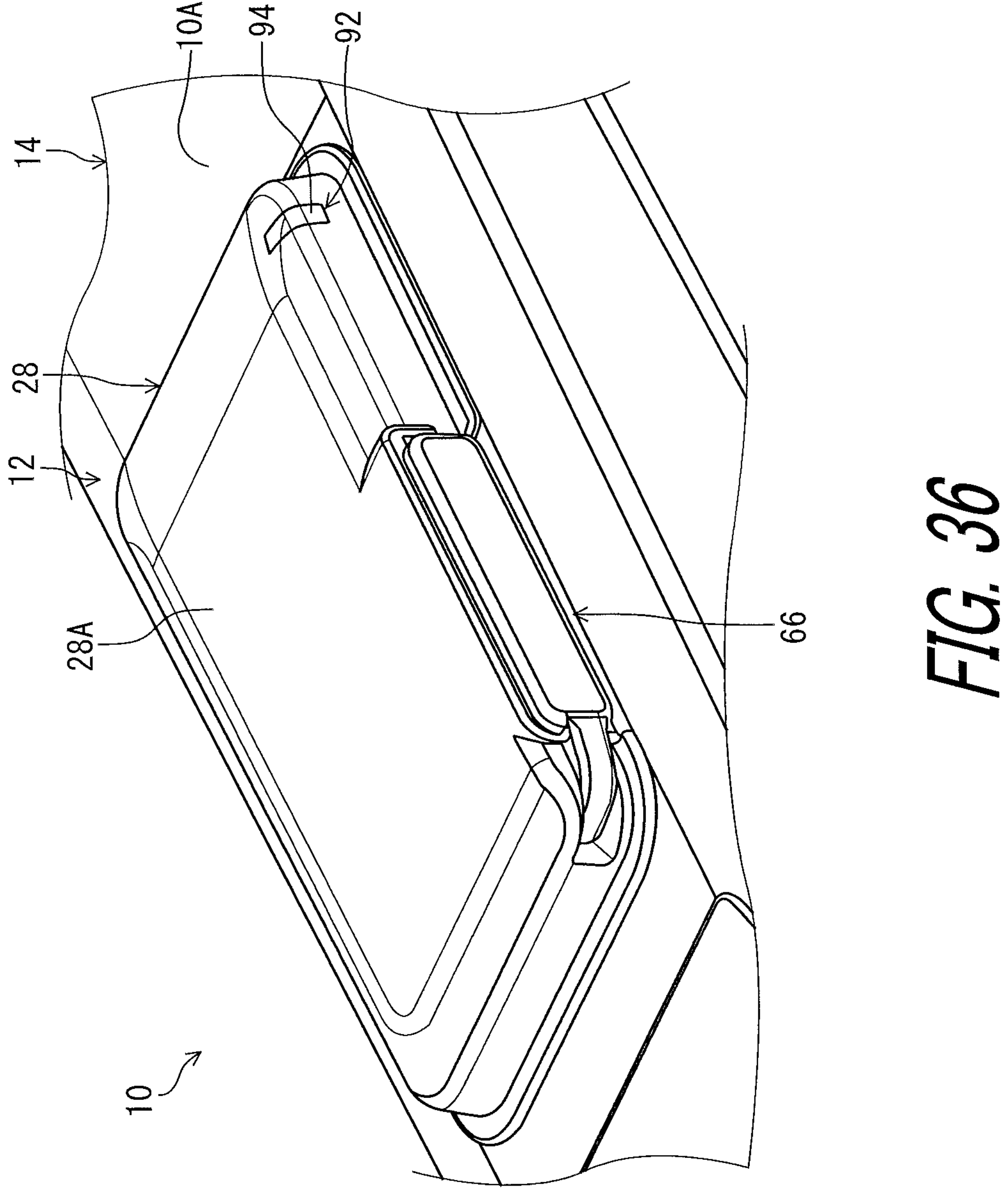
FIG. 36 is a perspective view of the electrical device of the rotational device illustrated in FIG. 1.

As seen in FIG. 36, the housing 28 includes a housing outer surface 28A. The embedded part 92 is partially exposed from the housing outer surface 28A. The light transmission portion 94 is partially exposed from the housing outer surface 28A.

As seen in FIG. 35, the embedded part 92 can include the magnet 7D contactable with the metallic member 45B of the cable connector 7A in a case where the metallic member 45B is provided to the cable connector 7A and where the magnet 7D is provided to the housing 28. In the modification depicted in FIG. 35, the magnet 7D is partially embedded in the housing 28.

As seen in FIG. 4, the electrical device 12 of the rotational device 10 for the human-powered vehicle 2 comprises the circuit board 30C. The spacer 74 can include a double-sided tape 74A. The spacer 76 can include a double-sided tape 76A. Namely, the electrical device 12 of the rotational device 10 for the human-powered vehicle 2 comprises the double-sided tape 74A. The electrical device 12 of the rotational device 10 for the human-powered vehicle 2 comprises the double-sided tape 76A.

Figure 37:
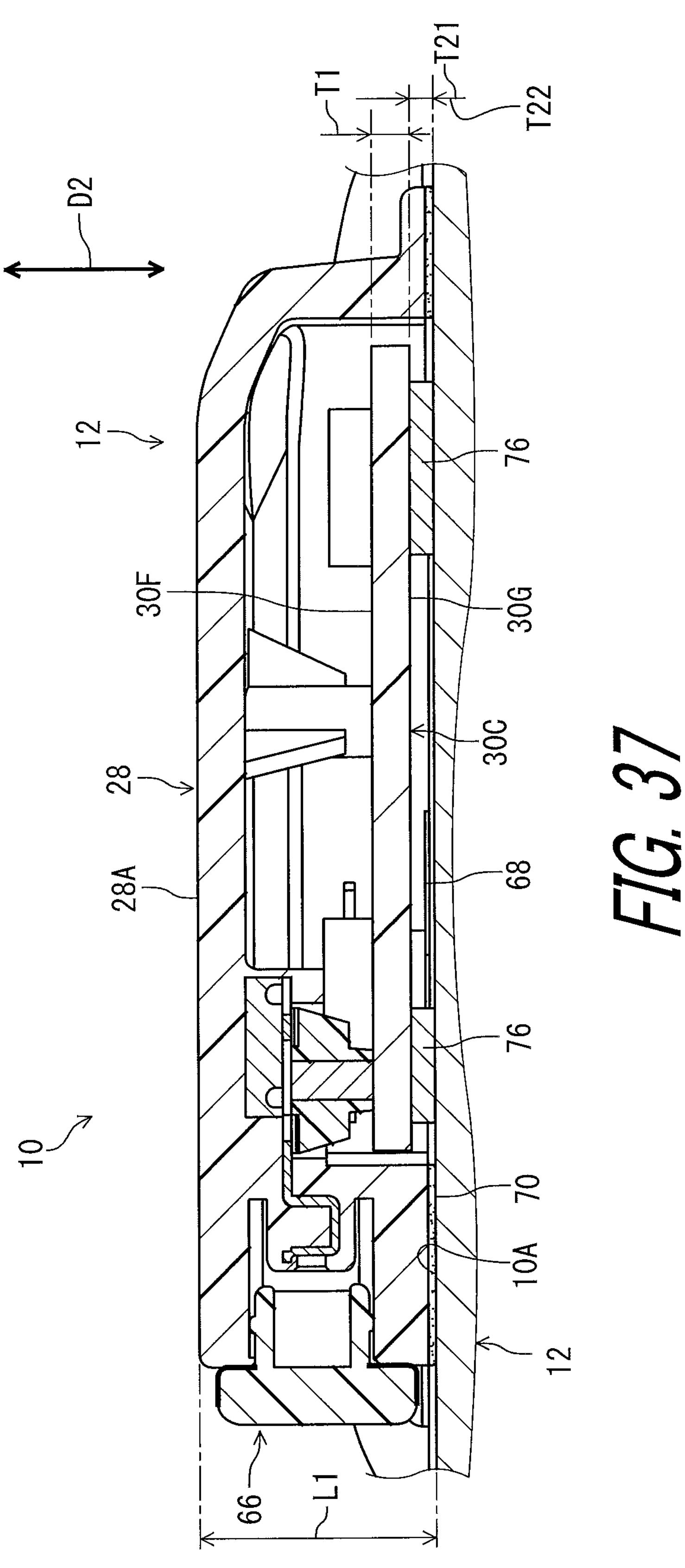
FIG. 37 is a cross-sectional view of the electrical device taken along line XXXVII-XXXVII of FIG. 34.

As seen in FIG. 37, the double-sided tape 74A is at least partially provided between the circuit board 30C and the mounting surface 10A. The double-sided tape 76A is at least partially provided between the circuit board 30C and the mounting surface 10A. In the present embodiment, the double-sided tape 74A is entirely provided between the circuit board 30C and the mounting surface 10A. The double-sided tape 76A is entirely provided between the circuit board 30C and the mounting surface 10A. However, the double-sided tape 74A can be partially provided between the circuit board 30C and the mounting surface 10A if needed and/or desired. The double-sided tape 76A can be partially provided between the circuit board 30C and the mounting surface 10A if needed and/or desired.

The double-sided tape 74A is configured to attach the circuit board 30C to the rotational device 10. The double-sided tape 76A is configured to attach the circuit board 30C to the rotational device 10. The double-sided tape 74A is spaced apart from the double-sided tape 76A. The double-sided tape 74A is a separate member from the double-sided tape 76A. However, the double-sided tape 74A can be integrally provided with the double-sided tape 76A as a one-piece unitary member if needed and/or desired.

The double-sided tape 74A is configured to attach the circuit board 30C to the mounting surface 10A of the rotational device 10. The circuit board 30C includes the first surface 30F and the second surface 30G provided on a reverse side of the first surface 30F. The second surface 30G is arranged to face toward the mounting surface 10A of the crank arm 14. The double-sided tape 74A is configured to attach one of the first surface 30F and the second surface 30G to the mounting surface 10A of the rotational device 10. The double-sided tape 76A is configured to attach one of the first surface 30F and the second surface 30G to the mounting surface 10A of the rotational device 10. In the present embodiment, the double-sided tape 74A is configured to attach the second surface 30G to the mounting surface 10A of the rotational device 10. The double-sided tape 76A is configured to attach the second surface 30G to the mounting surface 10A of the rotational device 10. However, at least one of the double-sided tapes 74A and 76A can be configured to attach the first surface 30F to the mounting surface 10A of the rotational device 10 if needed and/or desired.

The circuit board 30C has a first thickness T1. The first thickness T1 is defined between the first surface 30F and the second surface 30G in the perpendicular direction D2 perpendicular to the first surface 30F. The double-sided tape 74A has a second thickness T21 defined in the perpendicular direction D2. The double-sided tape 76A has a second thickness T22 defined in the perpendicular direction D2.

In the present embodiment, the second thickness T21 is less than the first thickness T1. The second thickness T22 is less than the first thickness T1. The second thickness T21 is equal to the second thickness T22. However, at least one of the second thicknesses T21 and T22 can be greater than or equal to the first thickness T1 if needed and/or desired. The second thickness T21 can be different from the second thickness T22 if needed and/or desired.

As seen in FIG. 35, the circuit board 30C at least partially overlaps the double-sided tape 74A as viewed in the perpendicular direction D2 perpendicular to the first surface 30F. The circuit board 30C at least partially overlaps the double-sided tape 76A as viewed in the perpendicular direction D2 perpendicular to the first surface 30F.

In the present embodiment, the circuit board 30C entirely overlaps the double-sided tape 74A as viewed in the perpendicular direction D2. The circuit board 30C entirely overlaps the double-sided tape 76A as viewed in the perpendicular direction D2. However, the circuit board 30C can be arranged to partially overlap the double-sided tape 74A as viewed in the perpendicular direction D2 if needed and/or desired. The circuit board 30C can be arranged to partially overlap the double-sided tape 76A as viewed in the perpendicular direction D2 if needed and/or desired.

The electrical device 12 further comprises the strain gauge 34. The strain gauge 34 is electrically connected to the circuit board 30C. The double-sided tape 74A is arranged to avoid overlapping the strain gauge 34 as viewed in the perpendicular direction D2 perpendicular to the first surface 30F. The double-sided tape 76A is arranged to avoid overlapping the strain gauge 34 as viewed in the perpendicular direction D2 perpendicular to the first surface 30F. However, the double-sided tape 74A can be arranged to at least partially overlap the strain gauge 34 as viewed in the perpendicular direction D2 if needed and/or desired. The double-sided tape 76A can be arranged to overlap the strain gauge 34 at least partially as viewed in the perpendicular direction D2 if needed and/or desired.

The electrical device 12 further comprises the flexible printed circuit 68. The flexible printed circuit 68 is electrically connected to the circuit board 30C. The double-sided tape 74A is arranged to avoid overlapping the flexible printed circuit 68 as viewed in the perpendicular direction D2 perpendicular to the first surface 30F. The double-sided tape 76A is arranged to avoid overlapping the flexible printed circuit 68 as viewed in the perpendicular direction D2 perpendicular to the first surface 30F. However, the double-sided tape 74A can be arranged to overlap the flexible printed circuit 68 at least partially as viewed in the perpendicular direction D2. The double-sided tape 76A can be arranged to overlap the flexible printed circuit 68 at least partially as viewed in the perpendicular direction D2.

As seen in FIG. 37, the electrical device 12 has a first length L1. The first length L1 is defined in the perpendicular direction D2. The first length L1 is defined between the mounting surface 10A and the housing outer surface 28A of the housing 28. The first length L1 is defined by the housing 28 and the adhesive agent 70. The first length L1 is shorter than or equal to 6 mm. The first length L1 is shorter than or equal to 5 mm. The first length L1 is longer than or equal to 2 mm. The first length L1 is longer than or equal to 3 mm. However, the first length L1 is not limited to the above ranges.

Figure 38:
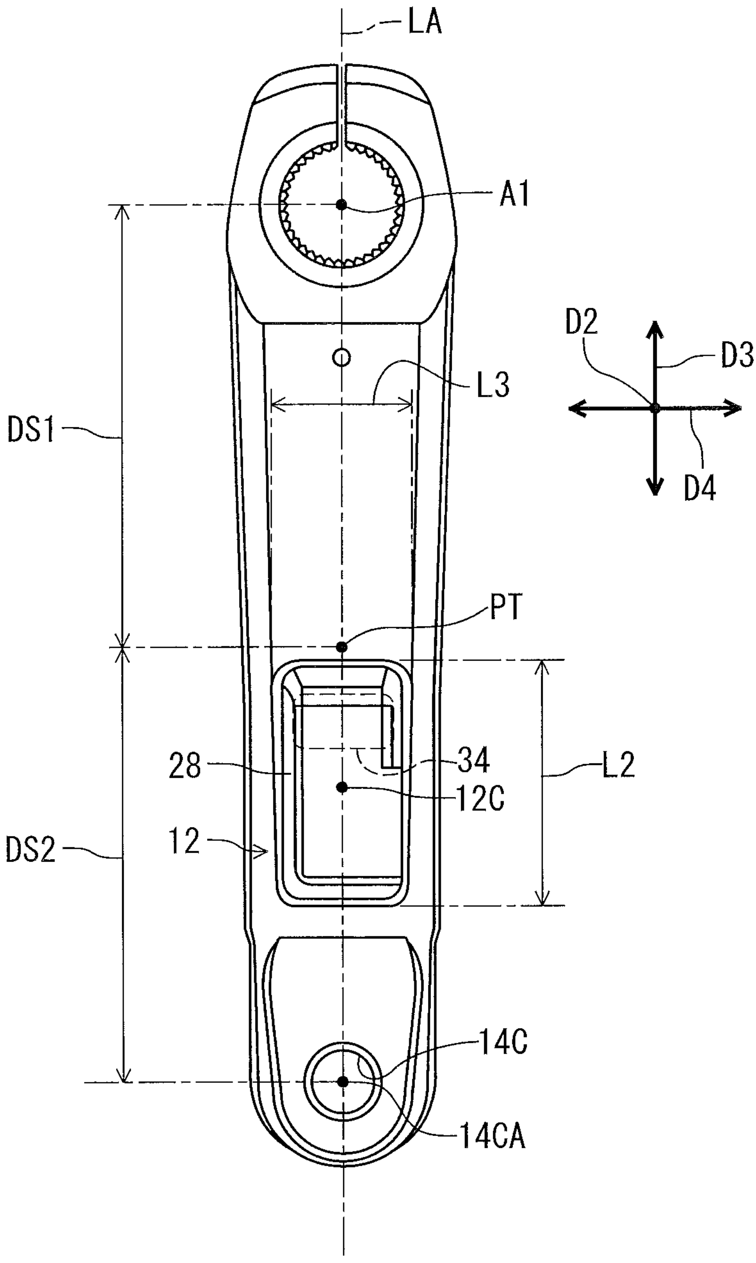
FIG. 38 is a side elevational view of a crank arm of the rotational device illustrated in FIG. 1.

As seen in FIG. 38, the crank arm 14 has a longitudinal axis LA and extends along the longitudinal axis LA. The longitudinal axis LA intersects with the rotational axis A1 and a center axis 14CA of the pedal securing hole 14C as viewed along the rotational axis A1. The electrical device 12 has a second length L2. The second length L2 is defined in a longitudinal direction D3 defined along the longitudinal axis LA. The second length L2 is defined by the housing 28. The second length L2 is shorter than or equal to 50 mm. The second length L2 is shorter than or equal to 45 mm. The second length L2 is longer than or equal to 30 mm. The second length L2 is longer than or equal to 35 mm. However, the second length L2 is not limited to the above ranges.

The electrical device 12 has a third length L3. The third length L3 is defined in a width direction D4. The width direction D4 is perpendicular to the perpendicular direction D2 and the longitudinal direction D3. The third length L3 is defined by the housing 28. The third length L3 is shorter than or equal to 30 mm. The third length L3 is shorter than or equal to 27 mm. The third length L3 is longer than or equal to 10 mm. The third length L3 is longer than or equal to 15 mm. However, the third length L3 is not limited to the above ranges.

A reference point PT is defined on the longitudinal axis LA as viewed along the rotational axis A1. A first distance DS1 is defined between the reference point PT and the rotational axis A1 in the longitudinal direction D3. A second distance DS2 is defined between the reference point PT and the center axis 14CA in the longitudinal direction D3. The first distance DS1 is equal to the second distance DS2.

The electrical device 12 has a center point 12C. The center point 12C is defined to bisect the second length L2 in the longitudinal direction D3. The center point 12C is defined to bisect the third length L3 in the width direction D4. The center point 12C is provided between the reference point PT and the center axis 14CA in the longitudinal direction D3. The strain gauge 34 is at least partially provided between the reference point PT and the center axis 14CA in the longitudinal direction D3. In the present embodiment, the strain gauge 34 is entirely provided between the reference point PT and the center axis 14CA in the longitudinal direction D3. However, the strain gauge 34 can be partially provided between the reference point PT and the center axis 14CA in the longitudinal direction D3 if needed and/or desired. The center point 12C can be provided between the reference point PT and the rotational axis A1 in the longitudinal direction D3 if needed and/or desired. The center point 12C can be provided on the reference point PT if needed and/or desired.

Figure 15:
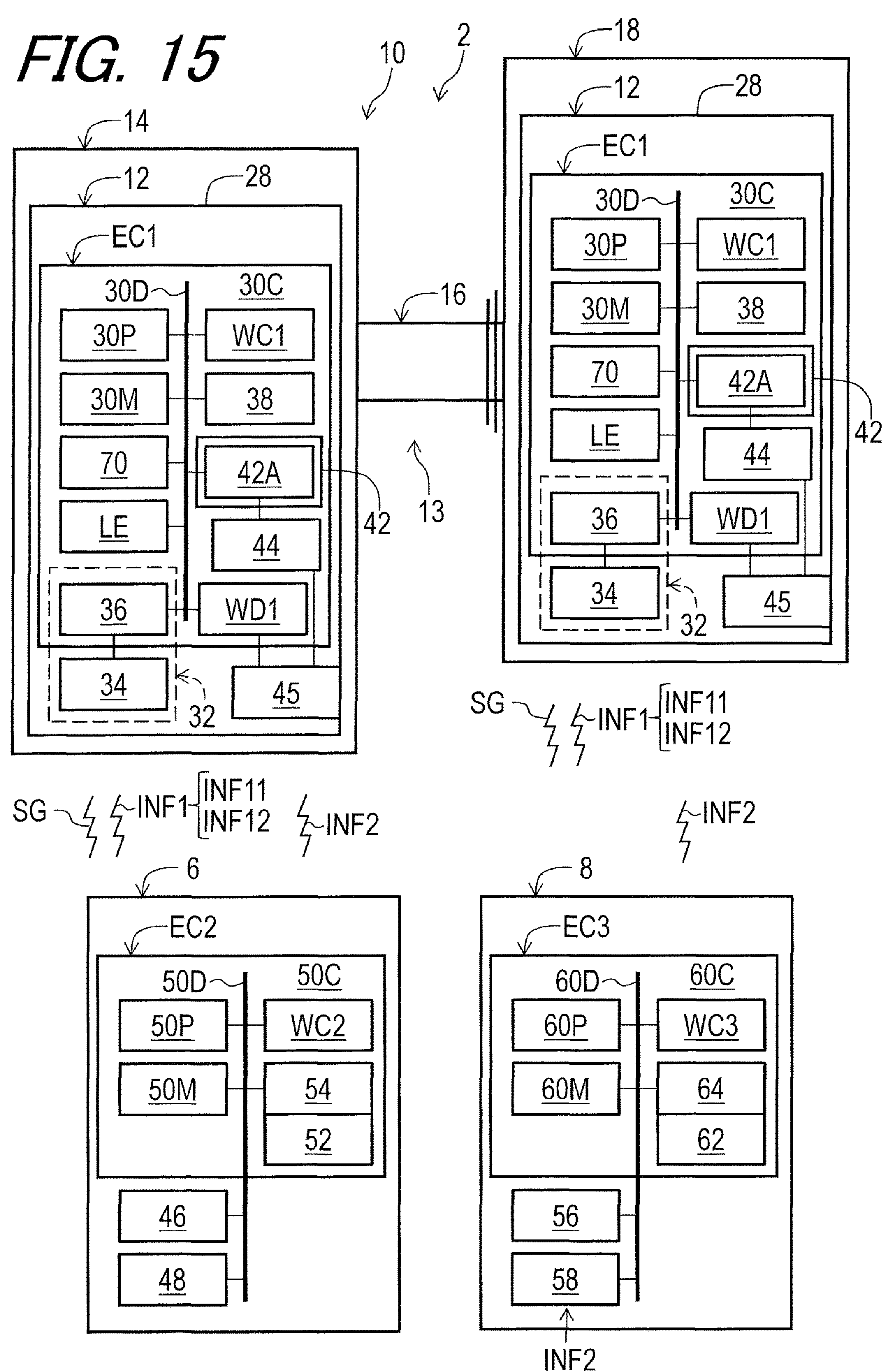
FIG. 15 is a schematic block diagram of a rotational device in accordance with a modification.

As seen in FIG. 15, the electrical device 12 can be provided to the crank arm 18 if needed and/or desired. In such embodiments, the rotational device 10 includes at least one of the electrical device 12 provided to the crank arm 14 and the electrical device 12 provided to the crank arm 18. The electrical device 12 provided to the crank arm 18 is configured to wirelessly transmit the rotational information INF1 of the crank arm 18 while the electrical device 12 provided to the crank arm 14 is configured to wirelessly transmit the rotational information INF1 of the crank arm 14. The additional electrical device 6 is configured to separately display the power INF11 applied to the crank arm 14 and the power INF11 applied to the crank arm 18. The additional electrical device 6 is configured to display one of the rotational speed INF12 of the crank arm 14 and the rotational speed INF12 of the crank arm 18. The additional electrical device 6 can be configured to display an average value of the rotational speed INF12 of the crank arm 14 and the rotational speed INF12 of the crank arm 18.

Figure 16:
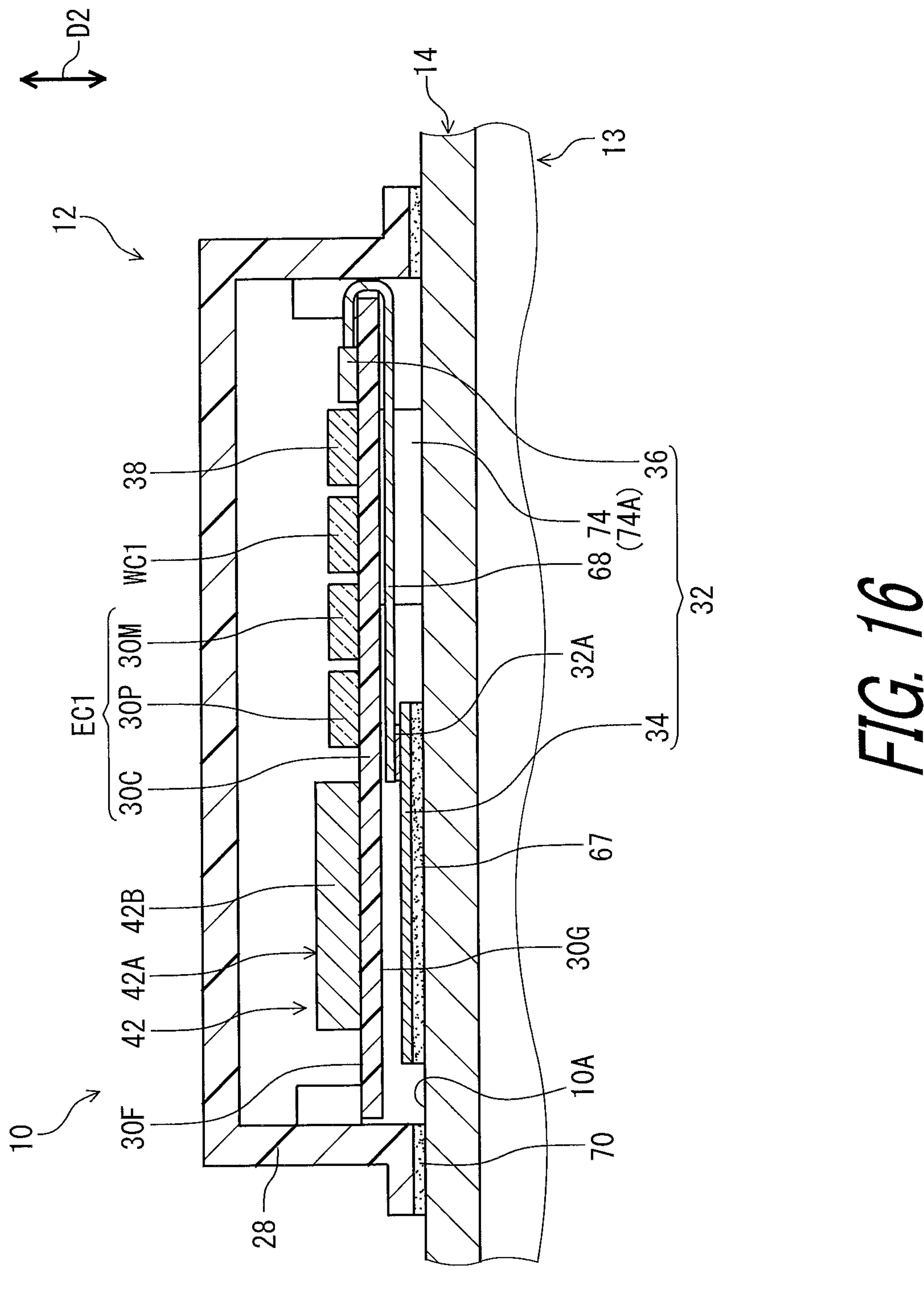
FIG. 16 is a schematic cross-sectional view of a rotational device in accordance with a modification.

As seen in FIG. 16, the terminal member 72 can be omitted from the electrical device 12 if needed and/or desired. In such modifications, for example, the electrical device 12 comprises a flexible printed circuit 68 connecting the strain gauge 34 and the measurement circuit 36.

Figure 17:
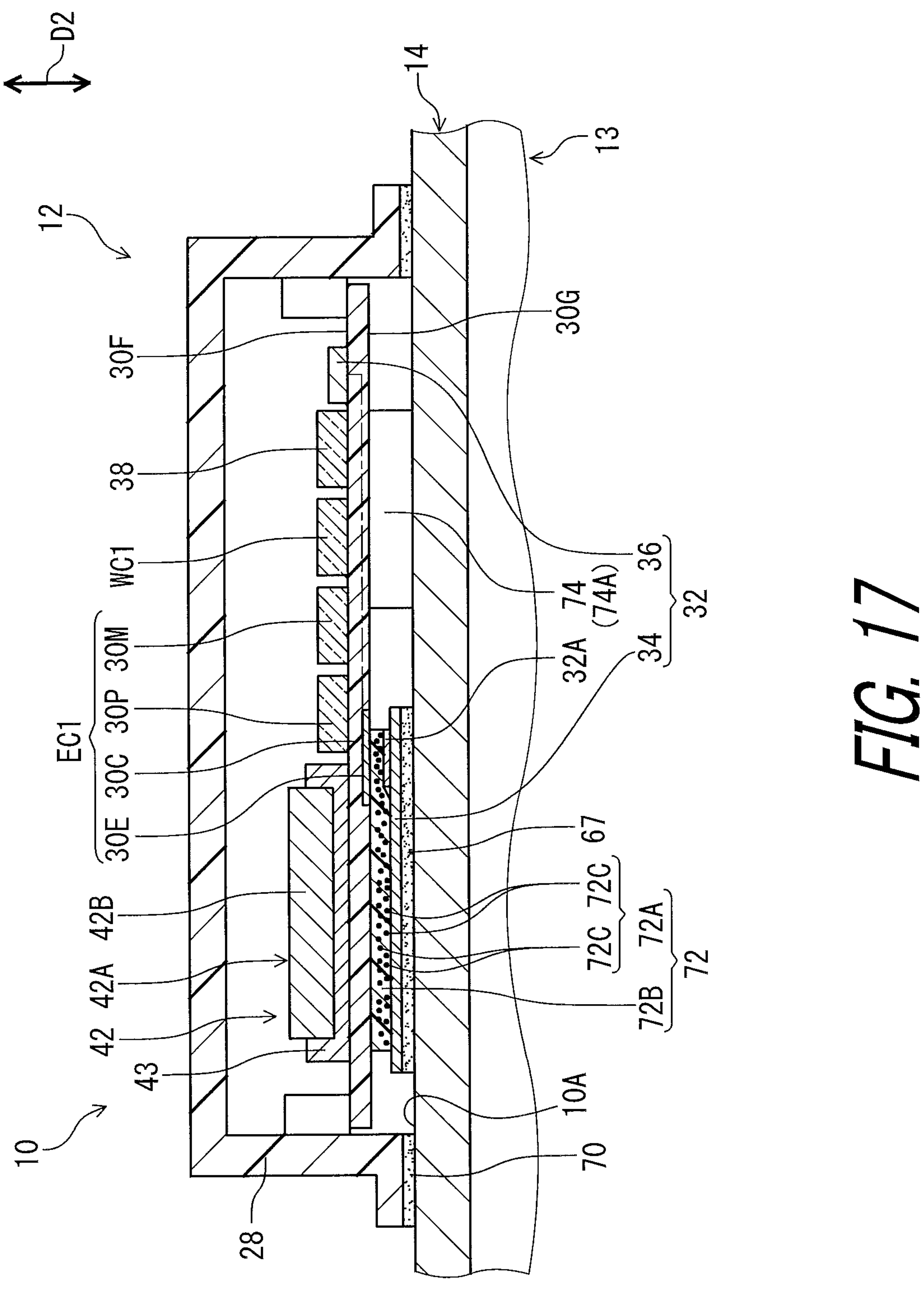
FIG. 17 is a schematic cross-sectional view of a rotational device in accordance with a modification.

As seen in FIG. 17, the rechargeable battery 42A can be indirectly connected to the first electrically conductive body 30E of the circuit board 30C if needed and/or desired. In such modifications, for example, the electrical device 12 comprises a power-source holder 43 configured to detachably hold the electric power source 42.

Second Embodiment

A rotational device 210 in accordance with a second embodiment will be described below referring to FIGS. 18 to 22. The rotational device 210 has the same structure and/or configuration as those of the rotational device 10 except for the arrangement of the electrical device 12. Thus, elements having substantially the same function as those in the first embodiment will be numbered the same here and will not be described and/or illustrated again in detail here for the sake of brevity.

Figure 18:
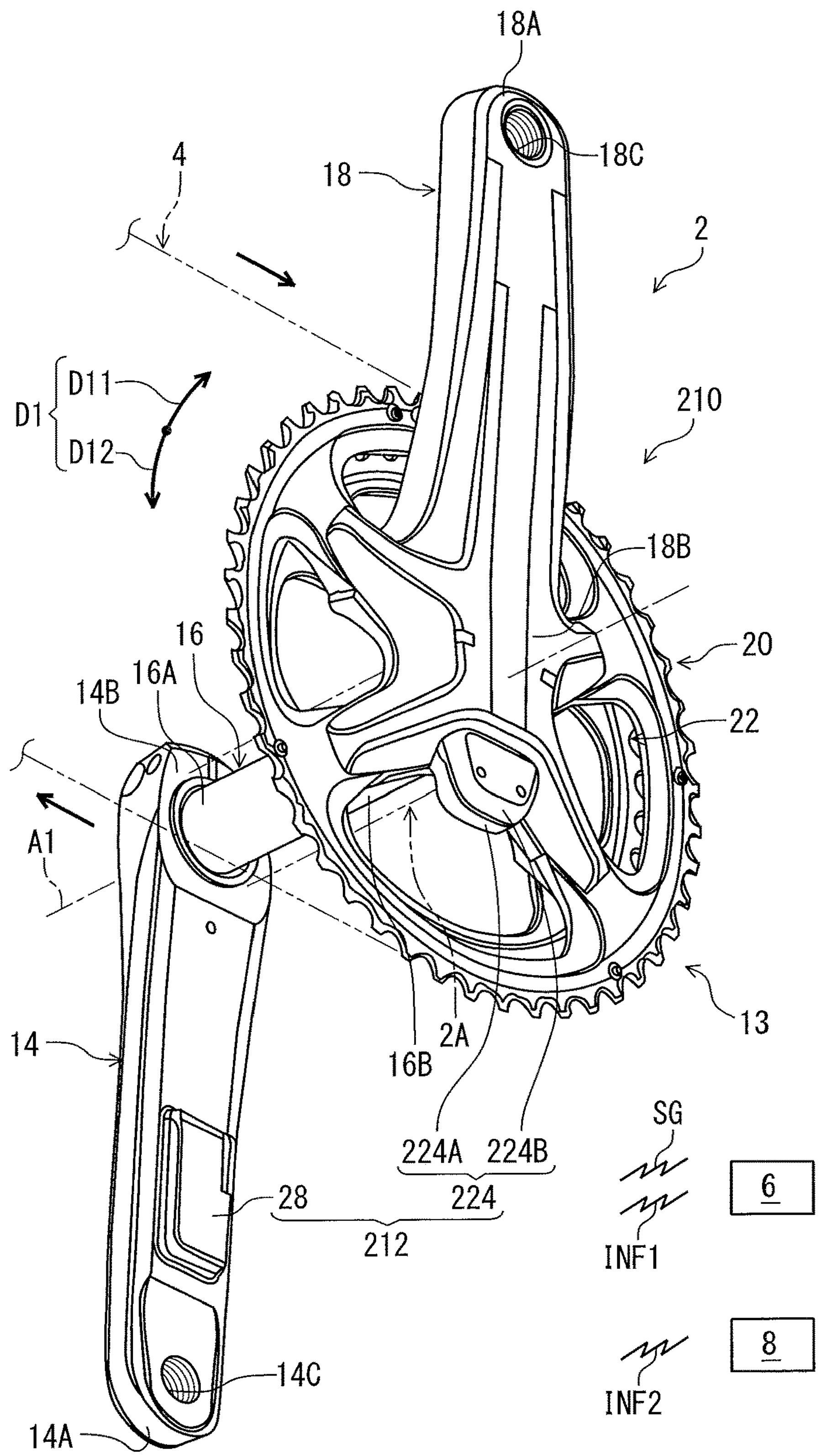
FIG. 18 is a perspective view of a rotational device in accordance with a second embodiment.
Figure 22:
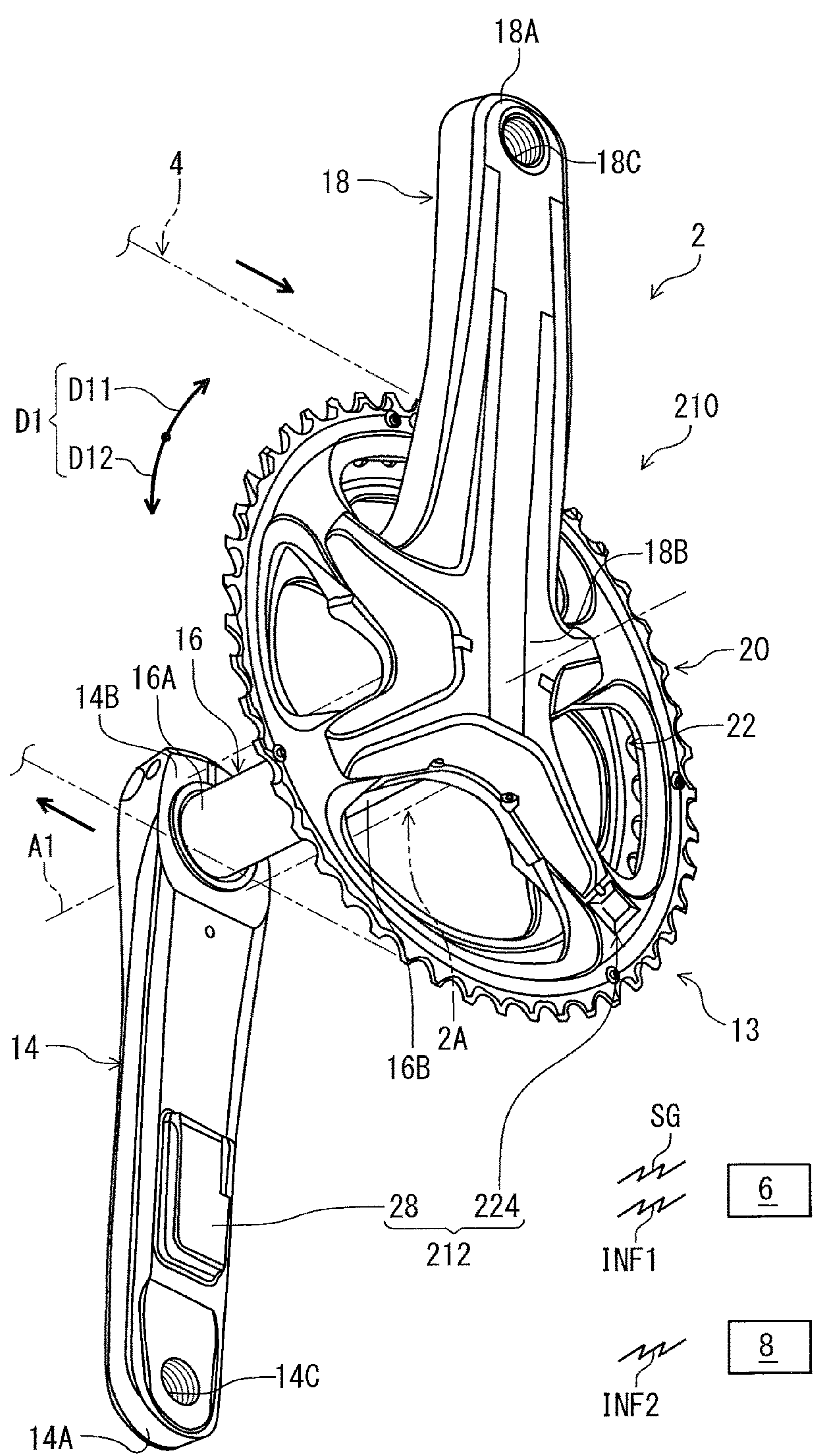
FIG. 22 is a perspective view of a rotational device in accordance with a modification.

As seen in FIGS. 18 and 22, the rotational device 210 comprises the crank arm 14, the crank arm 18, and the crank axle 16. The rotational device 210 comprises the additional device 13. The rotational device 210 of the human-powered vehicle 2 comprises an electrical device 212. The electrical device 212 has substantially the same structure as the structure of the electrical device 12 of the first embodiment. The electrical device 212 is at least partially provided to at least one of the crank axle 16, the crank arm 14, and the sprocket 20 and/or 22. The electrical device 212 is at least partially provided to the crank arm 14.

Figure 19:
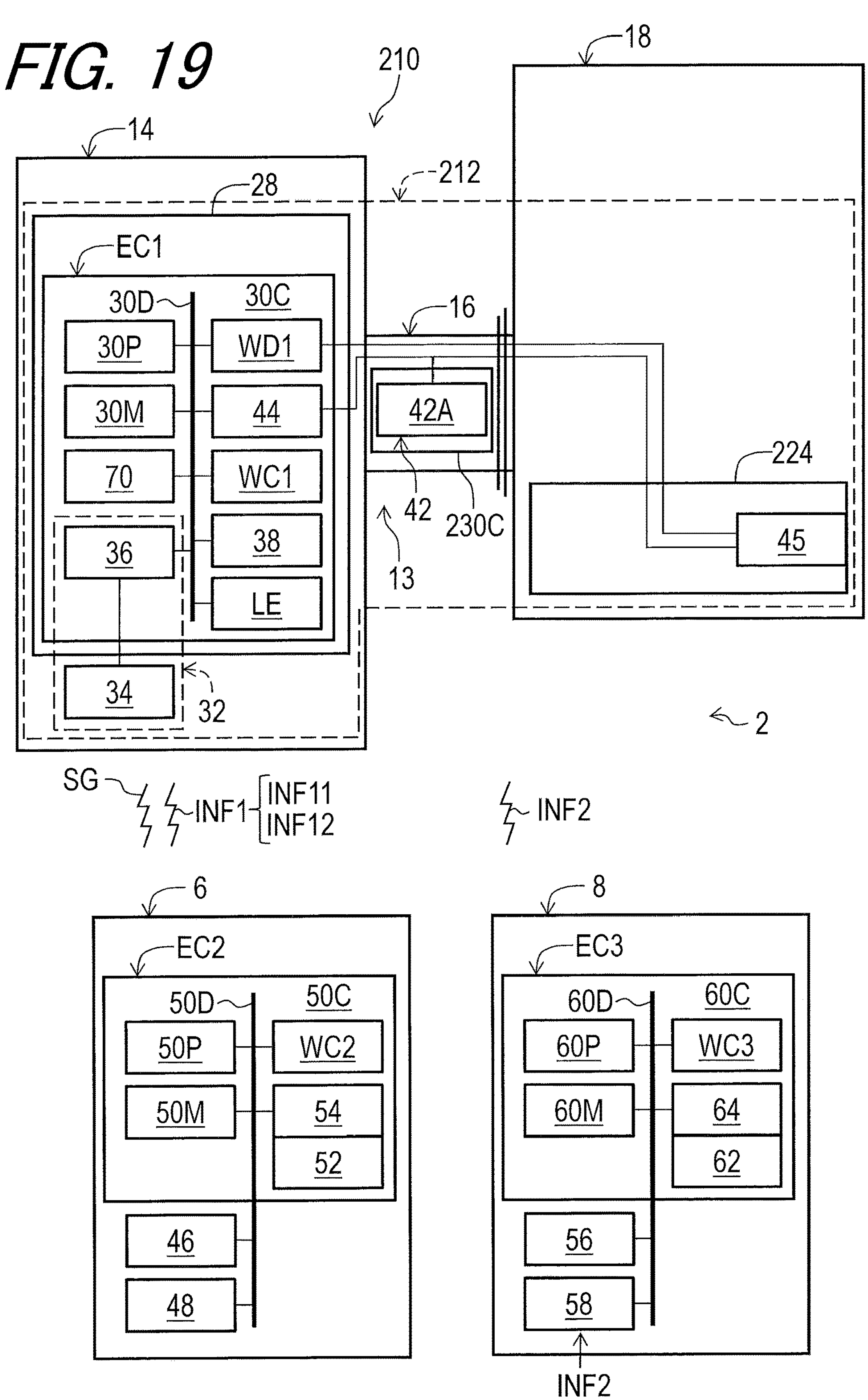
FIG. 19 is a schematic block diagram of the rotational device illustrated in FIG. 18.

As seen in FIG. 19, the electrical device 212 is partially provided to the crank arm 14, partially provided to the crank axle 16, and partially provided to the crank arm 18. The wireless communicator WC1, the electronic controller EC1, the force sensor 32, and the position detector 38 are provided to the crank arm 14. The electric power source 42 and the power-source holder 43 are provided to the crank axle 16. The electric connector port 45 is provided to the crank arm 18. The power-source holder 43 is electrically connected to the electronic controller EC1 and the electric connector port 45 via an electric cable.

As seen in FIG. 18, the electrical device 212 includes the housing 28 and an additional housing 224. The additional housing 224 is attached to the crank arm 18. The electric connector port 45 is coupled to the additional housing 224. For example, the additional housing 224 includes a housing body 224A and a lid 224B. The housing body 224A is secured to the crank arm 18. The lid 224B is detachably attached to the housing body 224A to cover the electric connector port 45 at least partially. The electric connector port 45 is connectable to an electric cable to charge the electric power source 42 via the electric connector port 45 and the power-source holder 43.

Figure 20:
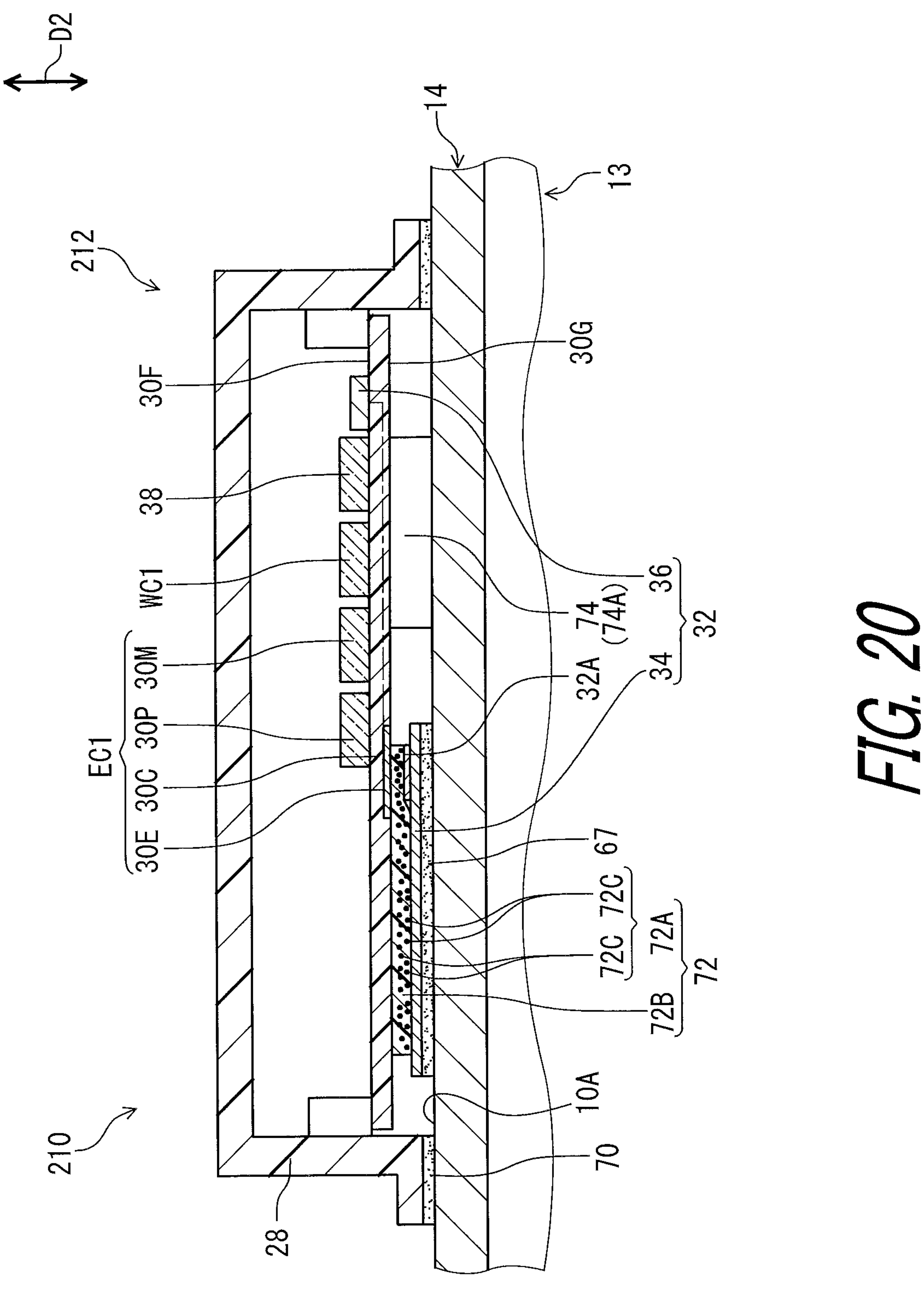
FIG. 20 is a schematic cross-sectional view of the rotational device illustrated in FIG. 18.

As seen in FIG. 20, the electrical device 212 of the human-powered vehicle 2 comprises the terminal member 72. As seen in FIG. 19, the electric power source 42 and the power-source holder 43 are provided in the crank axle 16. The electrical device 212 of the human-powered vehicle 2 comprises a circuit board 230C. The circuit board 230C is provided to the crank axle 16.

Figure 21:
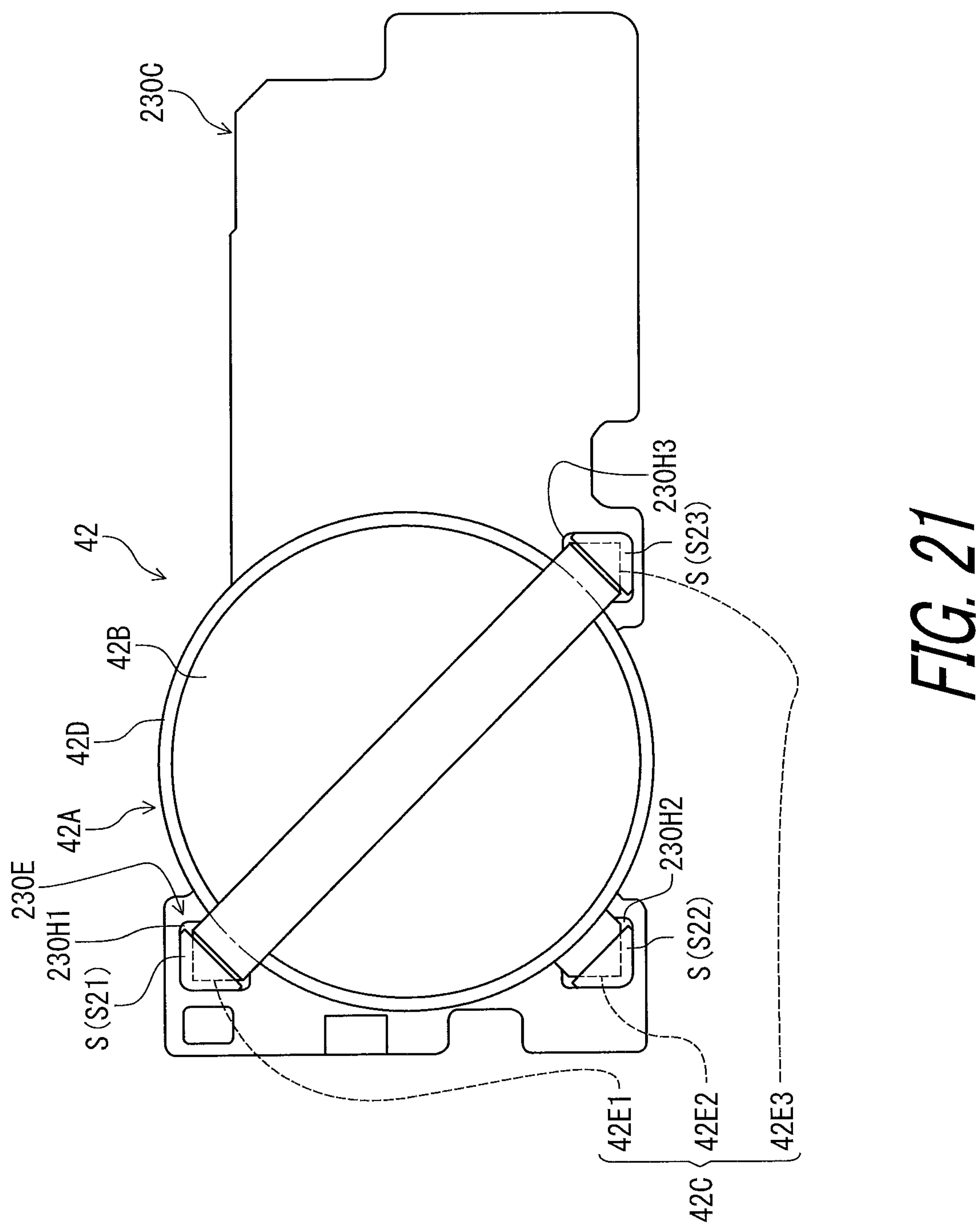
FIG. 21 is a plan view of a part of the electrical device illustrated in FIG. 18.

As seen in FIG. 21, the circuit board 230C includes a first electrically conductive body 230E. The rechargeable battery 42A is directly connected to the first electrically conductive body 230E of the circuit board 230C via solder. The rechargeable battery 42A is directly connected to the first electrically conductive body 230E via solder without a battery holder. However, the electrical device 212 can include a battery holder (e.g., the power-source holder 43 depicted in FIG. 17) configured to detachably hold the rechargeable battery 42A if needed and/or desired.

The description regarding the circuit board 30C and the first electrically conductive body 30E can be utilized as the description regarding the circuit board 230C and the first electrically conductive body 230E by replacing the reference numerals "30C," "30E," "30H1," "30H2," "30H3," "S1," "S2," and "S3" with "230C," "230E," "230H1," "230H2," "230H3," "S21," "S22," and "S23." Thus, the circuit board 230C and the first electrically conductive body 230E will not be described in detail here for the sake of brevity.

As seen in the modification depicted in FIG. 22, the electrical device 212 can be at least partially provided to the sprocket 20 if needed and/or desired. The additional housing 224 can be attached to the sprocket 20 if needed and/or desired.

Third Embodiment

A rotational device 310 in accordance with a third embodiment will be described below referring to FIGS. 23 to 27. The rotational device 310 has the same structure and/or configuration as those of the rotational device 210 except for an additional force sensor. Thus, elements having substantially the same function as those in the first and second embodiments will be numbered the same here and will not be described and/or illustrated again in detail here for the sake of brevity.

Figure 23:
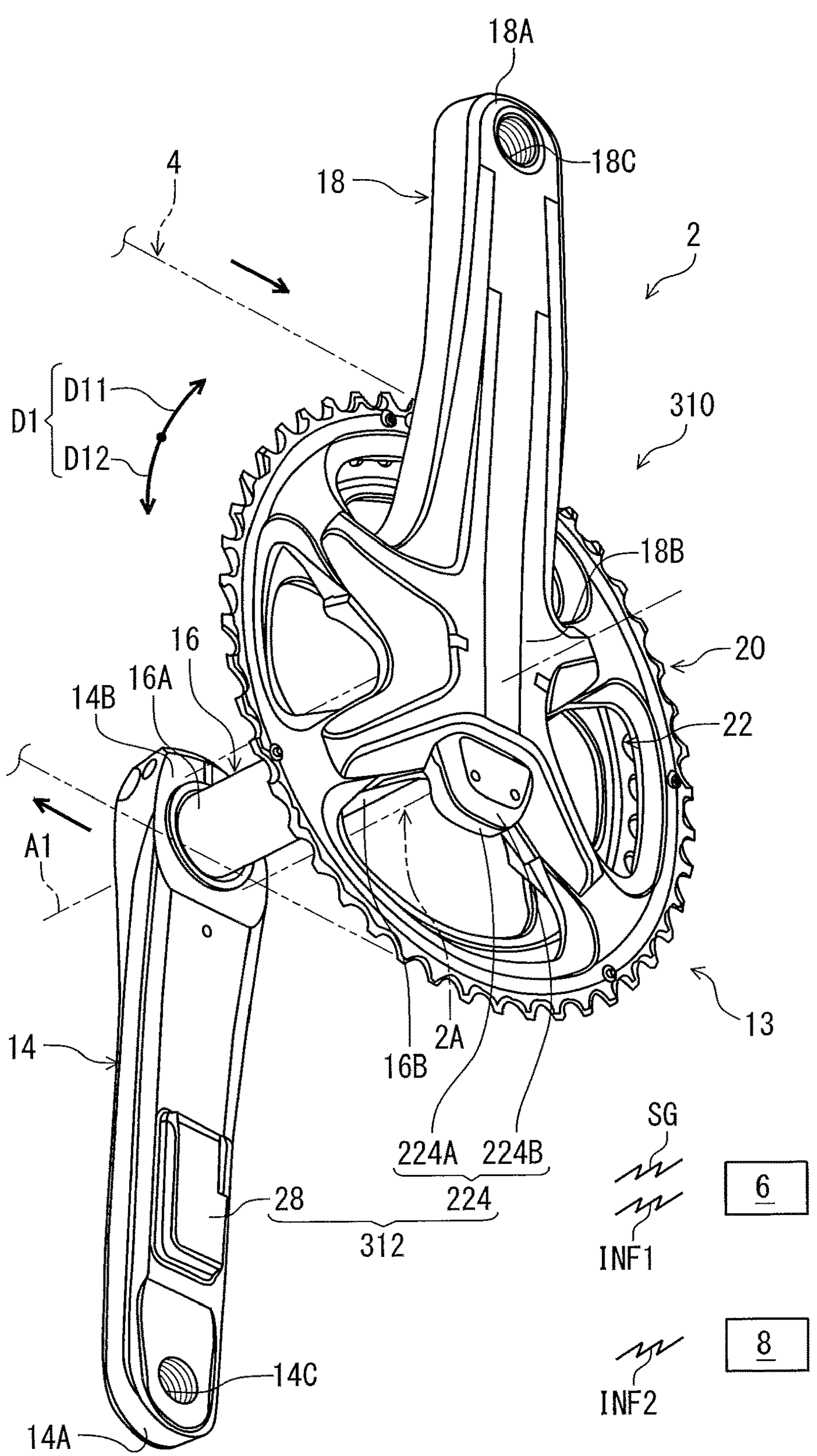
FIG. 23 is a perspective view of a rotational device in accordance with a third embodiment.
Figure 25:
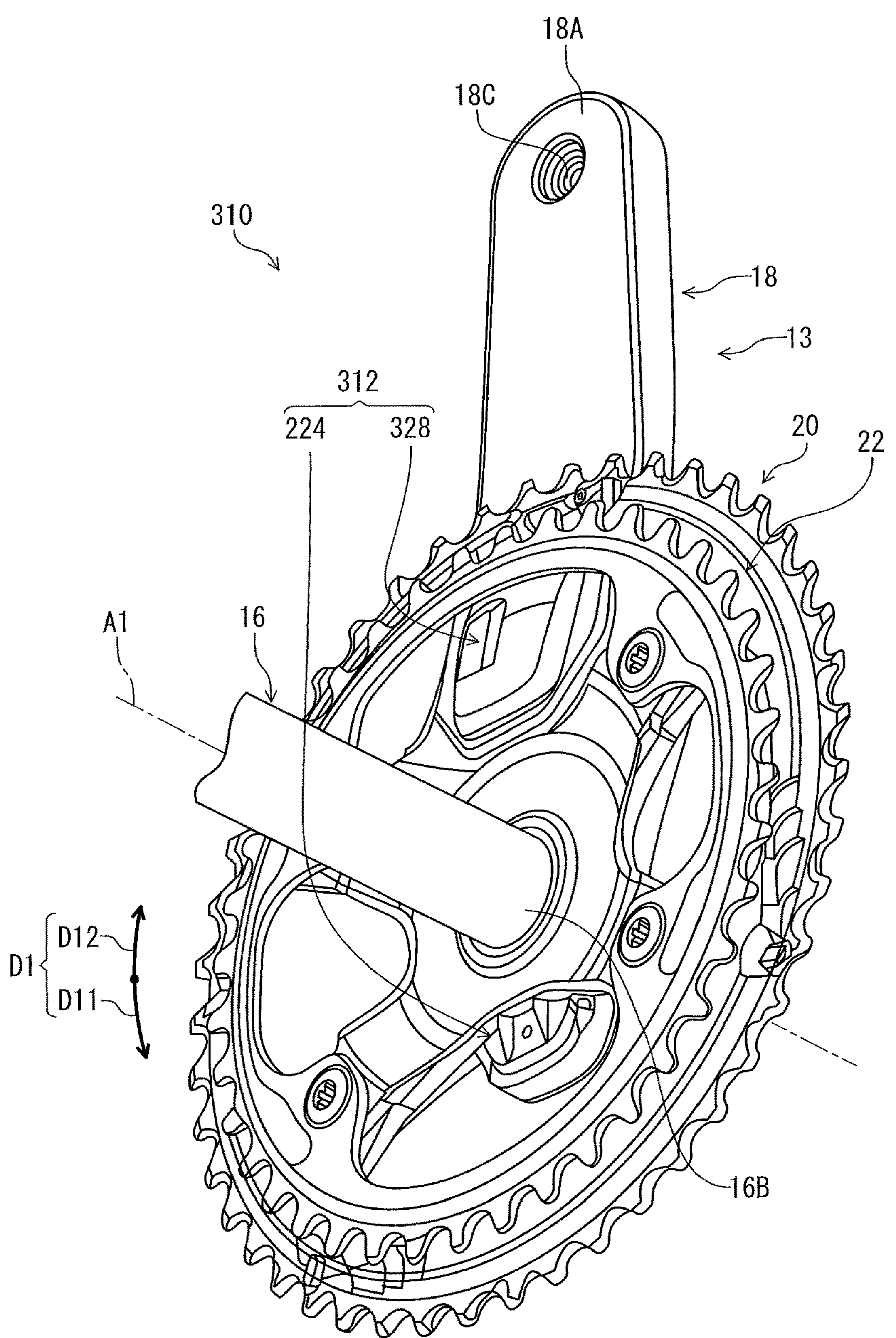
FIG. 25 is another perspective view of the rotational device illustrated in FIG. 23.

As seen in FIGS. 23 and 25, the rotational device 310 comprises the crank arm 14, the crank arm 18, and the crank axle 16. The rotational device 310 comprises the additional device 13. The rotational device 310 of the human-powered vehicle 2 comprises an electrical device 312. The electrical device 312 has substantially the same structure as the structure of the electrical device 212 of the second embodiment. The electrical device 312 is at least partially provided to at least one of the crank axle 16, the crank arm 14, and the sprocket 20 and/or 22. The electrical device 312 is at least partially provided to the crank arm 14.

Figure 24:
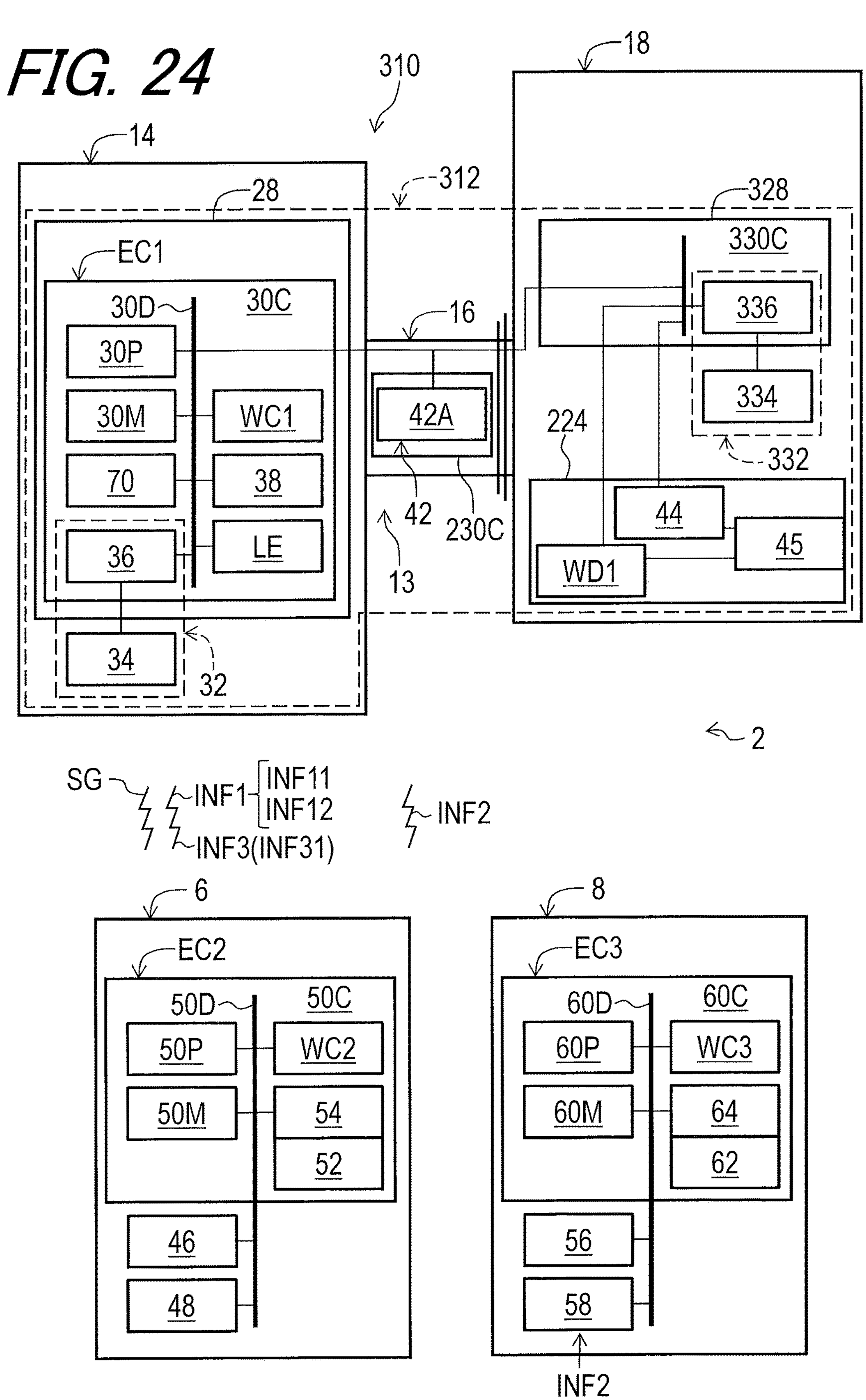
FIG. 24 is a schematic block diagram of the rotational device illustrated in FIG. 23.

As seen in FIG. 24, the electrical device 312 is partially provided to the crank arm 14, partially provided to the crank axle 16, and partially provided to the crank arm 18. The wireless communicator WC1, the electronic controller EC1, the force sensor 32, and the position detector 38 are provided to the crank arm 14. The electric power source 42 and the power-source holder 43 are provided to the crank axle 16. The electric connector port 45 is provided to the crank arm 18. The power-source holder 43 is electrically connected to the electronic controller EC1 via an electric cable. The power-source holder 43 is electrically connected to the electric connector port 45 via an electric cable.

The wireless communicator WC1 is configured to wirelessly transmit the rotational information INF1 relating to the rotational device 310. The rotational information INF1 includes the power INF11 and the rotational speed INF12 of the rotational device 310 (e.g., the crank arm 14). Furthermore, the wireless communicator WC1 is configured to wirelessly transmit rotational information INF3 relating to the rotational device 310 (e.g., the crank arm 18).

the electrical device 312 further comprises a force sensor 332. The force sensor 332 is configured to obtain the rotational information INF3. The rotational information INF3 includes a force applied to the rotational device 310 (e.g., the crank arm 18) in the rotational direction D1 (see e.g., FIG. 23). Thus, the force sensor 332 is configured to measure the force applied to the rotational device 310. The force sensor 332 is configured to output a measurement value indicating the force applied to the rotational device 310 in the rotational direction D1. In the present embodiment, the force sensor 332 is configured to measure the force applied to the crank arm 18. However, the force sensor 332 can be configured to measure the force applied to another part of the rotational device 310 if needed and/or desired.

The electronic controller EC1 is configured to receive the rotational information INF3 obtained by the force sensor 332. The electronic controller EC1 is electrically connected to the force sensor 332 to receive the rotational information INF3 obtained by the force sensor 332. The electronic controller EC1 is configured to receive the force measured by the force sensor 332. The electronic controller EC1 is electrically connected to the force sensor 332 to receive the force measured by the force sensor 332.

For example, the force sensor 332 includes a strain gauge 334 and a measurement circuit 336. The strain gauge 334 is attached to the crank arm 18. The strain gauge 334 is configured to output a change in electrical resistance depending on the deformation amount of the rotational device 310. The strain gauge 334 is configured to output the change in the electrical resistance depending on the deformation amount of the crank arm 18. The measurement circuit 336 is electrically connected to the strain gauge 334 to convert the output of the strain gauge 334 to a voltage indicating the deformation amount of the rotational device 310 (e.g., the crank arm 18). For example, the measurement circuit 336 constitutes a bridge circuit with the strain gauge 34.

The measurement circuit 336 is electrically connected to the electronic controller EC1. The electrical device 312 of the human-powered vehicle 2 comprises a circuit board 330C. The circuit board 330C is provided to the crank arm 18. The electronic controller EC1, the power-source holder 43, and the electric connector port 45 are electrically connected to the circuit board 330C. The measurement circuit 336 is electrically mounted on the circuit board 330C. For example, the measurement circuit 336 is electrically connected to strain gauge 334 via an additional circuit board such as a flexible printed circuit. The electronic controller EC1 is electrically connected to the measurement circuit 336 to receive the rotational information INF3. The electronic controller EC1 is electrically connected to the measurement circuit 336 to receive the deformation amount of the rotational device 310 (e.g., the crank arm 18).

As seen in FIGS. 23 and 25, the electrical device 312 includes the housing 28, the additional housing 224, and a housing 328. The housing 328 is attached to the crank arm 18. The electric connector port 45 can be coupled to the housing 328 if needed and/or desired. In such embodiments, the additional housing 224 can be omitted from the electrical device 312.

As seen in FIG. 24, as with the first embodiment, the electronic controller EC1 is configured to calculate the rotational information INF1 (e.g., the power INF11, the rotational speed INF12). In addition, the electronic controller EC1 is configured to calculate the rotational information INF3 based on the deformation amount of the rotational device 310 (e.g., the crank arm 18) obtained by the force sensor 332. The electronic controller EC1 is configured to calculate the force (e.g., torque) applied to the rotational device 310 based on the deformation amount of the rotational device 310 (e.g., the crank arm 18) obtained by the force sensor 332. The rotational information INF3 includes power INF31 applied to the rotational device 310 and the rotational speed INF12. For example, the electronic controller EC1 is configured to calculate the power INF31 applied to the rotational device 310 based on the torque applied to the rotational device 310 (e.g., the crank arm 18) and the rotational speed INF12 of the rotational device 310. However, the electronic controller EC1 can be configured to calculate the power INF31 applied to the rotational device 310 based on other data if needed and/or desired. For example, the electronic controller EC1 can be configured to calculate an average of the power INF31 during one revolution of the crank arm 18.

The electronic controller EC1 is configured to control the wireless communicator WC1 to wirelessly transmit the rotational information INF3 obtained by the force sensor 332. The electronic controller EC1 is configured to control the wireless communicator WC1 to wirelessly transmit, as the rotational information INF3, the power INF31 calculated by the electronic controller EC1 based on the force detected by the force sensor 332.

Figure 26:
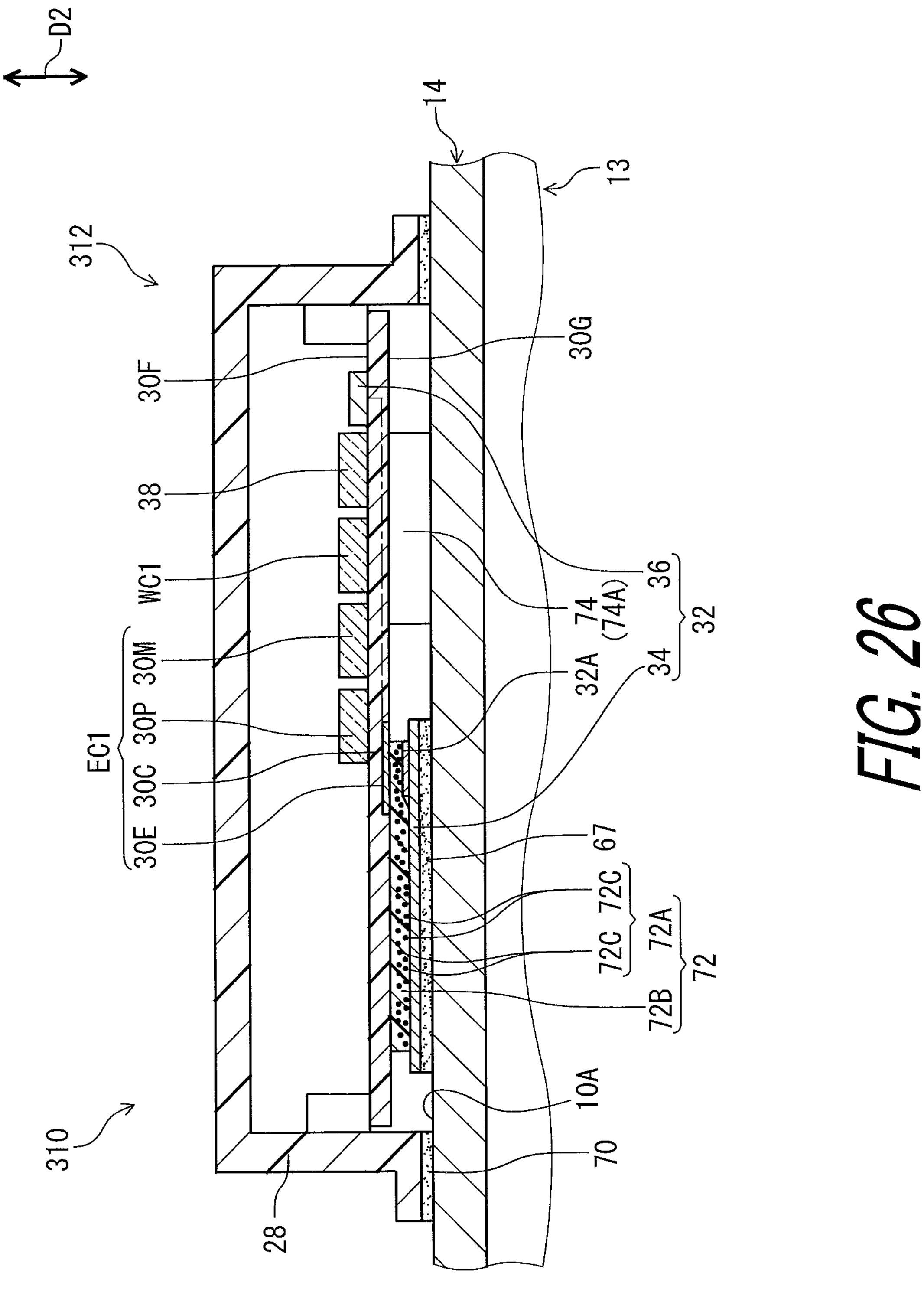
FIG. 26 is a schematic cross-sectional view of the rotational device illustrated in FIG. 23.

As seen in FIG. 26, the electrical device 312 of the human-powered vehicle 2 comprises the terminal member 72. The description regarding the terminal member 72 in the first embodiment can be utilized as the description regarding the terminal member 72 in the third embodiment. Thus, it will not be described in detail here for the sake of brevity.

Figure 27:
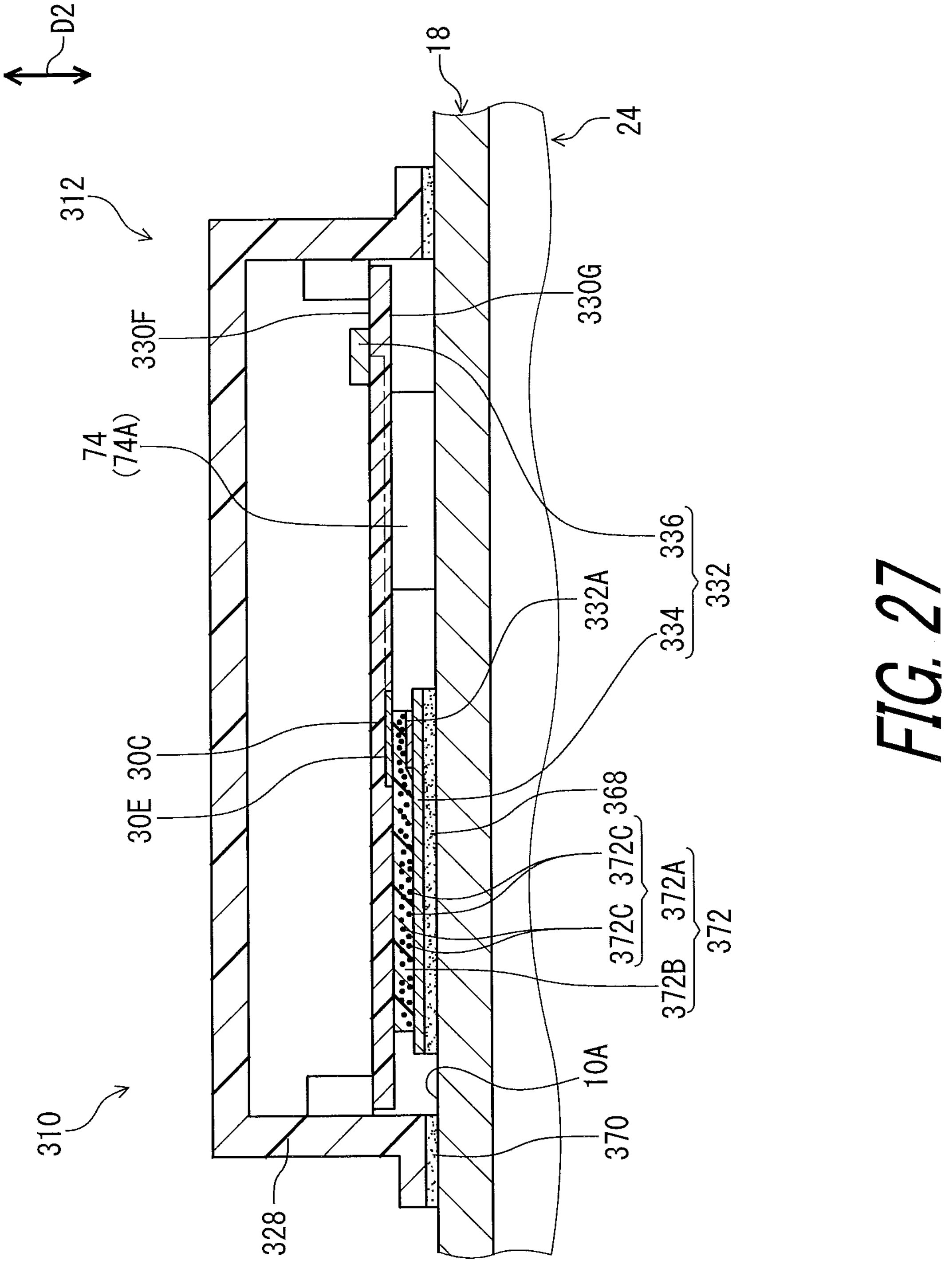
FIG. 27 is a schematic cross-sectional view of the rotational device illustrated in FIG. 23.

As seen in FIG. 27, the strain gauge 334 is attached to the crank arm 18 with an adhesive agent 368. The circuit board 330C is coupled to the crank arm 18. The housing 328 is attached to the crank arm 18 with an adhesive agent 370.

The electrical device 312 of the human-powered vehicle 2 comprises a terminal member 372. The terminal member 372 is configured to be at least partially provided between the circuit board 330C and the additional device 13 in an attachment state where the circuit board 330C is attached to the additional device 13. In the present embodiment, the terminal member 372 is configured to entirely provided between the circuit board 330C and the additional device 13 in the attachment state where the circuit board 330C is attached to the additional device 13. The terminal member 372 is configured to entirely provided between the circuit board 330C and the additional device 13 in the attachment state where the circuit board 330C is attached to the crank arm 18 of the additional device 13. However, the terminal member 372 can be configured to partially provided between the circuit board 330C and the additional device 13 in the attachment state if needed and/or desired.

The terminal member 372 is configured to be at least partially provided between the circuit board 330C and the force sensor 332 in the attachment state. The terminal member 372 is configured to be at least partially provided between the circuit board 330C and the strain gauge 334 in the attachment state. In the present embodiment, the terminal member 372 is configured to be partially provided between the circuit board 330C and the force sensor 332 in the attachment state. The terminal member 372 is configured to be entirely provided between the circuit board 330C and the strain gauge 334 in the attachment state. However, the terminal member 372 can be configured to be entirely provided between the circuit board 330C and the force sensor 332 in the attachment state if needed and/or desired. The terminal member 372 can be configured to be partially provided between the circuit board 330C and the strain gauge 334 in the attachment state if needed and/or desired.

The force sensor 332 is configured to measure the force applied to the additional device 13 in the attachment state. The force sensor 332 is configured to measure the force applied to the crank arm 18 in the attachment state. The force sensor 332 is configured to be at least partially attached to the additional device 13 in the attachment state. In the present embodiment, the force sensor 332 is configured to be partially attached to the additional device 13 in the attachment state. The strain gauge 334 is configured to be entirely attached to the crank arm 18 in the attachment state. However, the force sensor 332 can be configured to be entirely attached to the additional device 13 in the attachment state if needed and/or desired. The strain gauge 334 can be configured to be partially attached to the crank arm 18 in the attachment state.

The circuit board 330C includes a first electrically conductive body 330E. The terminal member 372 includes a second electrically conductive body 372A. The second electrically conductive body 372A is configured to elastically maintain contact between the first electrically conductive body 330E and the second electrically conductive body 372A in the attachment state. The terminal member 372 is deformable to elastically maintain contact between the first electrically conductive body 330E and the second electrically conductive body 372A in the attachment state. The second electrically conductive body 372A is in contact with the first electrically conductive body 330E in the attachment state.

The force sensor 332 includes a third electrically conductive body 332A. The strain gauge 334 includes the third electrically conductive body 332A. The terminal member 372 is configured to elastically maintain contact between the second electrically conductive body 372A and the third electrically conductive body 332A in the attachment state. The terminal member 372 is deformable to elastically maintain contact between the second electrically conductive body 372A and the third electrically conductive body 332A in the attachment state. The second electrically conductive body 372A is configured to electrically connect the first electrically conductive body 330E and the third electrically conductive body 332A in a deformed state where the terminal member 372 is elastically deformed between the first electrically conductive body 330E and the third electrically conductive body 332A. The second electrically conductive body 372A is in contact with the third electrically conductive body 332A in the attachment state.

The terminal member 372 includes a base body 372B made of a non-metallic material. The base body 372B is elastically deformable. For example, the base body 372B is made of a resin material. The second electrically conductive body 372A is coupled to the base body 372B. The second electrically conductive body 372A is provided in the base body 372B. Examples of the terminal member 372 include at least one of an anisotropic conductive film, an elastic member with conductive particles, a telescopic contact, and a spring contact. In the present embodiment, the terminal member 372 includes an anisotropic conductive film. The second electrically conductive body 372A includes at least two conductive particles 372C provided in the base body 372B. However, the terminal member 372 can include structures other than the anisotropic conductive film if needed and/or desired.

The circuit board 330C includes a first surface 330F and a second surface 330G provided on a reverse side of the first surface 330F. The rechargeable battery 42A is provided on the first surface 330F. The terminal member 372 is provided between the second surface 330G and the crank arm 18. The strain gauge 334 is provided between the second surface 330G and the crank arm 18.

The first electrically conductive body 330E is at least partially provided on each of the first surface 330F and the second surface 330G. The first electrically conductive body 330E is at least partially provided in the circuit board 330C. A part of the first electrically conductive body 330E provided on the first surface 330F is electrically connected to a part of the first electrically conductive body 330E provided on the second surface 330G. The first electrically conductive body 330E includes pads, lands, through-holes, and vias. The first electrically conductive body 330E is made of an electrical conducting material such as copper.

Fourth Embodiment

A rotational device 410 in accordance with a fourth embodiment will be described below referring to FIGS. 28 to 31. The rotational device 410 has the same structure and/or configuration as those of the rotational device 10 except that an electrical device is provided to the pedal 24. Thus, elements having substantially the same function as those in the first to third embodiments will be numbered the same here and will not be described and/or illustrated again in detail here for the sake of brevity.

Figure 28:
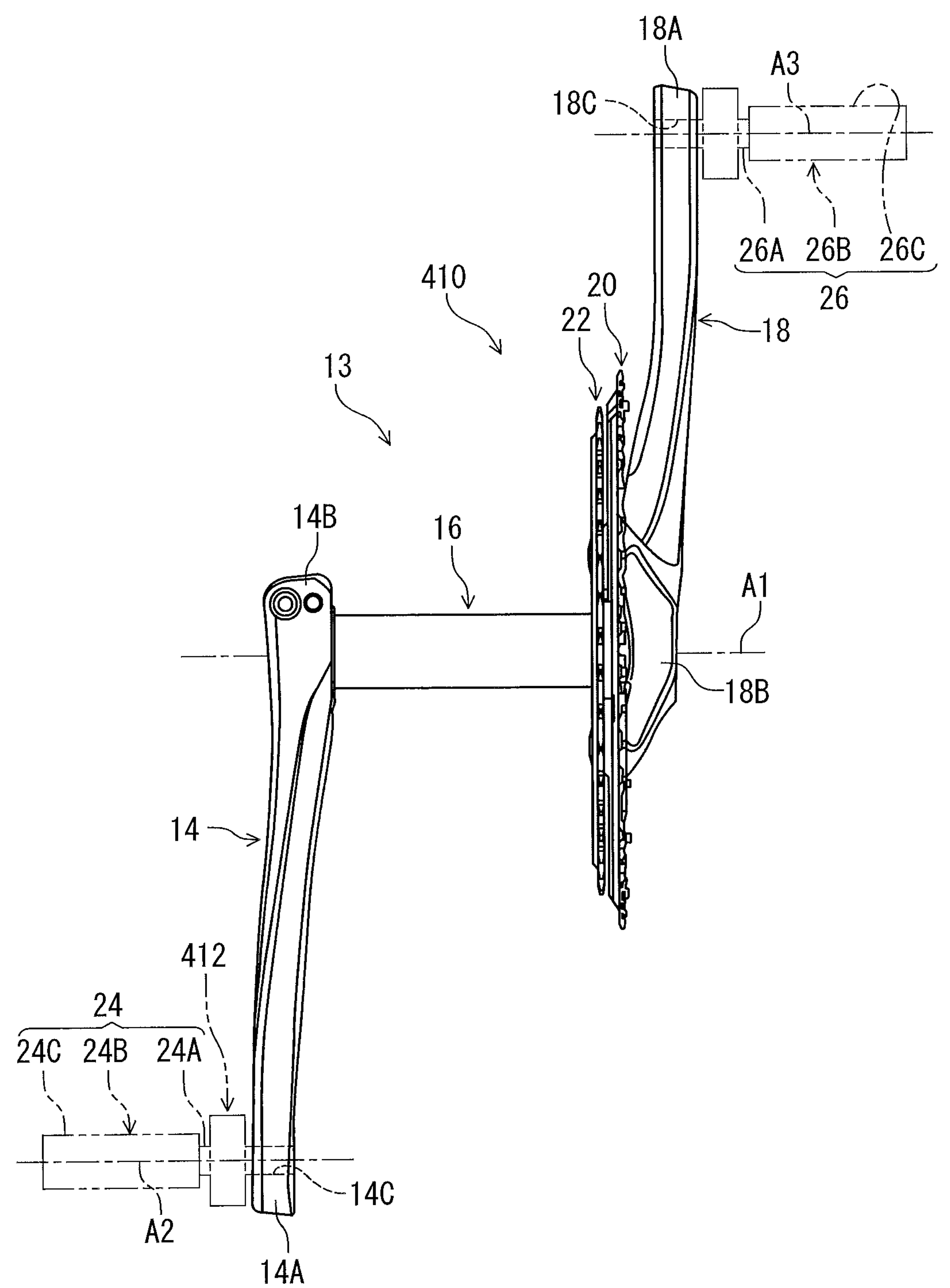
FIG. 28 is a side-elevational view of a rotational device in accordance with a fourth embodiment.
Figure 29:
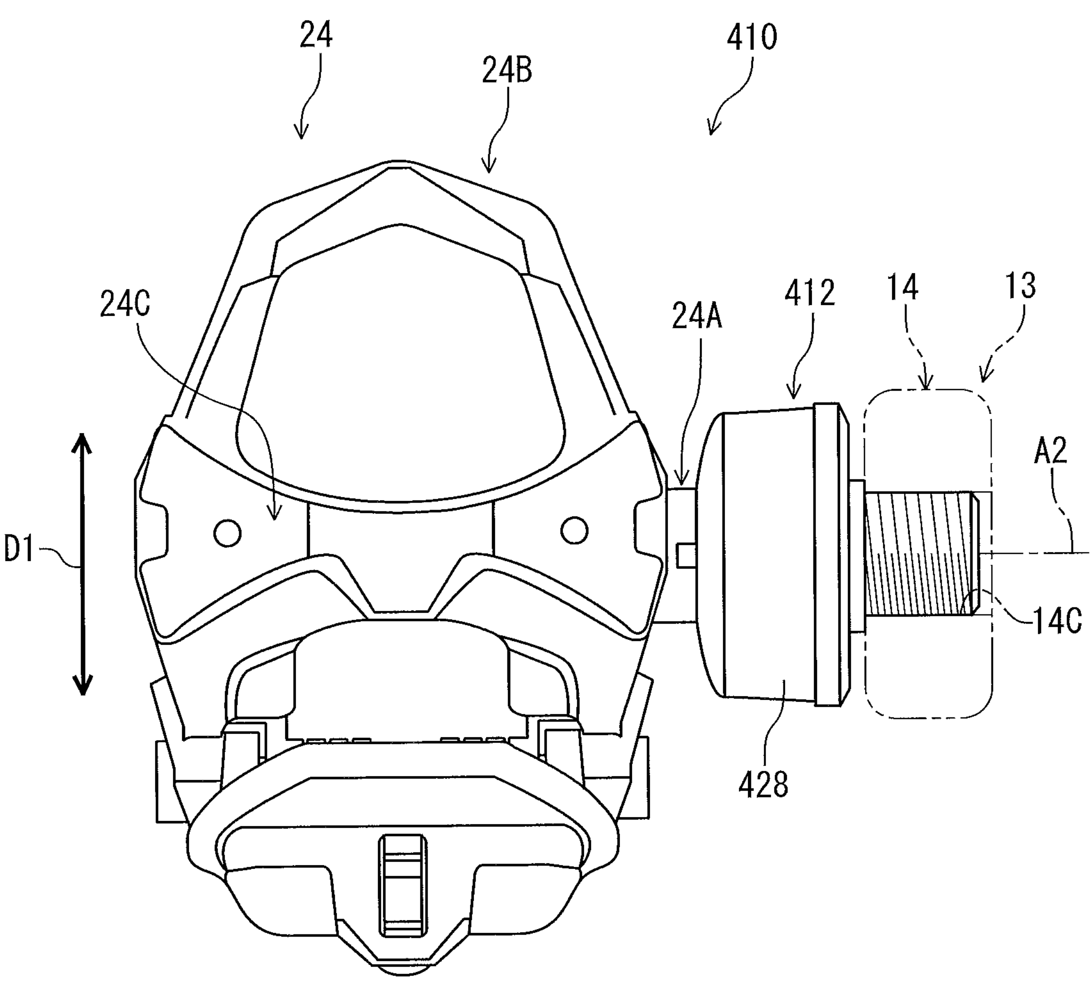
FIG. 29 is a top view of the rotational device illustrated in FIG. 28.

As seen in FIGS. 28 and 29, the rotational device 410 of the human-powered vehicle 2 comprises the crank assembly 13 and the pedal 24. Namely, the rotational device 410 of the human-powered vehicle 2 comprises the pedal axle 24A and the pedal body 24B. The rotational device 410 of the human-powered vehicle 2 comprises an electrical device 412. The electrical device 412 has substantially the same structure as the structure of the electrical device 12 of the second embodiment.

The electrical device 412 is at least partially provided to at least one of the pedal axle 24A and the pedal body 24B. The electrical device 412 is at least partially provided to the pedal axle 24A. In the present embodiment, the electrical device 412 is entirely provided to the pedal axle 24A. However, the electrical device 412 can be at least partially provided to at least one of the pedal axle 24A and the pedal body 24B if needed and/or desired. The electrical device 412 can be at least partially provided to the pedal 26 if needed and/or desired.

Figure 30:
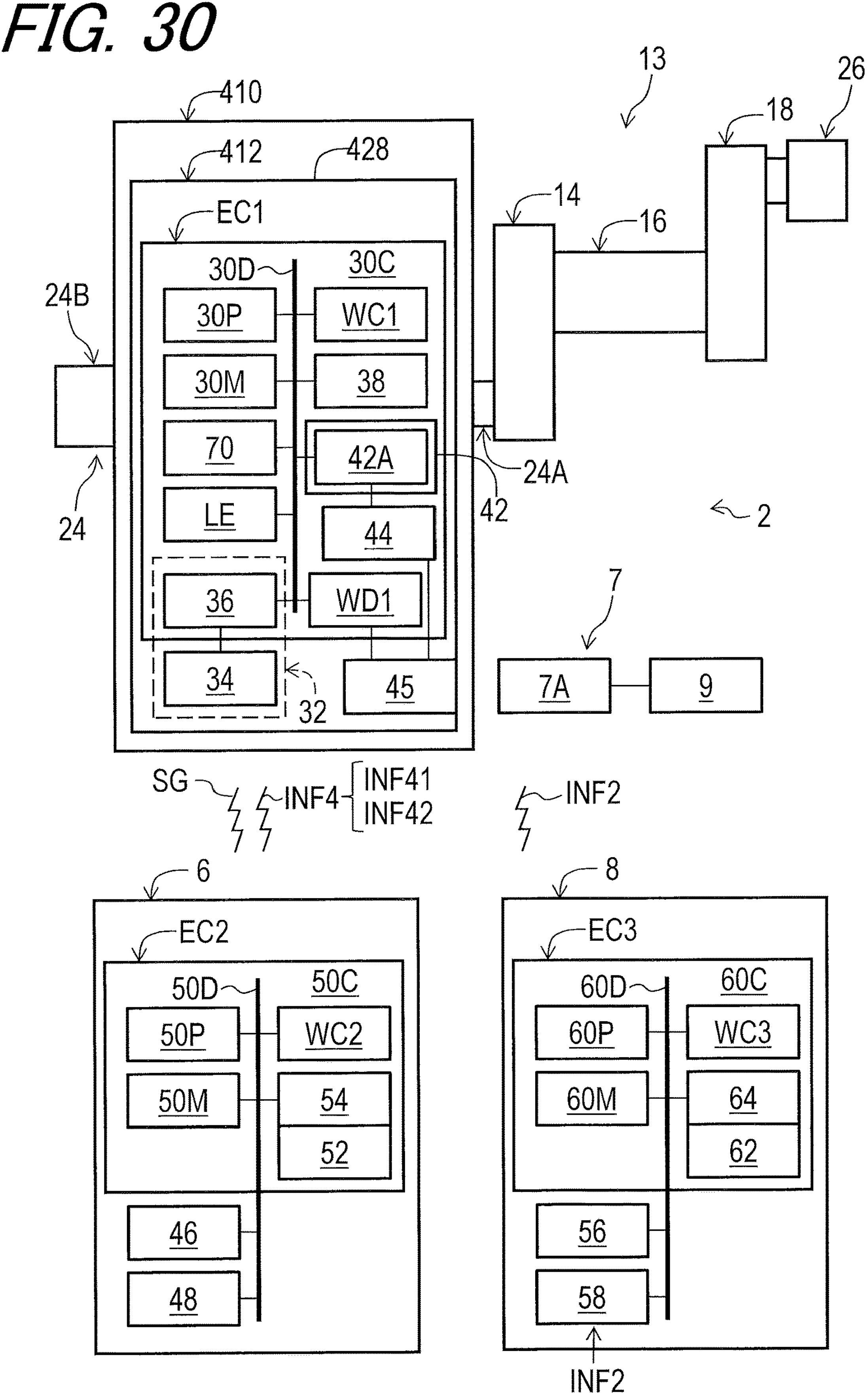
FIG. 30 is a schematic block diagram of the rotational device illustrated in FIG. 28.

As seen in FIG. 30, the electrical device 412 comprises the wireless communicator WC1, the electronic controller EC1, the force sensor 32, the position detector 38, the electric power source 42, and the electric connector port 45. The wireless communicator WC1, the electronic controller EC1, the force sensor 32, the position detector 38, the electric power source 42, the power-source holder 43, and the electric connector port 45 are provided to the pedal axle 24A.

The wireless communicator WC1 is configured to wirelessly transmit rotational information INF4 relating to the rotational device 410 (e.g., the pedal 24). The force sensor 32 is configured to obtain the rotational information INF4. The force sensor 32 is configured to output a measurement value indicating the force applied to the rotational device 410 in the rotational direction D1 (see e.g., FIG. 29).

The electronic controller EC1 is configured to receive the rotational information INF4 obtained by the force sensor 32. The electronic controller EC1 is electrically connected to the force sensor 32 to receive the rotational information INF4 obtained by the force sensor 32.

The rotational information INF4 includes power INF41 applied to the rotational device 410 and a rotational speed INF42 of the rotational device 410. For example, the electronic controller EC1 is configured to calculate the power INF41 applied to the rotational device 410 based on the torque applied to the rotational device 410 (e.g., the pedal 24) and the rotational speed INF42 of the rotational device 410. However, the electronic controller EC1 can be configured to calculate the power INF41 applied to the rotational device 410 based on other data if needed and/or desired. For example, the electronic controller EC1 can be configured to calculate an average of the power INF41 during one revolution of the crank arm 14. For example, the electronic controller EC1 can be configured to calculate total power during one revolution of the crank assembly 13 by doubling the power INF41 on the only one crank arm.

Figure 31:
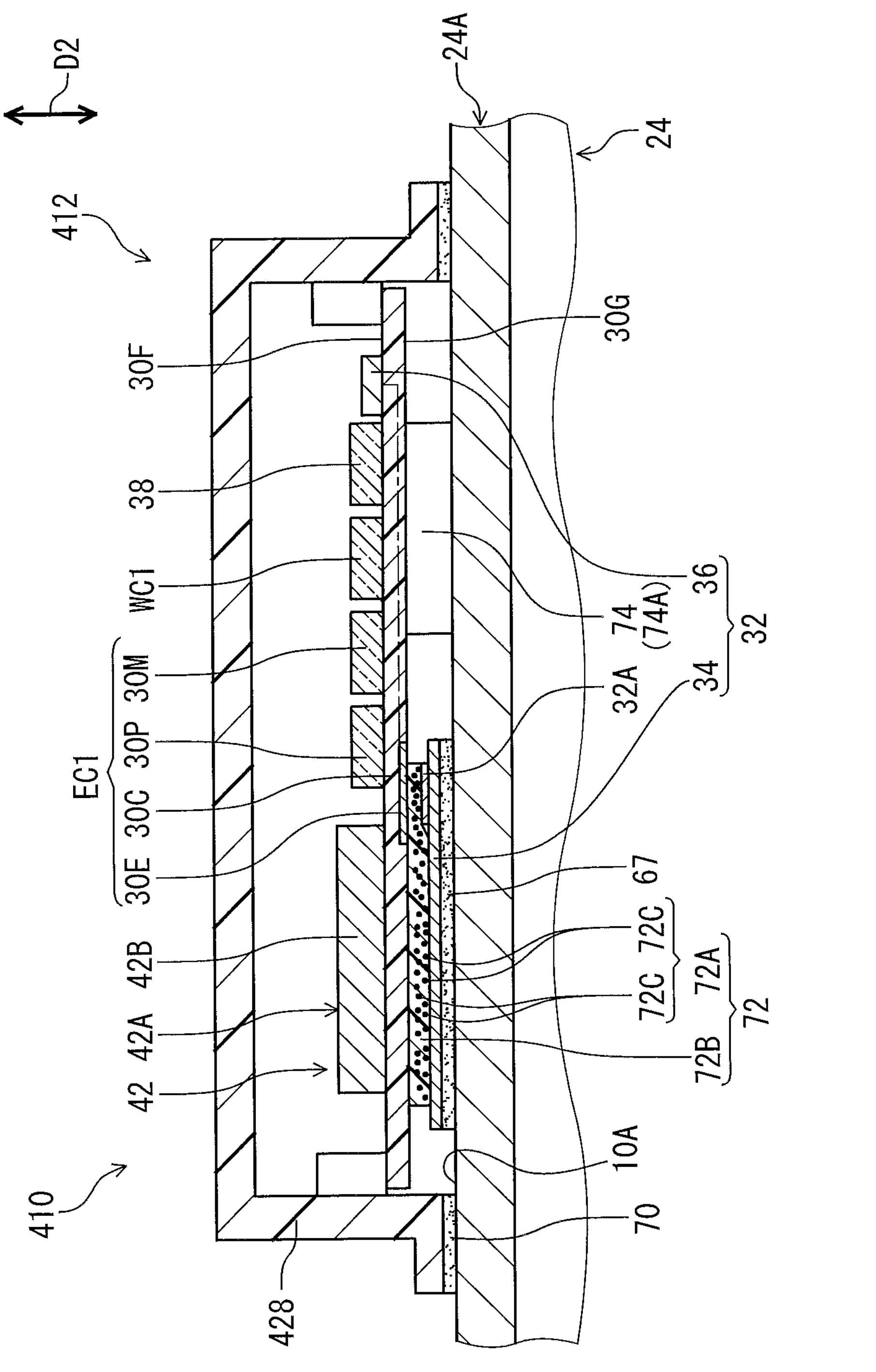
FIG. 31 is a schematic cross-sectional view of the rotational device illustrated in FIG. 28.

As seen in FIG. 31, the electrical device 412 for the rotational device 410 of the human-powered vehicle 2 comprises a housing 428. The housing 428 is coupled to the pedal axle 24A (see e.g., FIG. 29). The wireless communicator WC1, the electronic controller EC1, the force sensor 32, the position detector 38, and the electric power source 42 are provide in the housing 428.

The description regarding the electrical device 12 can be utilized as the description regarding the electrical device 412 by replacing the reference numerals "INF1," "INF11," "INF12," "10," "12," and "28" with "INF4," "INF41," "INF42," "410," "412," and "428." Thus, it will not be described in detail here for the sake of brevity.

In the first to fourth embodiments and the modifications thereof, the external electrical device 8 is a separate device from the additional electrical device 6. However, the external electrical device 8 can be integrally provided with the additional electrical device 6 as a single device if needed and/or desired.

At least one of the modifications depicted in FIGS. 11, 12, 14, and 15 can be applied to the first to fourth embodiment and the modifications thereof.

In each of the first embodiment and the modifications thereof, the electrical device 12 is attached to the mounting surface 10A of the rotational device 10. However, the electrical device 12 can be attached to an inner surface of the rotational device 10 (e.g., an inner surface of the crank arm 14 or 18) if needed and/or desired. In such modifications, the electrical device 12 is provided in an internal space of the rotational device 10 (e.g., an internal space of the crank arm 14 or 18). The same can be applied to each of the second to fourth embodiments and the modifications thereof.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. An electrical device of a human-powered vehicle, comprising:

a circuit board including a first electrically conductive body;

a terminal member configured to be at least partially provided between the circuit board and an additional device in an attachment state where the circuit board is attached to the additional device; and the terminal member including a second electrically conductive body configured to elastically maintain contact between the first electrically conductive body and the second electrically conductive body in the attachment state, wherein the terminal member includes a base body made of a non-metallic material, the second electrically conductive body is coupled to the base body, and the terminal member includes at least one of an anisotropic conductive film and an elastic member with conductive particles.

2. The electrical device according to claim 1, wherein the terminal member is deformable to elastically maintain contact between the first electrically conductive body and the second electrically conductive body in the attachment state.

3. The electrical device according to claim 1, further comprising a force sensor configured to measure a force applied to the additional device in the attachment state.

4. The electrical device according to claim 3, wherein the force sensor is configured to be at least partially attached to the additional device in the attachment state, and the terminal member is configured to be at least partially provided between the circuit board and the force sensor in the attachment state.

5. The electrical device according to claim 4, wherein the force sensor includes a third electrically conductive body, and the terminal member is configured to elastically maintain contact between the second electrically conductive body and the third electrically conductive body in the attachment state.

6. The electrical device according to claim 5, wherein the terminal member is deformable to elastically maintain contact between the second electrically conductive body and the third electrically conductive body in the attachment state.

7. A rotational device of a human-powered vehicle, comprising:

a crank arm; and the electrical device according to claim 1.

8. The rotational device according to claim 7, wherein the electrical device is at least partially provided to the crank arm.

9. The rotational device according to claim 7, further comprising:

a crank axle; and a sprocket, wherein the crank arm is secured to the crank axle.

10. The rotational device according to claim 9, wherein the electrical device is at least partially provided to at least one of the crank axle, the crank arm, and the sprocket.

11. A rotational device of a human-powered vehicle, comprising:

a pedal axle;

a pedal body rotatably coupled to the pedal axle; and the electrical device according to claim 1.

12. The rotational device according to claim 11, wherein the electrical device is at least partially provided to at least one of the pedal axle and the pedal body.

* * * * *